United States Patent
Enjoji et al.

(10) Patent No.: US 7,727,658 B2
(45) Date of Patent: Jun. 1, 2010

(54) METHOD FOR JOINING LASER TRANSMITTING RESIN MEMBER AND POROUS MEMBER, METHOD FOR JOINING THERMOPLASTIC RESIN, AND FUEL CELL

(75) Inventors: Naoyuki Enjoji, Wako (JP); Masato Komatsuki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1238 days.

(21) Appl. No.: 11/083,666

(22) Filed: Mar. 17, 2005

(65) Prior Publication Data
US 2005/0208361 A1    Sep. 22, 2005

(30) Foreign Application Priority Data

| Mar. 17, 2004 | (JP) | 2004-075792 |
| Mar. 22, 2004 | (JP) | 2004-081973 |
| Apr. 8, 2004 | (JP) | 2004-114609 |

(51) Int. Cl.
*H01M 2/00* (2006.01)
*H01M 2/08* (2006.01)
(52) U.S. Cl. .......................... 429/36; 429/34
(58) Field of Classification Search ............. 429/12–46; 219/121 LD
See application file for complete search history.

(56) References Cited

U.S. PATENT DOCUMENTS 4,636,609 A * 1/1987 Nakamata ............. 219/121.64

| 2003/0134173 A1* | 7/2003 | Hatoh et al. ................. 429/35 |
| 2004/0121215 A1* | 6/2004 | Fujii et al. ................... 429/35 |
| 2004/0161653 A1* | 8/2004 | Andrews et al. ............. 429/34 |

FOREIGN PATENT DOCUMENTS

| JP | 60-214929 A | 10/1985 |
| JP | 60-214931 A | 10/1985 |
| JP | 2000-012067 A | 1/2000 |
| JP | 2001-071394 A | 3/2001 |
| JP | 2001-232687 A | 8/2001 |
| JP | 2001-357861 A | 12/2001 |
| JP | 2002-246044 A | 8/2002 |
| JP | 2003-223903 A | 8/2003 |

* cited by examiner

*Primary Examiner*—Dah-Wei D Yuan
*Assistant Examiner*—Zachary Best
(74) *Attorney, Agent, or Firm*—Lahive & Cockfield, LLP; Anthony A. Laurentano

(57) ABSTRACT

A method for joining a resin member and a porous member can prevent peeling in a specified direction. When a thermoplastic laser transmitting resin member and a porous member are joined, the laser transmitting resin layer and the porous member are laminated, and a laser beam is emitted at a side of the laser transmitting resin member. The porous member is heated so that the laser transmitting resin member is melted, and the melted resin is impregnated with holes of the porous member. The resin is cooled so as to solidify.

20 Claims, 38 Drawing Sheets

METHOD FOR JOINING LASER TRANSMITTING RESIN MEMBER AND POROUS MEMBER, METHOD FOR JOINING THERMOPLASTIC RESIN, AND FUEL CELL

BACKGROUND OF THE INVENTION

1. Field of the Invention

The present invention relates to a method for joining a laser transmitting resin member and a porous member, a method for joining thermoplastic resin, and a fuel cell. The invention specifically relates to a joining technique in which peel strength of a joined body which is to be obtained is improved, a joining technique which realizes ease of material handling, reduction in the manufacturing cost and an excellent laminated assembly so as to realize satisfactory airtightness of a cell, and a technique for producing fuel cells that miniaturizes the fuel cells and realizes excellent resistivity of a proton exchange membrane (hereinafter, simply referred to as "PEM").

2. Description of the Related Art

The techniques of joining laser transmitting resin members and porous members have various uses, and this technique can be applied to, for example, membrane electrode joined bodies and cell structures of the fuel cells. Conventionally, such techniques are applied to the joining of different kinds of synthetic resin materials, and when two different kinds of synthetic resin materials are overlapped so as to be joined, one of the overlapped synthetic resin materials is made to be transmissive with respect to laser beams, and the other one is made to be absorptive with respect to laser beams. After a metal mesh whose melting point is higher than that of the synthetic resin materials is made to intervene on a joined surface of the synthetic resin materials, a laser beam is emitted from a direction of the laser transmitting synthetic resin material. This method for joining different kinds of synthetic resin materials has been proposed (see Japanese Patent Application Laid-Open No. 60-214929 (Patent Document 1)).

In this joining technique, when non-compatible laser absorptive resin and laser transmitting resin are joined, the metal mesh whose melting point is higher than these resins is made to intervene between the two kinds of the resins, and the two resins are entwined with the metal mesh so that the resins are joined to the metal mesh. As a result, the resins are mechanically joined.

In general, in a fuel cell, an electric cell, in which a separator is laminated on both sides of a planar membrane electrode assembly (hereinafter, simply referred to as "MEA"), compose one unit, and a plurality of electric cells are laminated so that a fuel cell stack is formed. The MEA has a three-layered structure in which an electrolyte membrane made of ion exchange resin or the like is held between a pair of gas diffusion electrodes forming a cathode and an anode. The gas diffusion electrodes are constituted so that a gas diffusion layer is formed on the outside of an electrode catalyst layer in contact with the electrolytic membrane. The separator is laminated so as to contact with the gas diffusion electrodes of the MEA, and a gas flow channel for circulating gas and a coolant flow channel are formed between the separator and the gas diffusion electrodes. According to such a fuel cell, for example, hydrogen gas as fuel is allowed to flow in the gas flow channel which faces the gas diffusion electrode on the anode side, and oxidizing gas such as oxygen or air is allowed to flow in the gas flow channel which faces the gas diffusion electrode on the cathode side. As a result, the electrochemical reaction is produced, and electricity is generated.

Since the fuel cells have the above structure, when the each units are laminated, the separators of the adjacent electric cells are overlapped. The laminated form is more concretely explained. The separators are constituted so that a resin layer is formed via a joint portion on the outer periphery of a metallic member, and the resin layers of the adjacent separators are overlapped. The joining technique for the resin layers is, therefore, applied to the joining technique for the separators.

The technique for joining the resin layers to be applied to the joining of the separators of the fuel cells includes the following. That is, when different kinds of synthetic resin materials are overlapped so as to be joined, one of the two different kinds of the synthetic resin materials is made to be not absorptive with respect to a laser and the other one is made to be absorptive with respect to a laser. After the two synthetic resin materials are overlapped, a laser is emitted from the direction of the nonabsorptive synthetic resin material, so that the synthetic resin materials are easily joined without reducing the strength of both the synthetic resin materials. Such a technique is disclosed in Japanese Patent Application Publication No. 62-49850 (see Patent Document 2). Moreover, one of the overlapped resin materials is a resin material that uses laser nonabsorptive coloring matter, and the other one is a resin material that uses laser adsorptive coloring matter. A technique for joining the resin materials is proposed in Japanese Patent Application Laid-Open No. 2001-71384 (Patent Document 3). Further, when the laser transmitting resins are joined, solid inorganic matter is allowed to intervene at their interface, a laser is aimed at the solid inorganic matter so that the solid inorganic matter is heated and both the resins are joined. This technique is disclosed in Japanese Patent Application Laid-Open No. 2001-232687 (see Patent Document 4).

Another technique relating to the method for joining separators of a fuel cell is explained below. The viscosity of the sealing agent at the time of application is set to 1000 to 9000 Pa·s, and application pressure, application speed, treatment temperature and treatment time are made to be appropriate so that a seal is formed. This technique is disclosed in Japanese Patent Application Laid-Open No. 2001-357861 (Patent Document 5). After a liquid seal is applied to groove portions corresponding to protruded portions of a polyelectrolytic membrane protruding from both electrodes, the polyelectrolytic membrane is held between a pair of separators so that temporary assembly is carried out, and the liquid seal is solidified in that state, so that a unit fuel cell is obtained. This technique is disclosed in Japanese Patent Application Laid-Open No. 2002-246044 (Patent Document 6). Further, a metal plate of a separator has a flow channel for fuel gas or oxidizing gas for fuel cell and flow channel for coolant, and a resin portion of the separator is has connecting holes for circulating fuel gas and oxidizing gas or coolant, whereby the separate for fuel cell is constituted. The separator is produced by integrally forming the metal plate and the resin portion by injection molding. This production technique is disclosed in Japanese Patent Application Laid-Open No. 2003-223903 (Patent Document 7).

Such fuel cells should realize excellent positioning or the like when the electric cell composed of MEA and the separator is formed or the electric cells are laminated in order to improve durability, airtightness and the like. In order to obtain high accuracy of positioning and the like, various techniques are proposed.

For example, the following fuel cell is disclosed in Japanese Patent Application Laid-Open No. 2000-12067 (Patent Document 8) as to the technique relating to positioning. In this fuel cell, a holding pin is inserted into a holding hole on a holding pin insertion side and a holding hole on a retaining ring insertion side so as to be combined with a retaining ring so as to hold an electric cell. A front edge of the holding pin is protruded from an outer surface of a separator and is fitted into a pin front edge insertion hole provided to one end of the holding pin of the adjacent electric cell so that the electric cells are laminated. The Patent Document 7 discloses the technique that improves corrosion resistance and airtightness of the fuel cell by the locating, and the Patent Document 2 discloses the joining technique for the resin layer that facilitates the joining between members and improves design effect by the locating.

In these conventional techniques, the metal mesh structure as the porous member to be used in the joining technique disclosed in the Patent Document 1 has a mesh form shown in FIG. 2. For this reason, in the case in which the resin is entwined with the metal mesh, the peel strength is heightened only in a specified direction (up-down and right-left directions in FIG. 2), and sufficient peel strength cannot be obtained in a residual direction (a direction vertical to a paper surface in FIG. 2). In recent years, therefore, the development of a method for joining the resin members and the porous members is demanded. The method is a method in which the peel strength is improved particularly in a thicknesswise direction of porous members so that the sufficient peel strength can be obtained in any directions, thereby sufficiently preventing peel in a specified direction.

The techniques disclosed in the Patent Documents 2 and 3, the same kind of materials are not directly joined, and laser absorptive resin should be used as a mating material of laser transmitting resin. The technique disclosed in the Patent Document 4 requires another member (solid inorganic matter) which absorbs a laser so as to generate heat when laser transmitting resins are joined. When, therefore, the techniques disclosed in the Patent Documents 2 to 4 are used so that resins are joined, plural kinds of members are required, and thus the production cost is high.

In the technique disclosed in the Patent Document 5, it is necessary to harden the liquid seal at a temperature and for a time within a range where components of MEA such as a solid polymer membrane and a catalytic electrode are not damaged. In the technique disclosed in the Patent Document 6, when differential pressure is applied to PEM that is present between a seal and a diffusion layer of the solid polymer electrolytic membrane exposed in the technique of the above Patent Document 5, excellent durability cannot be realized. Further, in the technique disclosed in the Patent Document 7, although the problem of the durability of the PEM can be solved, the separator is independent from the MEA, and excellent laminated assembly property cannot be realized. When a defective cell is replaced, a sealing position of another cell shifts, thereby deteriorating the airtightness of the cells.

In consideration of such situations, in recent years, in order to reduce the production cost, for example, the development of a technique of joining resin layers without members other than the laser transmitting resin is demanded. When the each unit of the fuel cell is joined, the development of a joining technique that enables satisfactory joining without complicatedly setting temperature and time at the time of thermosetting the resin is demanded. Further, the development of a method for joining thermoplastic resin and a fuel cell using this joining method is demanded. This method and fuel cell has a characteristic in which excellent durability is realized even when a differential pressure is applied to PEM and the excellent laminated assembly property is realized so that a shift of the sealing position of another cell is prevented at the time of replacing a defective cell, and excellent airtightness of the cells can be realized.

In addition, when the units of the fuel cell are laminated, a rubber seal or the like is generally used between the separators for holding the MEA. Since, however, dispersion of dimensional accuracy of the respective members in the units, dispersion of surface roughness and contact pressure of the seal surface, elution of defected impurity due to creep and hardening of materials, and the like are concerned, development of techniques that radically solve the problems of durability and productivity is demanded. The cells can be assembled by using the liquid seal, but since the assembly requires high-temperature calcination, this possibly exerts a harmful influence on the membrane and the catalyst of MEA. As a result, calcinating temperature and time are limited, and thus excellent productivity cannot be realized. Since the MEA is manually located in such cases, a shift occurs at the time of assembly, and various defects occur.

In the technique disclosed in the Patent Document 8, when the solid polymer fuel cell is assembled, a polymeric resin layer is hydrated into a saturation state, so that a PEM with low resistivity is formed. This excellent resistivity is, however, attenuated by drying of the membrane. In this technique, the electric cells are formed by holding MEA between the separators having seal, and after the drying of PEM is prevented at this stage, the electric cells are laminated so that the assembly of the fuel cell is formed. In this case, when the electric cells are formed, a structure in which a pair of the separators and the polymer membrane are pitted and they are fastened by pins or the like is adopted. For this reason, a pin fastening portion occupies a large area, and thus it is difficult to miniaturize the fuel cell.

In the technique disclosed in the Patent Document 7, in the structure of the separators for forming electric cells, an electrode corresponding portion is made of metal, a connecting hole for connecting a fluid is made of a resin layer, and a pin fastening portion for assembling the electric cells is omitted. For this reason, in this technique, the production process is simplified in comparison with the technique of the Patent Document 8. Since, however, the seal material is used, it is difficult to completely prevent the drying of the membrane.

The technique disclosed in the Patent Document 2 is the method for easily joining different kinds of the synthetic resin layer materials by laser without deteriorating the strength of the synthetic resin layer materials. This technical literature, however, does not describe that this technique can be applied to the fuel cell, and such a use is not examined.

In consideration of the situation, in recent years, the development of the following technique is demanded. In this technique, a pair of separators and the polymer membrane are not pitted, and they are joined without using a mechanical fastening unit such as pins, so that the fuel cell is miniaturized. Further, in order to realize excellent resistivity of the PEM, the development of a technique for preventing the drying of PEM is demanded. If the joining technique for different kinds of synthetic resin layer materials in the Patent Document 2 can be applied to the fuel cells, remarkable development of technology can be expected in the future in the field of fuel cells.

SUMMARY OF THE INVENTION

The present invention was made in view of the above situations, and objects thereof are specifically to provide:

(1) a method for joining a laser transmitting resin member and a porous member that sufficiently prevents peeling in a specified direction and improves overall peel strength;

(2) a method for joining thermoplastic resin in which when laser transmitting resins are joined, members other than the laser transmitting resin are not required, thereby facilitating material handling, reduction in production cost is realized, and excellent laminated assembly form of cells is realized so that satisfactory airtightness of the cells can be realized, and a fuel cell formed by using the joining method; and (3) a fuel cell which is miniaturized by applying the joining method for different kinds of synthetic resin materials to the fuel cell, and joining a pair of separators and a polymeric membrane not using a mechanical fastening unit such as pins, and prevents drying of PEM in order to realize excellent resistivity of PEM.

That is, a method for joining a laser transmitting resin member and a porous member (the first aspect of the invention) includes the steps of laminating the laser transmitting resin member and the porous member, emitting laser from a side of the laser transmitting resin member, heating the porous member so as to melt the laser transmitting resin member, impregnating the melted resin into voids of the porous member, and cooling to solidify it.

In such a joining method, it is preferable that a plurality of voids be connected in a thicknesswise direction of the porous member (the second aspect of the invention).

In view of the above situation, the inventors have keenly and specifically examined a form of joining the laser transmitting resin layers present on an outer peripheral portion of the separator in which members other than the laser transmitting resin are not used. As a result, the inventors optimized laser transmission efficiency of the thermoplastic resin, a melting point of the thermoplastic resin, energy density of the laser, an emitting speed of the laser and the like when the laser transmitting thermoplastic resins are used so as to find the thermoplastic resin joining method that satisfies the above various demands. As a result, they completed the invention. The invention is devised in view of such knowledge.

That is, a thermoplastic resin joining method for melting and joining an interface between laser transmitting thermoplastic resins composed of resin or resin and fillers by means of laser emission (third aspect of the invention), has the following requirement; energy of the laser is designated by W(w), a laser emitting speed is designated by S (mm/s), a laser spot diameter is designated by D (mm), laser transmission efficiency of the thermoplastic resin is designated by Tr, a melting thickness of the thermoplastic resin is designated by Th (mm), specific gravity of the thermoplastic resin is designated by SG (g/cm$^3$), a melting point of the thermoplastic resin is designated by MP (K), and specific heat at constant pressure of the thermoplastic resin is designated by Cp (kJ/kg·K), the following equation is satisfied.

$$0.7 \leq \frac{W \times Tr}{S \times D \times Th \times SG \times 10^{-3} \times MP \times Cp} \leq 1.3$$

In such a thermoplastic resin material joining method, it is desirable that plural thermoplastic resins be laminated, when a plurality of interfaces between the thermoplastic resins are present, after one interface is joined by laser emission, next interface which is the closest interface of the one interface is joined by laser emission, and such an operation is repeated so that a plurality of the interfaces are successively joined (the fourth aspect of the invention). It is preferable that after one interface group composed of plural interfaces adjacent in a laser emitting direction be joined by single laser emission, a next interface group of plural interfaces adjacent in a laser emitting direction which is adjacent to the former interface group in the laser emitting direction be joined by single laser emission, and that such an operation be repeated so that a plurality of the interfaces are successively joined (fifth aspect of the invention).

The invention also relates to the fuel cell using the thermoplastic resin joining method mentioned above. The fuel cell (sixth aspect of the invention) is constituted so that a plurality of electric cells, which are obtained by holding a MEA having a catalytic resin and a diffusion resin on both surfaces of an electrolytic membrane between a pair of separators, are laminated. The separators have a metallic internal member and a thermoplastic resin provided at an outer peripheral portion of the metallic internal member, and the thermoplastic resins are joined by the above joining method so that the separators are joined. The joining method is a joining method according to any one of the third to the fifth aspects of the inventions.

The fuel cell of the invention (seventh aspect of the invention) is constituted so that a plurality of electric cells, which are obtained by holding a MEA having a catalytic layer and a diffusion layer on both surfaces of an electrolytic membrane between a pair of separators, are laminated. The separators have a metallic internal member and a thermoplastic resin layer provided to an outer peripheral portion of the metallic internal member. The thermoplastic resin layer composing one separator is a laser transmitting resin layer, and the thermoplastic resin layer composing the other separator is a laser absorptive resin layer. Laser is emitted from a side of the laser transmitting resin layer in a state that the paired separators are laminated, and the laser absorptive resin layer is melted so that the adjacent resin layers are joined.

In the seventh aspect of the invention, it is desirable that a laser emitted portion form a circular body in plan views of the adjacent separators, and that the MEA be positioned in the circular body (eighth aspect of the invention).

In the seventh and the eighth aspects of the invention, it is desirable that when the separator having the laser transmitting resin layer is joined to the separator having the laser absorptive resin layer, these adjacent separators hold the MEA and the laser be simultaneously emitted (ninth aspect of the invention).

In the seventh to the ninth aspects of the invention, it is preferable that the laser transmitting resin layers composing the two separators which are not adjacent to each other hold the laser absorptive resin layer composing the separator adjacent to both the two separators, and two interfaces formed by the three resin layers be simultaneously joined (tenth aspect of the invention). It is desirable that the laser transmitting resin layers composing the two separators have a protrusion, the two adjacent laser transmitting resin layers hold the laser absorptive resin layer composing the separator adjacent to the two separators, and three interfaces formed by the three resin layers be simultaneously joined (eleventh aspect of the invention). It is desirable that the two adjacent separators have the laser absorptive resin layers, respectively, the laser transmitting resin layer is provided to outer peripheral portions of the laser absorptive resin layers, the two separators are laminated, and four interfaces formed by the four resin layers are simultaneously joined (twelfth aspect of the invention). In the sixth aspect of the invention, it is desirable that a plurality of electric cells constituted by simultaneously joining the four interfaces be laminated, and the four interfaces formed in vicinities of joined points of the electric cells be simultaneously joined by emitting a laser beam (thirteenth aspect of the invention).

In the seventh to the thirteenth aspect of the inventions, it is desirable that when the two laser transmitting resin layers composing the two adjacent separators are laminated, the laser absorptive resin layer be arranged between the two laser transmitting resin layers, so that two interfaces are formed by the three resin layers, and while the MEA is being held between the two separators, the laser beam is emitted, so that the two interfaces are simultaneously joined (fourteenth aspect of the invention). In the fourteenth aspect of the invention, it is preferable that a plurality of electric cells constituted by simultaneously joining the two interfaces be laminated, the laser absorptive resin layer be arranged between the electric cells so that the two interfaces are formed, and the two interfaces be simultaneously joined by emitting a laser beam (fifteenth aspect of the invention).

In the seventh to the fifteenth aspects of the invention, it is desirable that the laser transmitting resin layer composing the separator and the MEA having the laser absorptive member be laminated, the laser be emitted from the side of the laser transmitting resin layer so that the laser absorptive member of the MEA is melted, and the separator and the MEA be joined (sixteenth aspect of the invention). It is desirable that the laser transmitting resin layer composing the separator and the MEA hold a heat absorptive material so that two interfaces are formed, a laser beam be emitted from the side of the laser transmitting resin layer so that the heat absorptive material is melted, and the two interfaces be simultaneously joined (seventeenth aspect of the invention).

The seventh to the seventeenth aspects of the invention are important feature of the invention relating to the joining form for the components of the fuel cell. More preferable aspect of the inventions relating to material selection and the like for the components of the fuel cell are described below.

In the seventh to the seventeenth aspects of the invention, it is desirable that a thermoplastic resin layer (PPS, LCP, PEEK or PC) or a thermoplastic resin layer (PPS, LCP, PEEK or PC) coated with silicone rubber be used as the laser transmitting resin layer (eighteenth aspect of the invention). Further, it is desirable that a thermoplastic resin layer (PPS, LCP, PEEK or PC) impregnated with carbon or pigment be used as the laser absorptive resin layer (nineteenth aspect of the invention).

In the sixteenth aspect of the invention, it is desirable that a gas transmitting metal material (metallic foam or fine-gage wire metal felt) or a carbon material be used as the laser absorptive member of the MEA (twentieth aspect of the invention). In the seventeenth aspect of the invention, it is desirable that a thermoplastic resin layer (PPS, LCP, PEEK or PC) or a thermoplastic resin layer (PPS, LCP, PEEK or PC) impregnated with carbon or pigment be used as the heat absorptive member (twenty-first aspect of the invention).

In the fourteenth aspect of the invention, it is desirable that the laser absorptive resin layer be integrated with the laser transmitting resin layer by injection-molding or adhering after the laser transmitting resin layer is formed (twenty-second aspect of the invention). In the twelfth aspect of the invention, it is desirable that the laser transmitting resin layer be integrated with the laser absorptive resin layer by injection-molded or adhering after the laser absorptive resin layer is formed (twenty-third aspect of the invention).

In the sixteenth aspect of the invention, it is desirable that the laser absorptive member of the MEA be composed of a PEM, a large diffusion layer which is positioned on one side of the PEM and whose surface area is comparatively large, and a small diffusion layer which is positioned on the other side of the PEM and whose surface area is smaller than that of the large diffusion layer, the large diffusion layer is composed of a metallic member or a carbon material, and the large diffusion layer is integrally formed with the resin layer of the adjacent separator (twenty-fourth aspect of the invention). In the sixteenth and the twenty-fourth aspects of the invention, it is desirable that a reinforcing rib be provided to at least one of an outer peripheral portion of the laser absorptive member of the MEA and an internal peripheral portion of a connecting hole (twenty-fifth aspect of the invention).

In the sixteenth, the twenty-fourth and the twenty-fifth aspects of the invention, it is desirable that an assembly guide hole be provided to the outer peripheral portion of the laser absorptive resin member of the MEA (twenty-sixth aspect of the invention). In the twelfth and the fourteenth inventions, it is desirable that adhesive be applied to an exposed interface of a PEM of the MEA so that a seal is formed (twenty-seventh aspect of the invention).

According to the joining method (the first and the second aspects of the invention) of the present invention, the melted resin enters into the voids of the porous member, and is cooled to be solidified, so that the laser transmitting resin member and the porous member can be firmly and three-dimensionally joined. In such a joining form, since the firm joining is three-dimensionally achieved, peeling in a specified direction can be sufficiently prevented. That is, according to the present invention, directional property of the peel can be eliminated, and the peel strength can be uniformly obtained in any direction, thereby improving the overall peel strength of the joined body. When a plurality of voids are connected in the thicknesswise direction of the porous member, as shown in FIG. 3, the voids 1 are additionally thickly present in the thicknesswise direction of the porous member. For this reason, when the melted resin 3 enters into the voids 1, the melted resin 3 additionally starts to flow to multiple directions according to the connecting form of the voids 1. Even when, however, the peeling occurs, its strength can be three-dimensionally and more uniformly dispersed. In the present invention, when the laser transmitting resin member and the porous member are joined, since the porous member is not heated nor does adhesive intervene between the members, excellent productivity can be realized. In the present invention, since local heating is not carried out at the time of joining, it is not necessary to separate the members to be used from peripheral parts which are not resistant to heat, thereby miniaturizing various devices including the obtained joined body.

According to the invention (the third to the sixth aspects of the invention), in the joining of the laser transmitting thermoplastic resins, laser transmission efficiency of the thermoplastic resin, a melting point of the thermoplastic resin, energy density of the laser, an emitting speed of the laser and the like are optimized. As a result, members other than the laser transmitting resin are not necessary, and when the fuel cell is produced, material handling can be facilitated and the production cost can be reduced. Since a rubber seal or the like is not used between the separators for holding the MEA, unlike in the conventional technique, dispersion of dimensional accuracy of the respective members in the units, dispersion of surface roughness and contact pressure of the seal surface, and elution of deteriorated impurity due to creep and hardening of materials can be prevented. Therefore, various problems such as durability and productivity are fundamentally solved, and the excellent lamination assembly is realized, thereby realizing satisfactory airtightness of the cells. When a value of the equation in the third invention is less than 0.7, the vicinity of the interfaces of the laminated resins is not melted, and when the value exceeds 1.3, voids are generated in the interface, and thus the adhesion is not satisfactorily achieved.

According to the present invention (the seventh to the twenty-seventh aspects of the invention), the joining technique for different kinds of synthetic resin layer materials is applied, and a pair of separators and a polymeric membrane are joined without using a mechanical fastening unit such as pins, thereby realizing miniaturization. In order to realize excellent resistivity of PEM, drying of PEM is prevented. The fuel cell having such a structure can be provided. Concretely, in the seventh aspect of the invention, the joining technique for different kinds of the synthetic resin layer materials is applied, a pair of separators and a polymeric membrane are joined without using a mechanical fastening unit such as pins, thereby realizing the miniaturization. In the eighth aspect of the invention, drying of PEM is prevented, and excellent resistivity of PEM can be realized. The ninth to the twenty-seventh aspects of the invention are a variety of inventions based on the seventh and the eighth aspects of the invention.

The other effects of the present invention (the seventh to the twenty-seventh aspects of the invention) in comparison with the conventional technique are explained below. That is, a cell stack structure which required high reliability of a seal conventionally has defects such as dispersion of accuracy of a height of a rib seal portion made of a silicone material and roughness of a seal surface, dispersion of contact pressure at the time of lamination, reduction in the seal property due to thermal deterioration, reduction in burst withstand pressure at the time of abnormal pressure, and gas transmission. According to the present invention, however, all these problems are solved by the above various structures. In the invention, since the joining using the laser emission is adopted, a seal which is conventionally used is not necessary. For this reason, a lamination load on a resin frame surface is not necessary, and management of a balance between seal contact pressure and electrode contact pressure which is conventionally necessary is not necessary. As a result, the management of the contact pressure by means of the load of only the electrode portion can be facilitated by variations of the invention (at least one of the following preferable embodiments).

Further, conventionally, warpage and swelling easily occur on a pressed separator composed of a resin frame and the electrode portion which is thinly formed after molding, application of a liquid seal or the like is carried out with very low productivity, and thus it is difficult to form a cell. In the present invention (the seventh to the twenty-seventh aspects of the invention), however, even if warpage and swelling occur in the separator at the time of the joining process, the joining interface is adhered by a transparent retaining jig made of glass, acrylic resin, PC or the like which can be corrected at the time of laser joining, so that the laser joining is easy. For this reason, high productivity can be realized.

BRIEF DESCRIPTION OF THE DRAWINGS

FIG. 42F is a plan view illustrating the separator side surface of the frame in the respective components in the case where the separator 671, the MEA 672 and the frame 673 shown in FIG. 40A are temporarily assembled.

FIG. 43A is a plan view illustrating the cooling surface of the cathode separator in the respective separators in the fuel cell partially shown in FIGS. 41A to 41C.

FIG. 43B is a plan view illustrating the power generating surface of the cathode separator in the respective separators in the fuel cell partially shown in FIGS. 41A to 41C.

FIG. 43C is a plan view illustrating the cooling surface of the anode separator in the respective separators in the fuel cell partially shown in FIGS. 41A to 41C.

FIG. 43D is a plan view illustrating the power generating surface of the anode separator in the respective separators in the fuel cell partially shown in FIGS. 41A to 41C.

FIG. 44A is a partial sectional view illustrating the components of the electric cell in the fuel cell according to another preferable embodiment of the invention.

FIG. 44B is a partial sectional view illustrating a joining form of the electric cells according to another preferable embodiment of the invention.

FIG. 44C is a plan view illustrating the separator 751 shown in FIGS. 44A and 44B according to another preferable embodiment of the invention.

FIG. 45A is a partial sectional view illustrating the components of the electric cell in the fuel cell according to another preferable embodiment of the invention.

FIG. 45B is a partial sectional view illustrating a joining form of the electric cell according to another preferable embodiment of the invention.

FIG. 46A is a partial sectional view illustrating a vicinity of the coolant flow channel in an adhesion state of the respective sections in the fuel cell shown in FIGS. 45A and 45B.

FIG. 46B is a partial sectional view illustrating a vicinity of the oxidizing gas flow channel in an adhesion state of the respective sections in the fuel cell shown in FIGS. 45A and 45B.

Figure 45A:
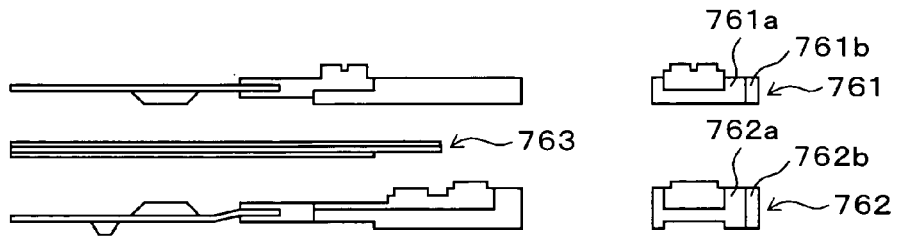
Figure 45B:
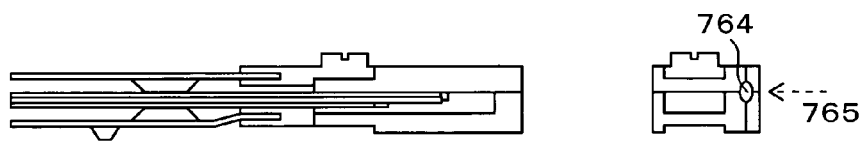
Figure 46A:
Figure 46B:
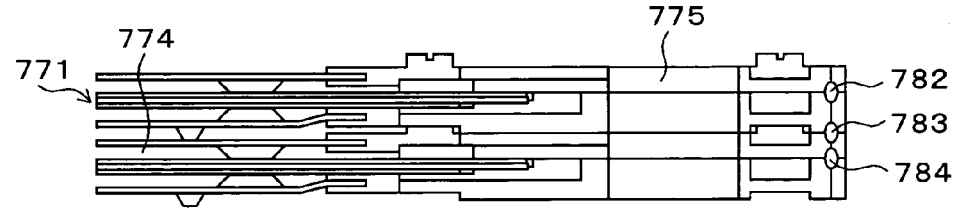
Figure 46C:

FIG. 46C is a partial sectional view illustrating a vicinity of the fuel gas flow channel in an adhesion state of the respective sections in the fuel cell shown in FIGS. 45A and 45B.

Figure 47A:
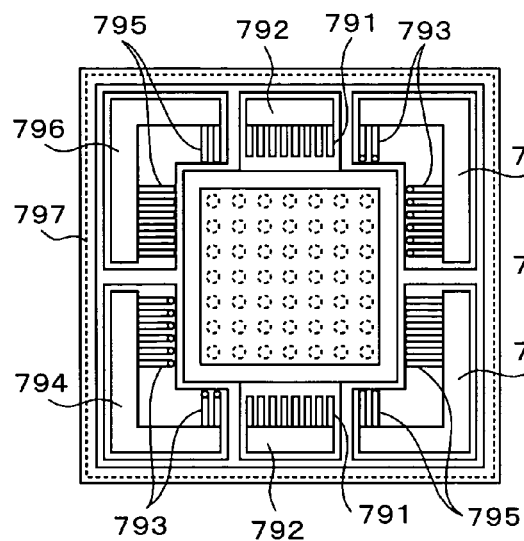

FIG. 47A is a plan view illustrating the cooling surface of the cathode separator in the respective separators in the fuel cell partially shown in FIGS. 46A to 46C.

Figure 47B:
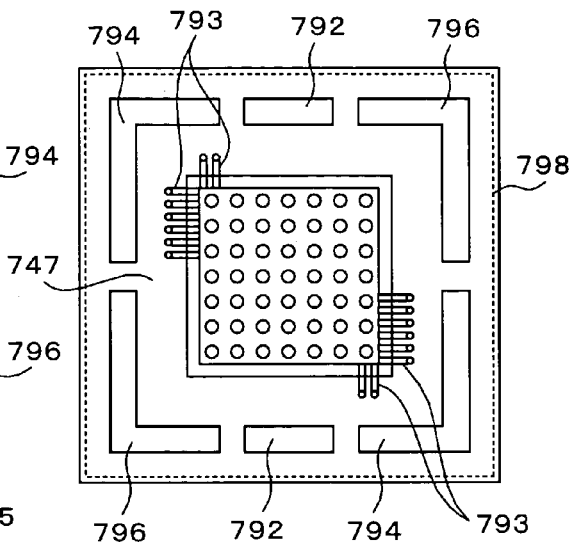

FIG. 47B is a plan view illustrating the power generating surface of the cathode separator in the respective separators in the fuel cell partially shown in FIGS. 46A to 46C.

Figure 47C:
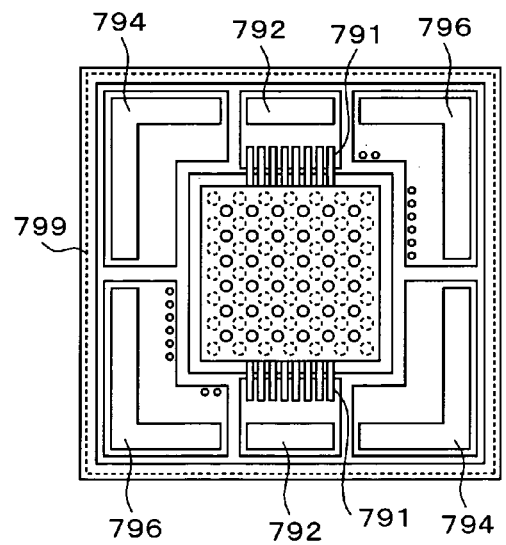

FIG. 47C is a plan view illustrating the cooling surface of the anode separator in the respective separators in the fuel cell partially shown in FIGS. 46A to 46C.

Figure 47D:
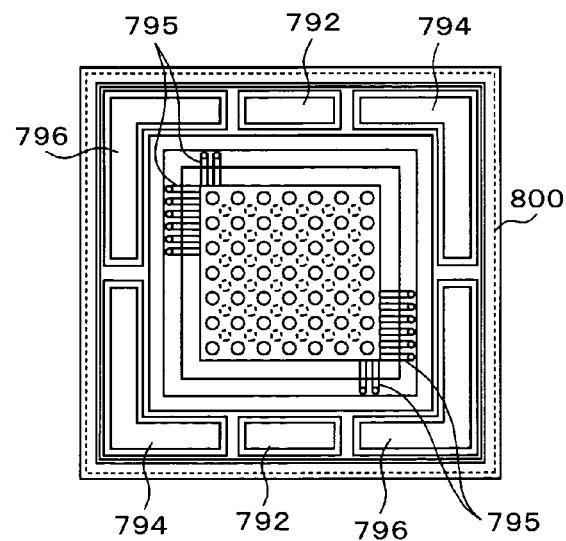

FIG. 47D is a plan view illustrating the power generating surface of the anode separator in the respective separators in the fuel cell partially shown in FIGS. 46A to 46C.

Figure 48A:
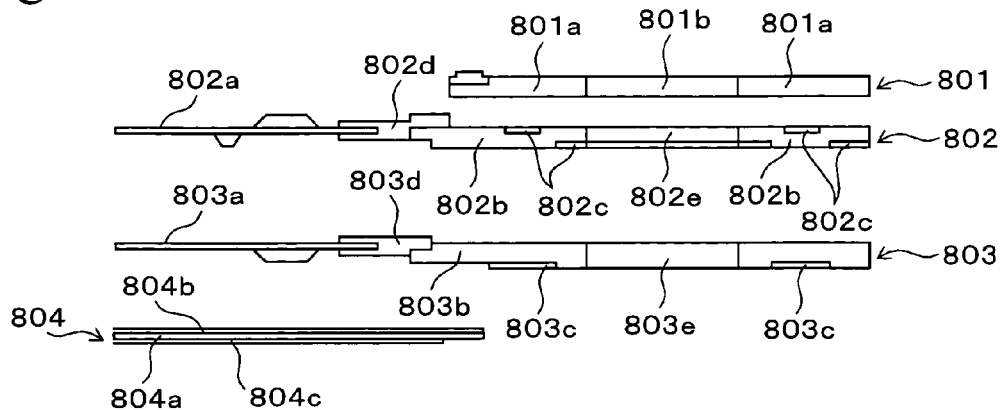

FIG. 48A is a partial sectional view illustrating the components of the electric cell in the fuel cell according to another preferable embodiment of the invention.

Figure 48B:
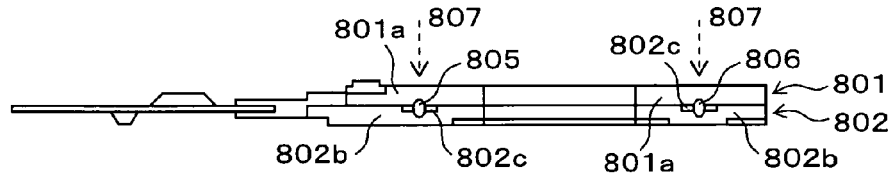

FIG. 48B is a partial sectional view illustrating the joining form of the frame and the separators according to another preferable embodiment of the invention.

Figure 48C:
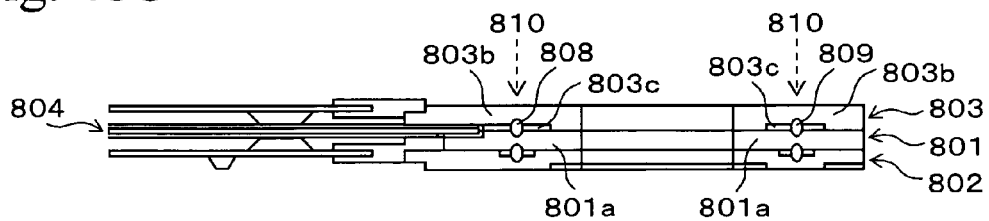

FIG. 48C is a partial sectional view illustrating the joining form of the electric cells according to another preferable embodiment of the invention.

Figure 48D:
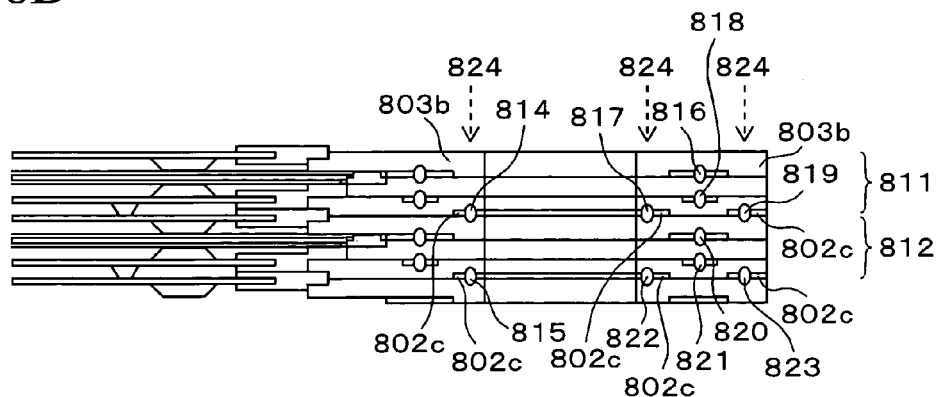

FIG. 48D is a partial sectional view illustrating the fuel cell obtained by laminating the electric cells according to another preferable embodiment of the invention.

Figure 49A:
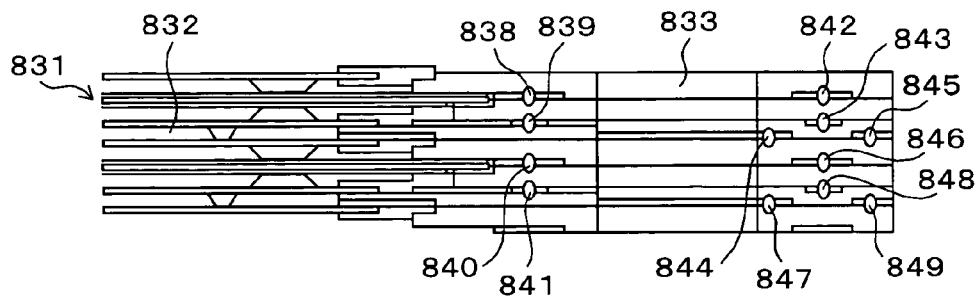

FIG. 49A is a partial sectional view illustrating a vicinity of the coolant flow channel in the adhesion state of the respective sections in the fuel cell shown in FIGS. 48A to 48D.

Figure 49B:
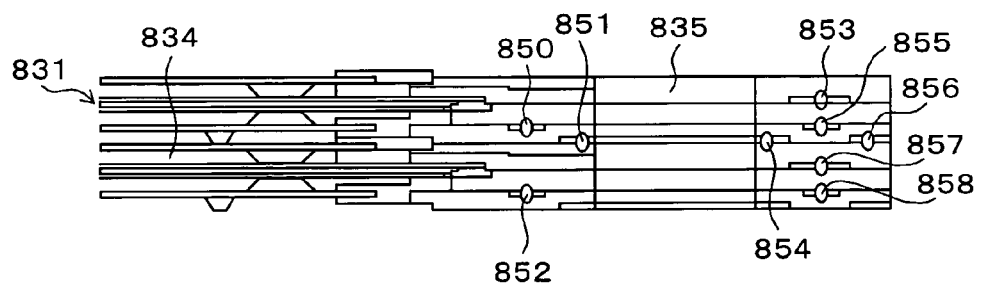

FIG. 49B is a partial sectional view illustrating a vicinity of the oxidizing gas flow channel in the adhesion state of the respective sections in the fuel cell shown in FIGS. 48A to 48D.

Figure 49C:
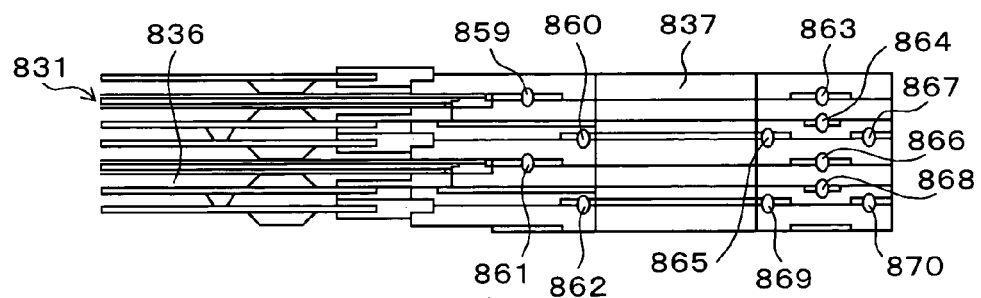

FIG. 49C is a partial sectional view illustrating a vicinity of the fuel gas flow channel in the adhesion state of the respective sections in the fuel cell shown in FIGS. 48A to 48D.

Figure 50A:
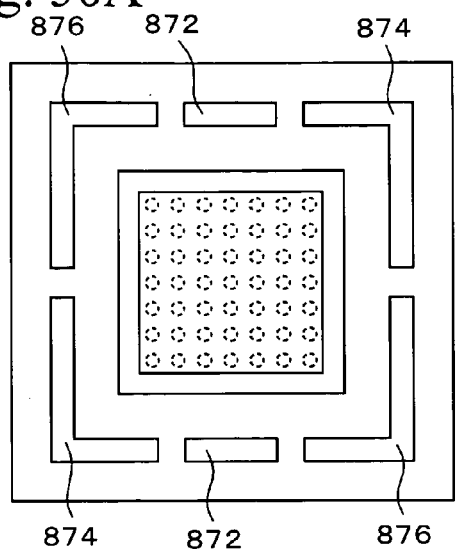

FIG. 50A is a plan view illustrating the cooling surface of the separator 803 shown in FIG. 48A in the respective components excluding MEA of the electric cell shown in FIG. 48C.

Figure 50B:
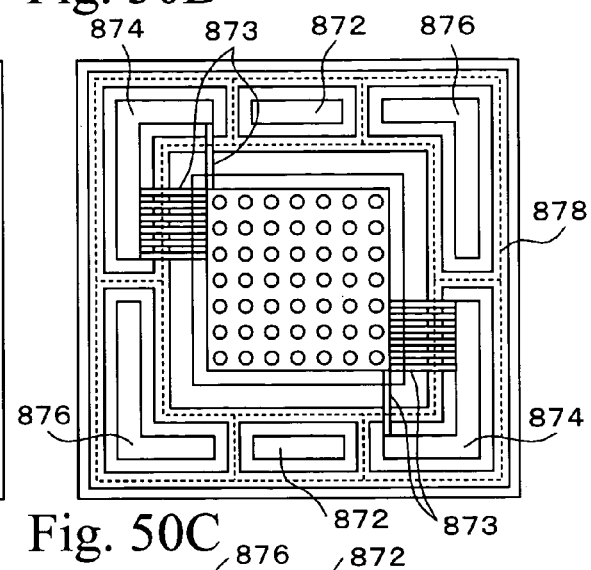

FIG. 50B is a plan view illustrating the power generating surface of the separator 803 in the respective components excluding MEA of the electric cell shown in FIG. 48C.

Figure 50C:
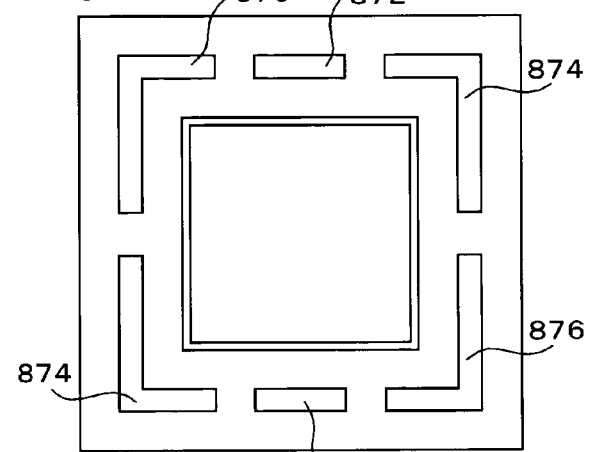

FIG. 50C is a plan view illustrating the power generating surface of the frame 801 in the respective components excluding MEA of the electric cell shown in FIG. 48C.

Figure 50D:
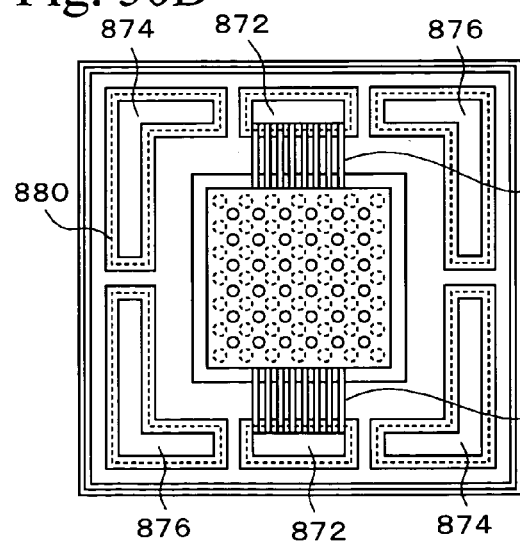

FIG. 50D is a plan view illustrating the cooling surface of the separator 802 in the respective components excluding MEA of the electric cell shown in FIG. 48C.

Figure 50E:
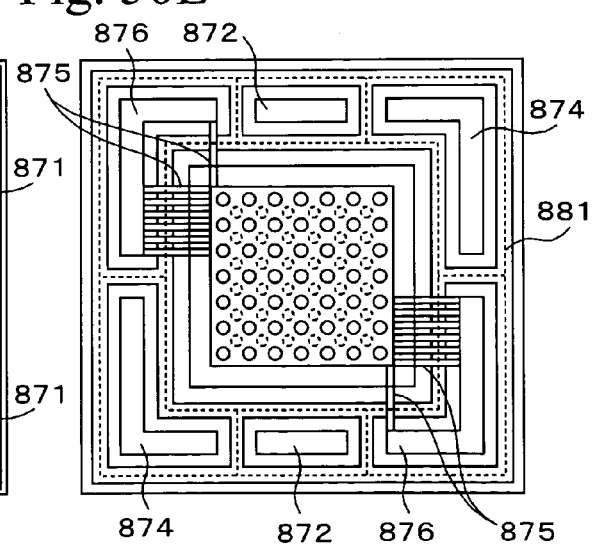

FIG. 50E is a plan view illustrating the power generating surface of the separator 802 in the respective components excluding MEA of the electric cell shown in FIG. 48C.

Figure 51A:
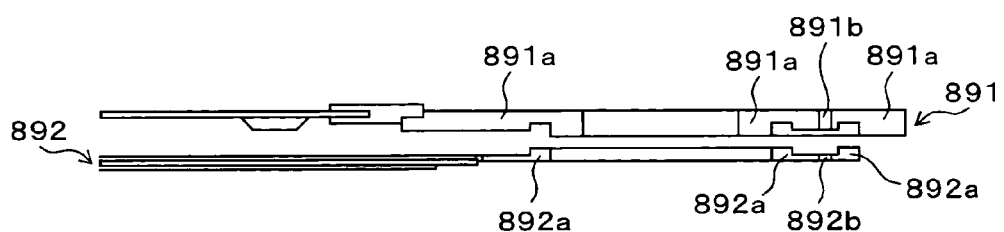

FIG. 51A is a partial sectional view illustrating a part of the components of the electric cell in the fuel cell according to another preferable embodiment of the invention.

Figure 51B:
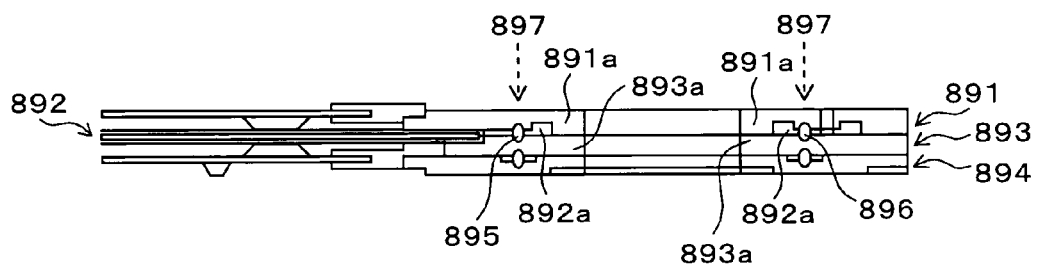

FIG. 51B is a partial sectional view illustrating the joining form of the electric cells according to another preferable embodiment of the invention.

DETAILED DESCRIPTION OF THE PREFERRED EMBODIMENTS

Preferable embodiments of the present invention are explained in detail below with reference to the drawings.

Embodiments of the First and the Second Aspects of the Invention

When a method for joining a laser transmitting resin member and a porous member according to the invention is carried out, for example, PEEK, PPS, LCP, PC, acrylic or the like can be used as the laser transmitting resin member.

Stainless steel, Ti, Fe, Ni, Cr, Ni alloy steel, or Cr alloy steel can be used as the porous member. Alloy composed of at least one of Al, Cu, Mg and Zn, metallic foam composed of laser absorptive heat generating metal of noble metal such as Ag and Au, powder sintered compact, or fine-gage wire sintered compact can be used as the porous member. Further, a laser absorptive fibrous body such as carbon paper, carbon cloth and carbon felt (non-woven fabric) can be used as the porous member.

Figure 4A:
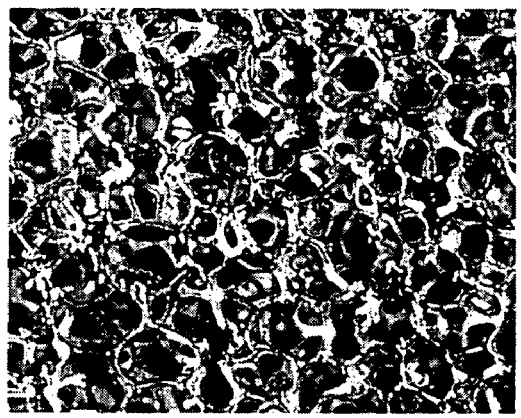
FIG. 4A is a photograph illustrating metallic foam as a concrete example of the preferable porous member in the joining method for the present invention.
Figure 4B:
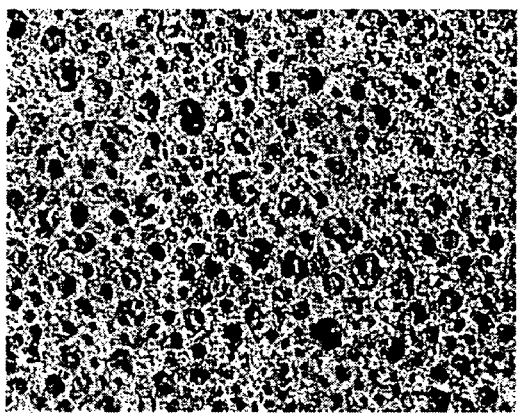
FIG. 4B is a photograph illustrating a metallic foam as a concrete example of the preferable porous member in the joining method for the present invention.
Figure 4C:
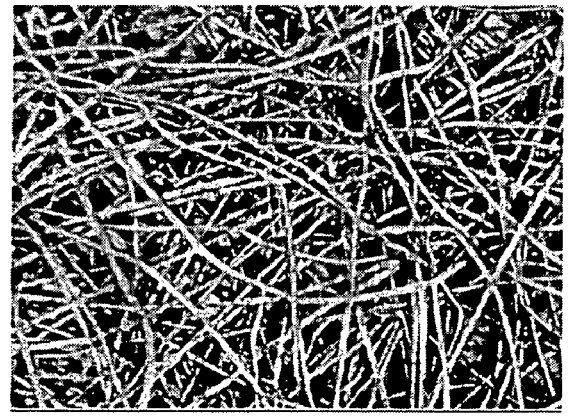
FIG. 4C is a metal fine-gage wire sintered compact as a concrete example of the preferable porous member in the joining method for the present invention.
Figure 5A:
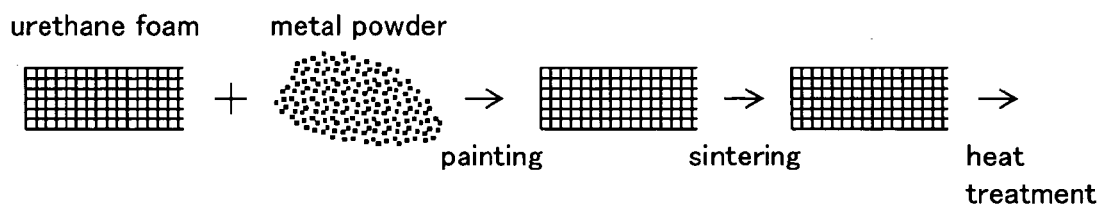
FIG. 5A is a diagram illustrating process of producing the metallic foam shown in FIG. 4A.
Figure 5B:
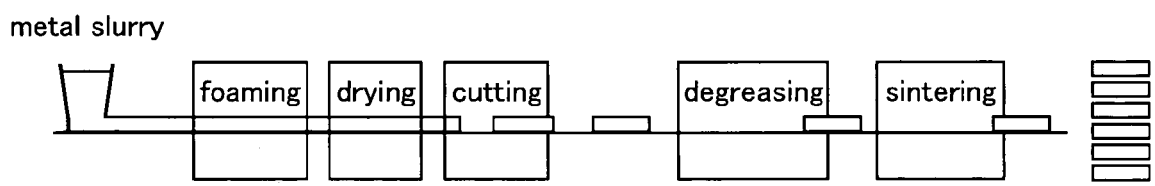
FIG. 5B is a diagram illustrating a process of producing the metallic foam shown in FIG. 4B.

FIGS. 4A to 4C are photographs illustrating concrete examples of the porous member preferable for the joining method of the present invention. That is, FIGS. 4A and 4B illustrate metallic foam, and FIG. 4C illustrates a metal fine-gage wire sintered compact. The metallic foam shown in FIG. 4A is obtained by painting metal powder to urethane foam, sintering and giving predetermined heat treatment to the urethane foam with the metal powder as shown in FIG. 5A. The metallic foam shown in FIG. 4B is obtained by successively foaming, drying, cutting, degreasing and sintering molten metal using metal slurry as shown in FIG. 5B. Further, the metal fine-gage wire sintered compact shown in FIG. 4C is obtained by cutting a fine-gage wire obtained by a molten extracting method, randomly arranging the cut wires and sintering them.

Figure 6A:
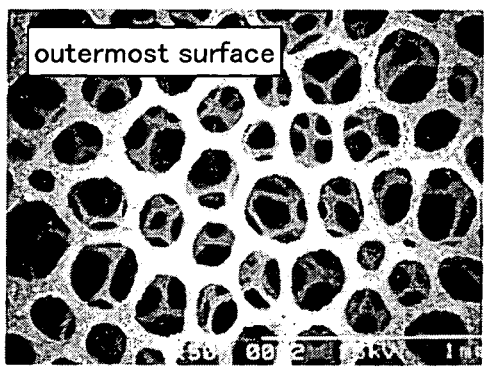
FIG. 6A is a photograph illustrating a case where a skeleton including metal is thickened as a manufacturing example of the metallic foam shown in FIG. 4B.
Figure 6B:
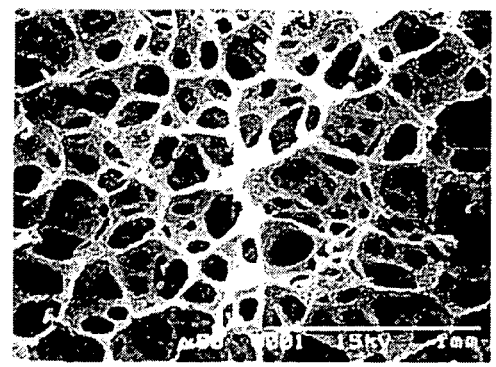
FIG. 6B is a photograph illustrating a case where the skeleton including metal is thinned as a manufacturing example of the metallic foam shown in FIG. 4B.
Figure 7:
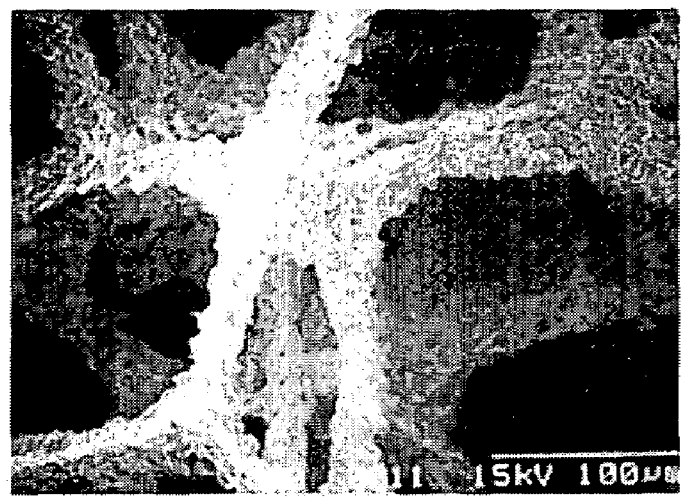
FIG. 7 is an enlarged diagram illustrating the skeleton of the metallic foam shown in FIG. 6B.

With such a manufacturing method, for example, the metallic foam shown in FIG. 4B can be formed into various shapes as shown in FIGS. 6A and 6B by suitably changing the component of the metal slurry and the steps of foaming and degreasing in the production method shown in FIG. 5B. Since the metallic foam shown in FIG. 6A has a thick skeleton including a metal component and the skeleton is orderly arranged in a direction parallel with a paper surface, its peel strength particularly in the direction parallel with the paper surface is strong. In contrast, since the metallic foam shown in FIG. 6B has a thin skeleton including a metal component, its peel strength in the direction parallel with the paper surface is inferior to that of the metallic foam shown in FIG. 6A, but the skeleton does not extend in the direction parallel with the paper surface in a biased manner and is randomly arranged. For this reason, the directional property of peel can be further reduced, and as a result, the sufficient peel strength is provided. FIG. 7 is an enlarged diagram illustrating the skeleton of the metallic foam shown in FIG. 6B, and it is found that pores sufficiently spread three-dimensionally.

After the laser transmitting resin member and the porous member are prepared and are laminated, a laser is emitted from a side of the laser transmitting resin member. As a result, the laser which transmits through the laser transmitting resin is absorbed by the porous member so that heat is generated, and the laser transmitting resin elutes around an interface between the laser transmitting resin member and the porous member due to the heat. The melted resin is impregnated in the holes from the surface of the porous member. As to impregnating forms, the resin is welded into a wedge shape, or protruded fiber bites into the surface of the porous member, and the anchoring state of both of them is secured due to these forms.

Figure 1:
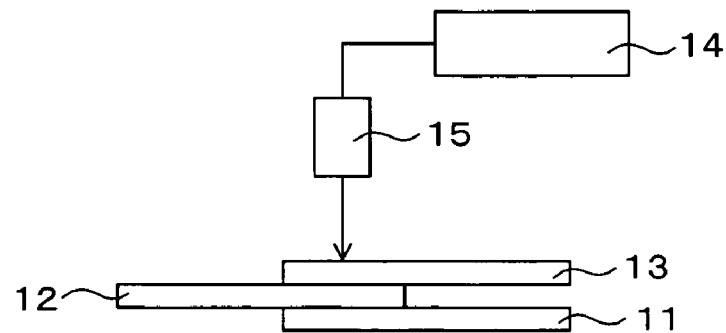
FIG. 1 is a diagram illustrating a joining method according to a preferable embodiment of the present invention.
Figure 2:
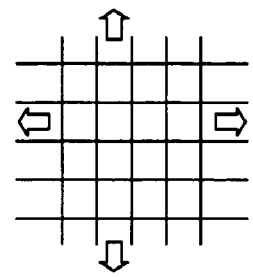
FIG. 2 is a plan view illustrating a metal mesh as a porous member used in a prior technique.
Figure 3:
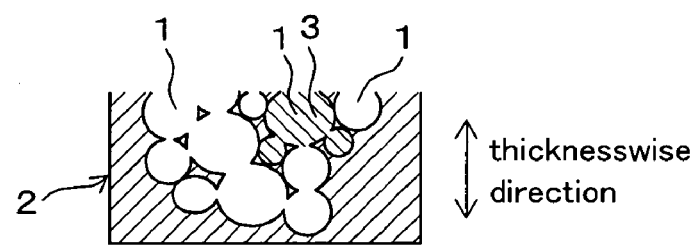
FIG. 3 is a sectional view of a joined body obtained by the joining method for the present invention.

FIG. 1 is a diagram illustrating a joining method according to a preferable embodiment of the present invention. As shown in FIG. 1, a thermoplastic resin member 11, a porous member 12 and a thermoplastic laser transmitting resin member 13 are laminated, and they are contact-pressurized. A laser beam emitted from a laser transmitter 14 is emitted via a condensing lens 15 to the laser transmitting resin member 13. The thermoplastic resin member 11 may be laser transmitting or laser absorbing. It is desirable to preliminarily and temporarily assemble the porous member 12 and the laser transmitting resin member 13 by means of laser weld because dimension accuracy or the like can be increased. It is desirable to weld the thermoplastic resin 11 and the members 12 and 13 thereafter. As shown in FIG. 1, when laser is emitted only to one side (upper side in the drawing) and two interfaces formed by the three members are virtually simultaneously welded, it is desirable to set the thickness of the porous member 12 to not more than 0.1 mm. In the case where the laser beam is emitted to both sides of the two interfaces formed by the three members (up and down directions in the drawing) or the laser beam is emitted only to one side formed by the two members (for example, the porous member 12 and the laser transmitting resin member 13), if adhesion between the porous member 12 and the resin material is sufficiently secured, the thickness of the porous member 12 can be set to more than 0.1 mm.

Figure 8:
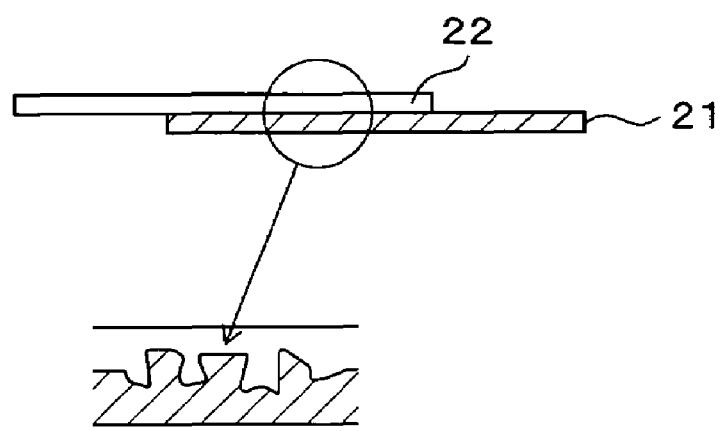
FIG. 8 is a sectional view illustrating the joined body obtained by a conventional joining method.

Obtained joined bodies in the case using the conventional joining technique and the case using the joining technique of the present invention are concretely explained. FIG. 8 is a sectional view illustrating the joined body obtained by the conventional joining method. As shown in FIG. 8, in the conventional example, a laser transmitting resin member 22 is laminated on a metal mesh 21, a laser is emitted from above in the drawing, and a vicinity of the interface between both of them is dissolved due to heat generation of the metal mesh 21, so that both of them are joined. In this example, as is clear from the enlarged diagram, the joined portion is present only around the interface between the members 21 and 22, three-dimensional joining is not sufficiently achieved.

Figure 9:
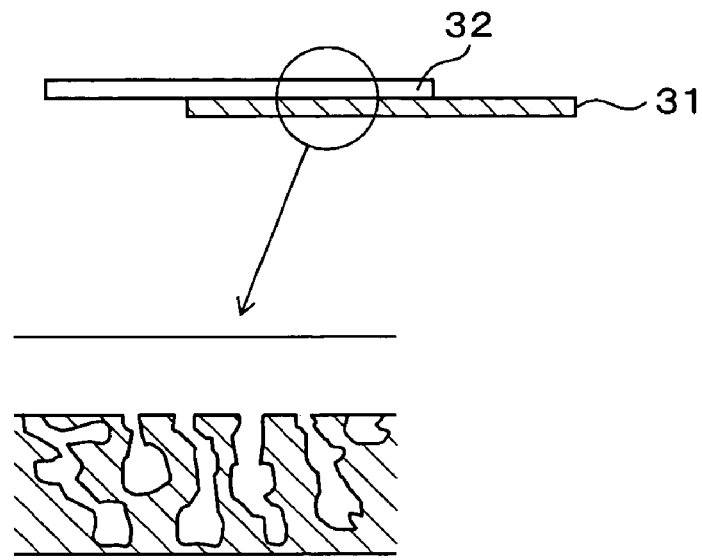
FIG. 9 is a sectional view illustrating the joined body obtained by the joining method for the present invention.

In contrast, FIG. 9 is a sectional view illustrating the joined body obtained by the joining method for the present invention. As shown in FIG. 9, in this example, a laser transmitting resin member 32 is laminated on a porous member 31, laser is emitted from above in the drawing, and resin which melts due to heat generation of the porous member 31 penetrates the holes of the porous member 31. The laminate is, thereafter, cooled and hardened so that both of them are joined. This example has such a structure that the porous member 31 can be three-dimensionally impregnated with the melted resin, and thus the joined portion sufficiently covers from around the interface between the members 31 and 32 to a lower portion in a thicknesswise direction. As a result, the three-dimensional joining is sufficiently achieved.

Figure 10:
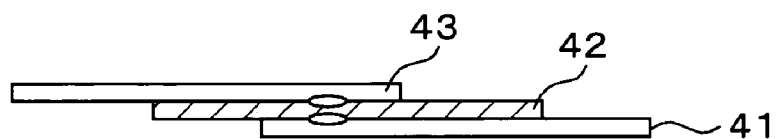
FIG. 10 is a sectional view illustrating the joined body obtained by the joining method for the present invention.

Another joining example of the present invention is explained below. That is, FIG. 10 illustrates the following example. A laser transmitting resin member 41, a porous member 42 and a laser transmitting resin member 43 are laminated from below, a laser beam is emitted in upper and lower directions of the three members, and the resin is melted.

Both sides of the porous member 42 are, thereafter, impregnated with the melted resin, and the three members are firmly three-dimensionally joined.

Figure 11:
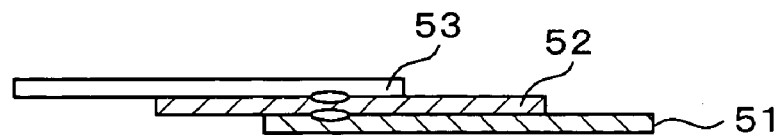
FIG. 11 is a sectional view illustrating the joined body obtained by the joining method for the present invention.

FIG. 11 illustrates the following example. A laser absorptive resin member 51, a porous member 52 and a laser transmitting resin member 53 are laminated in this order from below, a laser beam is emitted to the three members from above in the drawing. After the resin is melted, both the sides of the porous member 52 are impregnated with the molted resin, so that the three members are firmly three-dimensionally joined.

PRACTICAL EXAMPLE RELATING TO THE FIRST AND THE SECOND ASPECTS OF THE INVENTION

Practical Example 1

Figure 12A:
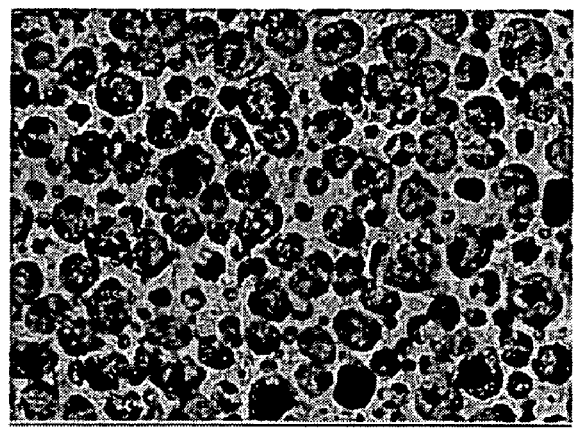
FIG. 12A is a cross sectional view illustrating the joined body obtained by the joining method for the present invention.
Figure 12B:
FIG. 12B is a vertical sectional view illustrating the joined body obtained by the joining method for the present invention.

As to the joining form shown in FIG. 9, metallic foam shown in FIG. 4B is used as the porous member 31, PEEK is used as the laser transmitting resin member 32, and a laser beam is emitted from above in FIG. 9 so that they are joined. FIG. 12A is a cross sectional view illustrating a joined body obtained in such a manner, and FIG. 12B is a vertical sectional view illustrating the joined body. As is clear from FIG. 12A, pores with diameter of 20 to 50 μm formed by the metallic foam are sufficiently impregnated with the resin. As is clear from FIG. 12B, although residual pores (white portions in the drawing) are present in the joined body, the pores are sufficiently impregnated with the resin in the thicknesswise direction. As a result, the peel strength of the joined body shown in FIGS. 12A and 12B is sufficiently three-dimensionally secured.

Embodiment of the Third to the Sixth Aspects of the Invention

Figure 13:
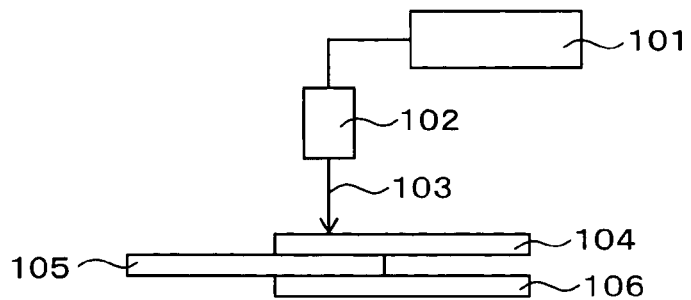
FIG. 13 is a conceptual diagram illustrating one preferable embodiment of the present invention.

FIG. 13 is a conceptual diagram illustrating one preferable embodiment of the present invention. That is, in the drawing, reference numeral 101 designates a laser transmitter, 102 designates a laser condensing lens, 103 designates a laser, and 104 to 106 designate laser transmitting thermoplastic resin materials including filler. In the case in which the invention is carried out, as shown in FIG. 13, a plurality (here, three) of the thermoplastic resin materials 104 to 106 are laminated, laser 103 which passes from the laser transmitter 101 through the laser condensing lens 102 is transmitted from an upper portion of the thermoplastic resin material 104 in a downward direction.

At this time, the laser 103 passes through the thermoplastic resin material 104, and reaches an interface between the thermoplastic resin 104 and the thermoplastic resin 105. Since the thermoplastic resin materials 104 to 106 are injection molded articles, fillers are hardly present near the interface, and the vicinity of the interface is composed of a pure resin material. Since the resin material has excellent laser absorption with respect to the fillers, the laser beam is absorbed by the resin material and is diffused near the interface, thereby generating heat. As a result, the vicinity of the interface is melted, so that the resins are joined due to thermal welding. The laser 103 which passes through the interface in such a manner further passes through the thermoplastic resin material 105, and reaches the interface between the thermoplastic resin 105 and the thermoplastic resin 106, thereby inducing a phenomenon similar to that above.

A basic embodiment of the present invention and an embodiment of the invention as a combination of the present invention and the conventional technique are explained below.

Figure 14A:
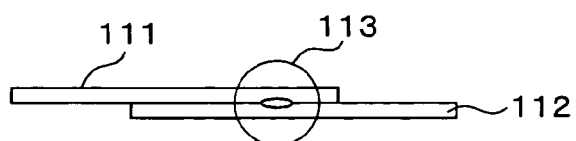
FIG. 14A is a sectional view illustrating a case where two laser transmitting thermoplastic resin materials 111 and 112 are joined.
Figure 14B:
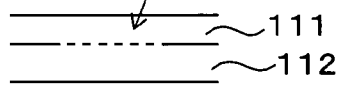
FIG. 14B is an enlarged diagram of a joined portion 113 in FIG. 14A.
Figure 14C:
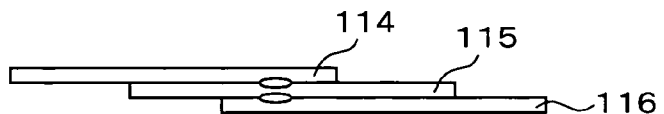
FIG. 14C is a sectional view illustrating a case where three laser transmitting thermoplastic resin materials 114 to 116 are joined.

FIGS. 14A to 14C illustrate the basic embodiment of the present invention, and FIG. 14A is a sectional view illustrating a case where two laser transmitting thermoplastic resin materials 111 and 112 are joined. FIG. 14B is an enlarged diagram of a joined portion 113 in FIG. 14A. Since the resins 111 and 112 are made of the same materials, their interface has less roughness, and thus heat generation due to diffusion cannot be that expected. The heat generation due to the diffusion, therefore, is combined with heat generation due to absorption of the laser by the resin material, so that the interface is sufficiently melted, and the joining can be realized. FIG. 14C is a sectional view illustrating a case where the three laser transmitting thermoplastic resin materials 114 to 116 are joined. Also, in this case, similarly to the cases shown in FIGS. 14A and 14B, a laser beam is emitted to the resin material 114 from above, and melting due to the heat generation of the interfaces is utilized so that the interfaces are satisfactorily joined.

Figure 15A:
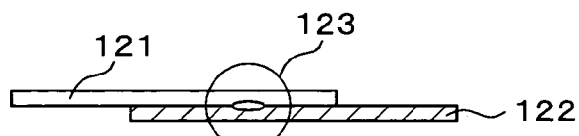
FIG. 15A is a sectional view illustrating a conventional technique in the case where one laser transmitting thermoplastic resin material 121 and one laser absorptive thermoplastic resin material 122 are joined.
Figure 15B:
FIG. 15B is an enlarged diagram of a joined portion 123 in FIG. 15A.
Figure 15C:
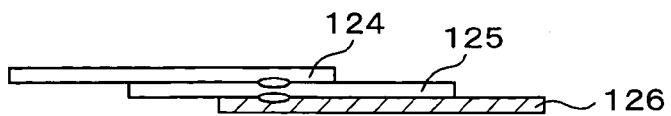
FIG. 15C is a sectional view illustrating a combined example of the conventional technique and the present invention in a case where two laser transmitting thermoplastic resin materials 124 and 125 and one laser absorptive thermoplastic resin material 126 are joined.

In contrast, FIGS. 15A to 15C illustrate the embodiment of the invention as the combination of the invention and the conventional technique, and FIG. 15A is a sectional view illustrating the conventional technique where one laser transmitting thermoplastic resin material 121 and one laser absorptive thermoplastic resin material 122 are joined. FIG. 15B is an enlarged diagram of a joined portion 123 in FIG. 15A. Since both the resins 121 and 122 are made of different materials, in the conventional technique, heat generation due to absorption of the laser by the laser absorptive resin material is mainly utilized so that the laser absorptive resin material is melted and both the resin materials can be joined. Further, FIG. 15C is a sectional diagram illustrating an example where two laser transmitting thermoplastic resin materials 124 and 125 and one laser absorptive thermoplastic resin material 126 are joined, namely, the example of the combination of the conventional technique and the invention. In this case, laser is emitted to the resin material 124 from above, and heat generation due to diffusion is combined with heat generation due to absorption of the laser by the resin material in the interface between the resin materials 124 and 125 so that the interface is melted, and the joining can be realized. The heat generation due to the absorption of the laser by the laser absorptive resin material 126 is mainly utilized in the interface between the resin materials 125 and 126 so that the joining can be realized.

In the case in which the interfaces between the laser transmitting thermoplastic resins made of resin and fillers are melted by the laser emission and are joined, when energy of the laser is designated by W (w), an emitting speed of the laser is designated by S (mm/s), a spot diameter of the laser is designated by D (mm), laser transmission efficiency of the thermoplastic resin is designated by Tr, a melting thickness of the thermoplastic resin is designated by Th (mm), specific gravity of the thermoplastic resin is designated by SG (g/cm³), a melting point of the thermoplastic resin is designated by MP (K), and specific heat at constant pressure of the thermoplastic resin is designated by Cp (kJ/kg·K), the following equation should be satisfied.

$$0.7 \leq \frac{W \times Tr}{S \times D \times Th \times SG \times 10^{-3} \times MP \times Cp} \leq 1.3$$

The above explanations are the joining methods of the resins including at least one thermoplastic resin according to the preferable embodiments of the present invention, and concrete embodiments in the case where such a joining method is applied to the fuel cell are explained in detail with reference to the drawings.

Figure 16A:
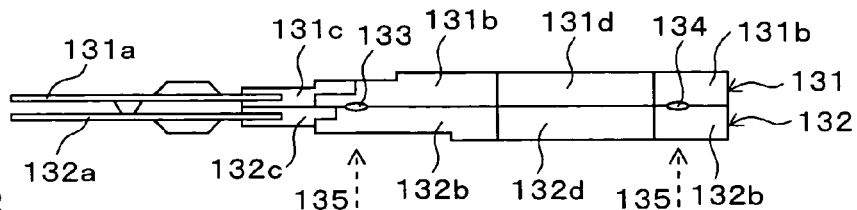
FIG. 16A is a sectional view illustrating steps of laminating and joining two separators 131 and 132 as components of a fuel cell according to one embodiment of the present invention.
Figure 16B:
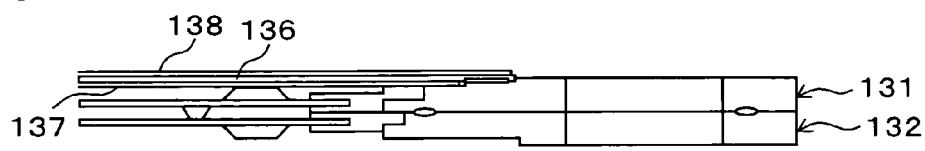
FIG. 16B is a sectional view illustrating steps of forming an electric cell according to one embodiment of the present invention.
Figure 16C:
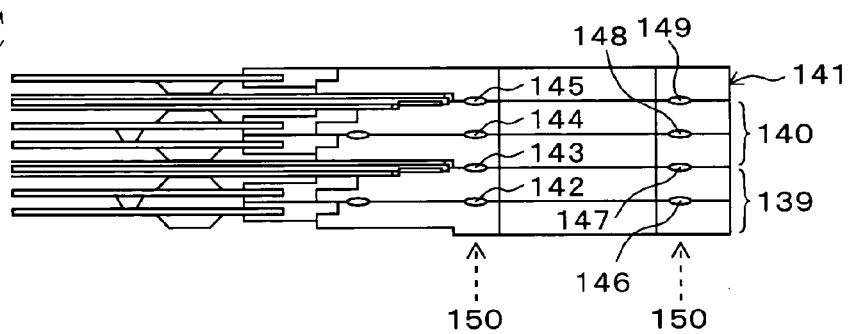
FIG. 16C is a sectional view illustrating steps of forming the fuel cell according to one embodiment of the present invention.

FIGS. 16A to 16C are sectional views successively illustrating the joining steps for the components of the fuel cell according to one embodiment of the present invention, and FIG. 16A illustrates the step of laminating and joining two separators 131 and 132. As shown in FIG. 16A, the two separators 131 and 132 are composed of metallic members 131a and 132a, resin layers 131b and 132b, and joint sections 131c and 132c that respectively connect the metallic members 131a and 132a to the resin layers 131b and 132b. Connecting holes 131d and 132d through which various fluids circulate are respectively formed in the resin layers 131b and 132b. As shown in FIG. 16A, when the two separators 131 and 132 are joined, for example, a laser beam is emitted from below in a direction of an arrow 135 aiming at predetermined places 133 and 134 of the interface between the resin layers 131b and 132b. Heat generation due to diffusion of the laser in the interface is combined with heat generation by the absorption of the laser by the resin materials, so that the interface is melted and the joining is realized. The conditions such as the laser transmission efficiency of the thermoplastic resin are as mentioned above. The laser is emitted from below in FIG. 16A, but can be emitted from above.

As shown in FIG. 16B, MEA 136 is joined to an upper part of the laminated and joined two separators 131 and 132 by seal coating agent 137, and seal coating agent 138 is applied onto the MEA 136, so that an electric cell is formed to be prepared for the next process.

As shown in FIG. 16C, a plurality of the electric cells formed in FIG. 16B, namely, the two electric cells 139 and 140 in FIG. 16C are laminated, and a separator 141 is further laminated on the top portion. For example, a laser beam is emitted from below to a direction of an arrow 150 aiming at predetermined places 142 to 149 of the interfaces, and heat generation due to diffusion of the laser in the interfaces is combined with heat generation due to absorption of the laser by the resin materials so that the interfaces are successively melted and the joining is realized.

The above explanations are a series of the production processes for the fuel cell, but when the fuel cell is produced in such a manner, joined portions by means of the laser emission appear on respective places of the fuel cell.

Figure 17A:
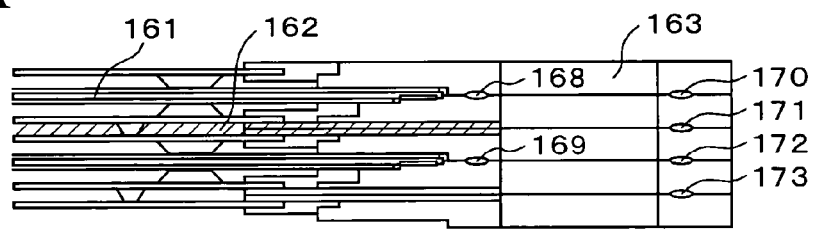
FIG. 17A is a sectional view illustrating a vicinity of a coolant flow channel in the joined state of the respective sections of the fuel cell shown in FIGS. 16A to 16C.
Figure 17B:
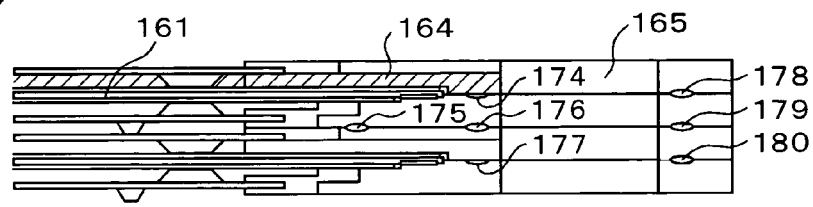
FIG. 17B is a sectional view illustrating a vicinity of an oxidizing gas flow channel in the joined state of the respective sections of the fuel cell shown in FIGS. 16A to 16C.
Figure 17C:
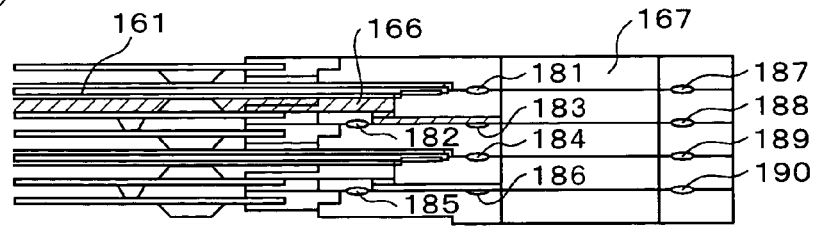
FIG. 17C is a sectional view illustrating a vicinity of a fuel gas flow channel in the joined state of the respective sections of the fuel cell shown in FIGS. 16A to 16C.

FIGS. 17A to 17C are sectional views illustrating joined states of the sections in the fuel cell shown in FIGS. 16A to 16C, and FIG. 17A is a sectional view illustrating a vicinity of a coolant flow channel. FIG. 17B is a sectional view illustrating a vicinity of an oxidizing gas flow channel, and FIG. 17C is a sectional view illustrating a vicinity of a fuel gas flow channel. In FIGS. 17A to 17C, reference numeral 161 designates MEA, 162 designates the coolant flow channel (portion shown by slant lines), 163 designates a coolant connecting hole, 164 designates a oxidizing gas flow channel (portion shown by slant lines), 165 designates an oxidizing gas connecting hole, 166 designates a fuel gas flow channel (portion shown by slant lines), and 167 designates a fuel gas connecting hole. As shown in FIGS. 17A to 17C, in the sections in the vicinities of the flow channels, joining portions are satisfactorily provided to predetermined places 168 to 190 of the interfaces of the resin layers, thereby realizing the excellent joining form.

Figure 18A:
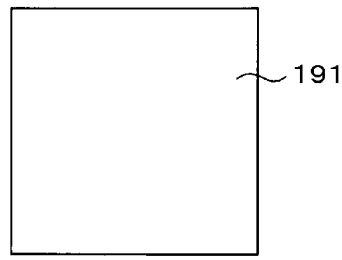
FIG. 18A is a plan view illustrating an MEA cathode surface of the fuel cell partially shown in FIGS. 17A to 17C.
Figure 18B:
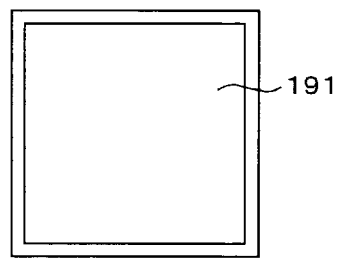
FIG. 18B is a plan view illustrating an MEA anode surface provided with a seal section frame of the fuel cell partially shown in FIGS. 17A to 17C.
Figure 18C:
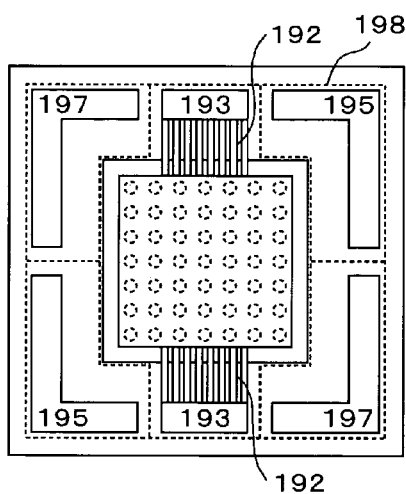
FIG. 18C is a plan view illustrating a cooling surface of a cathode separator of the fuel cell partially shown in FIGS. 17A to 17C.
Figure 18D:
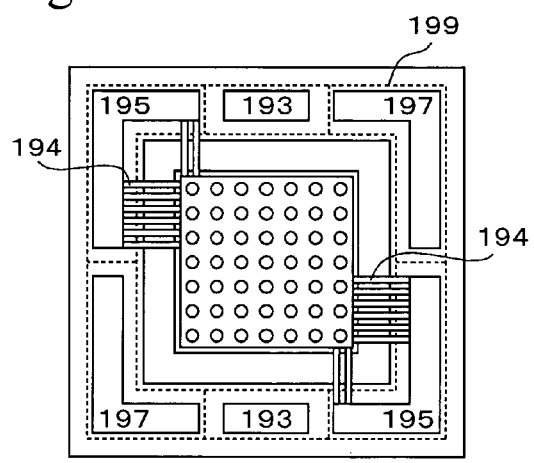
FIG. 18D is a plan view illustrating a power generating surface of the cathode separator of the fuel cell partially shown in FIGS. 17A to 17C.
Figure 18E:
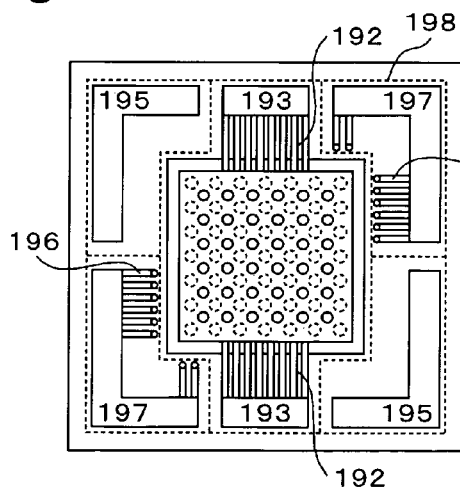
FIG. 18E is a plan view illustrating a cooling surface of an anode separator of the fuel cell partially shown in FIGS. 17A to 17C.
Figure 18F:
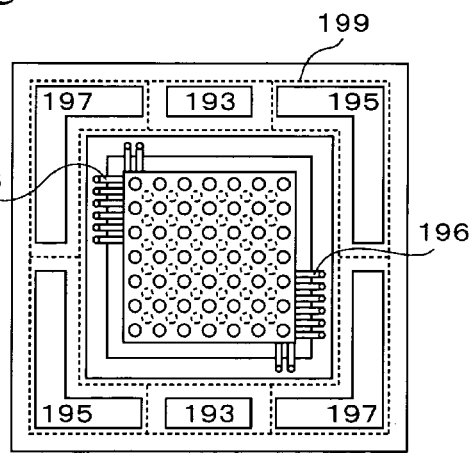
FIG. 18F is a plan view illustrating a power generating surface of the anode separator of the fuel cell partially shown in FIGS. 17A to 17C.

FIGS. 18A to 18F are plan views illustrating the fuel cell partially shown in FIGS. 17A to 17C, and FIG. 18A illustrates an MEA cathode surface. FIG. 18B illustrates an MEA anode surface provided with a seal section frame, and FIG. 18C illustrates a cooling surface of a cathode separator. FIG. 18D illustrates a power generating surface of the cathode separator, FIG. 18E illustrates a cooling surface of an anode separator, and FIG. 18F illustrates a power generating surface of the anode separator. The cathode (anode) separator is a separator which is opposed to a cathode (anode) surface of the MEA. In FIGS. 18A to 18F, reference numeral 191 designates MEA, 192 designates the coolant flow channel, 193 designates the coolant connecting hole, 194 designates the oxidizing gas flow channel, 195 designates the oxidizing gas connecting hole, 196 designates the fuel gas flow channel, and 197 designates the fuel gas connecting hole. As shown in FIGS. 18C to 18F, in all the surfaces of the separator, joined portions are satisfactorily provided to predetermined places 198 and 199 of the interfaces of the resin layers shown by dotted lines, thereby realizing the excellent joining form.

In the fuel cell utilizing the joining method for the resin layers by means of the laser emission of the present invention, members other than the laser transmitting resin is not necessary. For this reason, when the fuel cells are produced, the material handling is made easier and the production cost can be reduced. Furthermore, since a rubber seal or the like is not used between the separators for holding the MEA unlike the conventional technique, excellent laminate assembly property is realized and satisfactory airtightness of the cells can be realized.

Figure 19A:
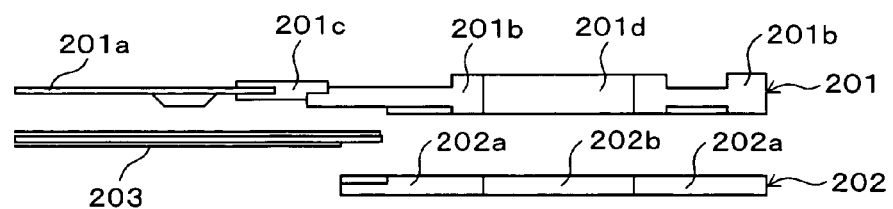
FIG. 19A is a sectional view illustrating steps of nipping MEA 203 between a separator 201 and a frame 202 via sealing agent and joining them in the fuel cell according to another embodiment of the invention.
Figure 19B:
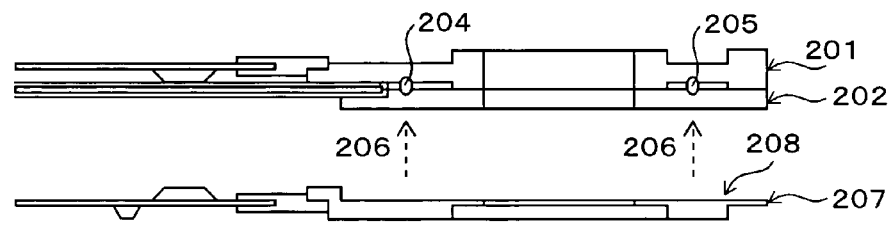
FIG. 19B is a sectional view illustrating steps of nipping the MEA 203 between the separator 201 and the frame 202 via sealing agent in the fuel cell according to another embodiment of the invention.
Figure 19C:
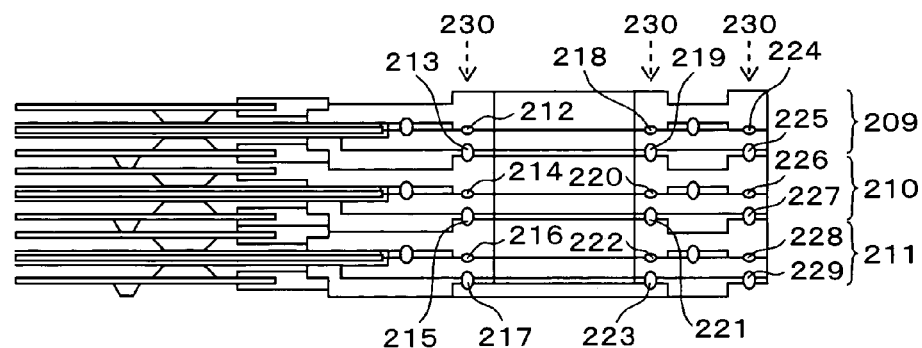
FIG. 19C is a sectional view illustrating steps of forming the fuel cell according to another embodiment of the invention.

FIGS. 19A to 19C are sectional views successively illustrating the joining steps for the components of the fuel cell according to another embodiment of the invention, and FIGS. 19A and 19B illustrate the steps of holding the MEA 203 between the separator 201 and the frame 202 via the application of a seal agent, and joining them. As shown in FIG. 19A, the separator 201 is composed of a metallic member 201a, a resin layer 201b, and a joint section 201c for connecting the metallic member 201a and the resin layer 201b. A connecting hole 201d in which various fluids circulate is formed on the resin layer 201b. The frame 202 is composed of a resin layer 202a, and a connecting hole 202b in which various fluids circulate is formed on the resin layer 202a. The sealing agent can be applied to a proton exchange membrane (PEM) exposed portion of the MEA.

As shown in FIG. 19A, in the case in which the MEA 203 is held between the separator 201 and the frame 202 and they are joined, as shown in FIG. 19B, for example, laser is emitted from below in a direction of an arrow 206 aiming at predetermined places 204 and 205 of the interface between the resin layers 201b and 202a. Heat generation due to diffusion of the laser is combined with heat generation due to absorption of the laser by the resin material in the interface, so that the interface is melted and the joining is realized. As shown in FIG. 19B, thereafter, the separator 207 is further joined from below by application of sealing agent 208, so that an electric cells are formed so as to be prepared for the next step.

As shown in FIG. 19C, a plurality of the electric cells formed in FIG. 19B, namely, the three electric cells 209 to 211 in FIG. 19C are laminated, and a laser beam is emitted from above to a direction of an arrow 230 aiming at predetermined places 212 to 229 of the interfaces or an interface group. Heat generation due to diffusion of the laser in the interfaces or the interface groups is combined with heat generation due to absorption of the laser by the resin materials, so that at least one of the interfaces or the interface group is successively melted, and the joining is realized. The interfaces shown in FIG. 19C are designated by reference numerals 212, 214, 216, 218, 220, 222, 224, 226 and 228, and the interface group is designated by reference numerals 213, 215, 217, 219, 221, 223, 225, 227 and 229.

The above explanations are a series of the production processes for the fuel cell, but when the fuel cell is produced in such a manner, the joined portions due to the laser emission appear on respective places of the fuel cell.

Figure 20A:
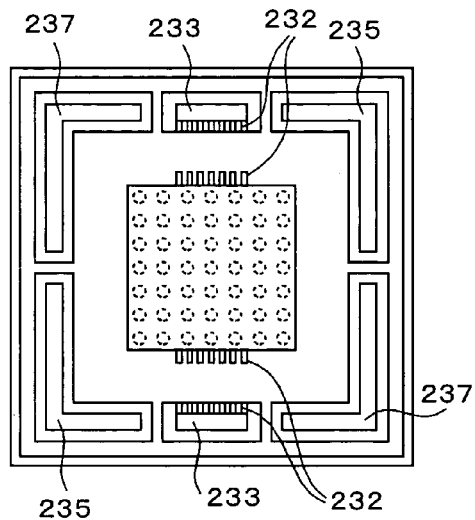
FIG. 20A is a sectional view illustrating the cooling surface of the separator in the joined state of the respective sections of the fuel cell shown in FIG. 19A.
Figure 20B:
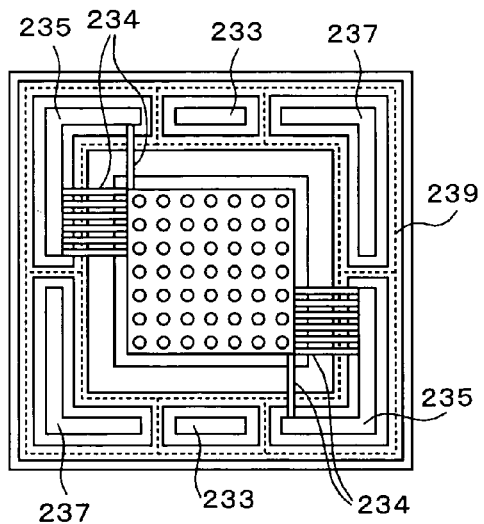
FIG. 20B is a sectional view illustrating the power generating surface of the separator in the joined state of the respective sections of the fuel cell shown in FIG. 19A.
Figure 20C:
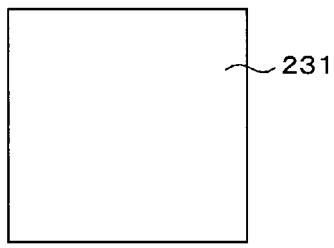
FIG. 20C is a sectional view illustrating the cathode surface of MEA in the joined state of the respective sections of the fuel cell shown in FIG. 19A.
Figure 20D:
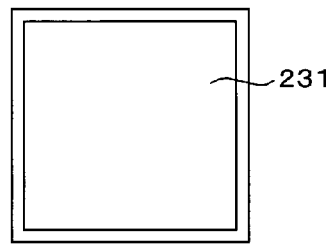
FIG. 20D is a sectional view illustrating the anode surface of MEA provided with the seal section frame in the joined state of the respective sections of the fuel cell shown in FIG. 19A.
Figure 20E:
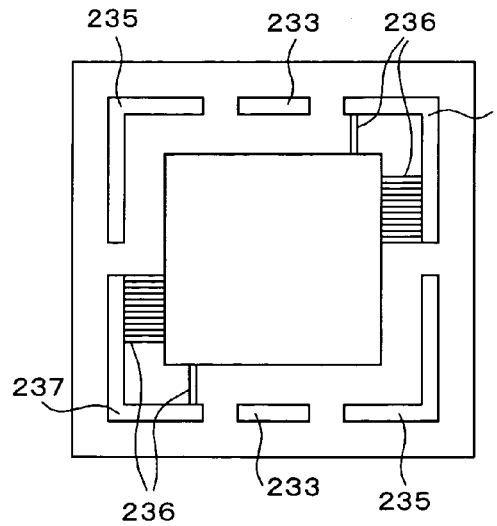
FIG. 20E is a sectional view illustrating the separator side surface of the frame in the joined state of the respective sections of the fuel cell shown in FIG. 19A.
Figure 20F:
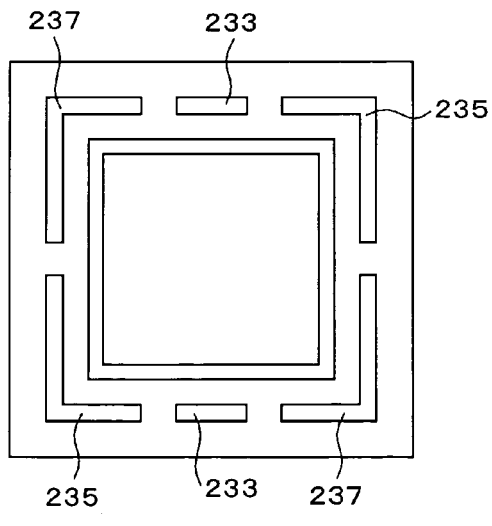
FIG. 20F is a sectional view illustrating the MEA side surface of the frame in the joined state of the respective sections of the fuel cell shown in FIG. 19A.

FIGS. 20A to 20F are sectional views illustrating the joined states of the respective sections in the fuel cell shown in FIG. 19A. FIG. 20A illustrates a cooling surface of the separator, and FIG. 20B illustrates a power generating surface of the separator. FIG. 20C illustrates a cathode surface of MEA, and FIG. 20D illustrates an anode surface of MEA provided with the sealing section frame. FIG. 20E illustrates a separator side surface of the frame, and FIG. 20F illustrates an MEA side surface of the frame. In FIGS. 20A to 20F, reference numeral 231 designates the MEA, 232 designates the coolant flow channel, 233 designates the coolant connecting hole, 234 designates the oxidizing gas flow channel, 235 designates the oxidizing gas connecting hole, 236 designates the fuel gas flow channel, 237 designates the fuel gas connecting hole. As shown by a dotted line 239 in FIGS. 20A, 20B and 20E, joined portions of the interface between the resin layers are satisfactorily joined, thereby realizing the excellent joining form.

Figure 21A:
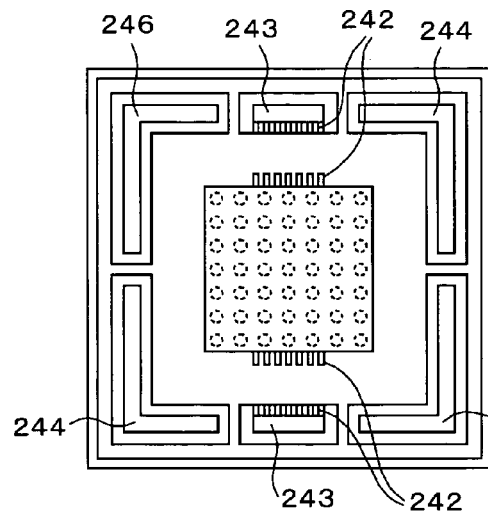
FIG. 21A is a sectional view illustrating the cooling surface of the cathode separator in the joined state of the respective sections of the fuel cell shown in FIG. 19B.
Figure 21B:
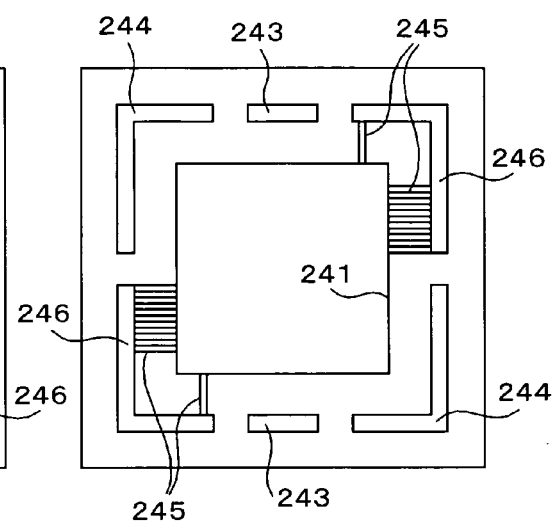
FIG. 21B is a sectional view illustrating the power generating surface of the cathode separator in the joined state of the respective sections of the fuel cell shown in FIG. 19B.
Figure 21C:
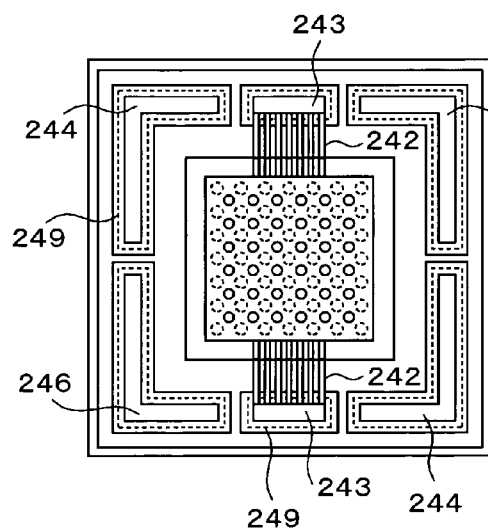
FIG. 21C is a sectional view illustrating the cooling surface of the anode separator in the joined state of the respective sections of the fuel cell shown in FIG. 19B.
Figure 21D:
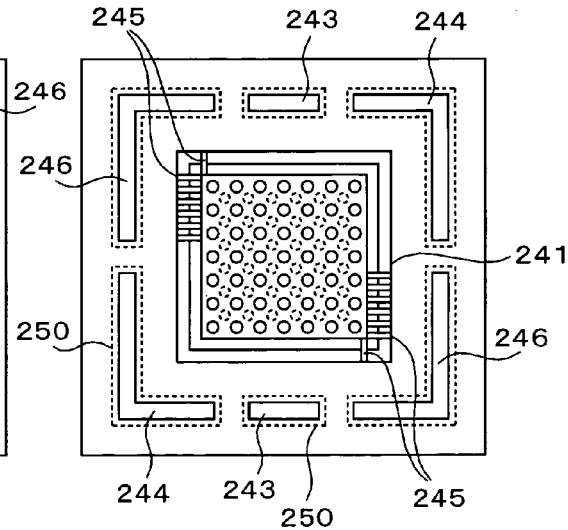
FIG. 21D is a sectional view illustrating the power generating surface of the anode separator in the joined state of the respective sections of the fuel cell shown in FIG. 19B.

FIGS. 21A to 21D are sectional views illustrating the joined states of the respective sections in the fuel cell shown in FIG. 19B. FIG. 21A illustrates a cooling surface of the cathode separator, and FIG. 21B illustrates a power generating surface of the cathode separator. FIG. 21C illustrates a cooling surface of the anode separator, and FIG. 21D illustrates a power generating surface of the anode separator. In FIGS. 21A to 21D, reference numeral 241 designates MEA, 242 designates the coolant flow channel, 243 designates the coolant connecting hole, 244 designates the oxidizing gas connecting hole, 245 designates the fuel gas flow channel, and 246 designates the fuel gas connecting hole. As shown in FIGS. 21A to 21D, joined portions shown by dotted lines are satisfactorily provided on predetermined places 249 and 250 of the interfaces between the resin layers in any surfaces of the separator, thereby realizing the excellent joining form.

Also, in this example, members other than the laser transmitting resin are not necessary, and when the fuel cell is produced, the material handling can be made to be easy and the production cost can be reduced. Further, since a rubber seal is not used between the separators for holding the MEA unlike the conventional technique, excellent laminate assembly property is realized, thereby realizing the satisfactory airtightness of the cells.

Figure 22A:
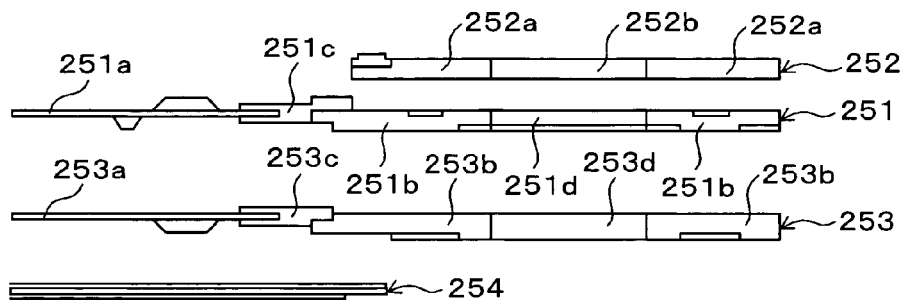
FIG. 22A is a sectional view illustrating the steps of joining a separator 251, a frame 252, a separator 253 and MEA 254 as the respective components of the electric cell in the fuel cell according to still another embodiment of the invention.

FIGS. 22A to 22D are sectional view successively illustrating the joining steps for the respective components of the fuel cell according to still another embodiment of the present invention. FIG. 22A illustrates a separator 251, a frame 252, a separator 253 and MEA 254 as components of the electric cell. As shown in FIG. 22A, the separators 251 and 253 are composed of metallic members 251a and 253a, resin layers 251b and 253b, and joint sections 251c and 253c for respectively connecting the metallic members 251a and 253a and the resin layers 251b and 253b. Connecting holes 251d and 253d through which various fluids circulate are respectively formed on the resin layers 251b and 253b. The frame 252 is composed of a resin layer 252a, and a connecting hole 252b through which various fluids circulate is provided on the resin layer 252a.

Figure 22B:
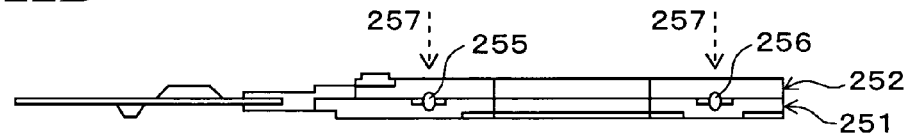
FIG. 22B is a sectional view illustrating a step of laminating the separator 251 and the frame 252 according to still another embodiment of the invention.
Figure 22C:
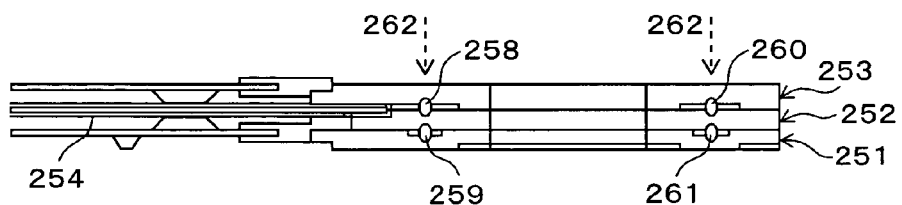
FIG. 22C is a sectional view illustrating a step of laminating the MEA 254 and the separator 253 from above by means of application of seal agent according to still another embodiment of the invention.

When the electric cell is formed by using these members, as shown in FIG. 22B, the separator 251 and the frame 252 are laminated, and for example, a laser beam is emitted from above to a direction of an arrow 257 aiming at predetermined places 255 and 256 of the interface between the resin layers 251b and 252a. Heat generation due to diffusion of the laser beam in the interface is combined with heat generation due to absorption of the laser by the resin material, so that the interface is melted and the joining is realized. At this time, the fuel gas flow channel is formed between the separator 251 and the frame 252. As shown in FIG. 22C, thereafter, the MEA 254 and the separator 253 are laminated from above by application of a sealing agent, a laser beam is emitted from above in a direction of an arrow 262 aiming at predetermined places 258 to 261 of the interfaces between the resin layers 251b, 252a and 253b. Heat generation due to diffusion of the laser in the interfaces is combined with heat generation due to absorption of the laser by the resin materials, so that the interfaces are melted and the electric cell is formed to be prepared for the next step.

Figure 22D:
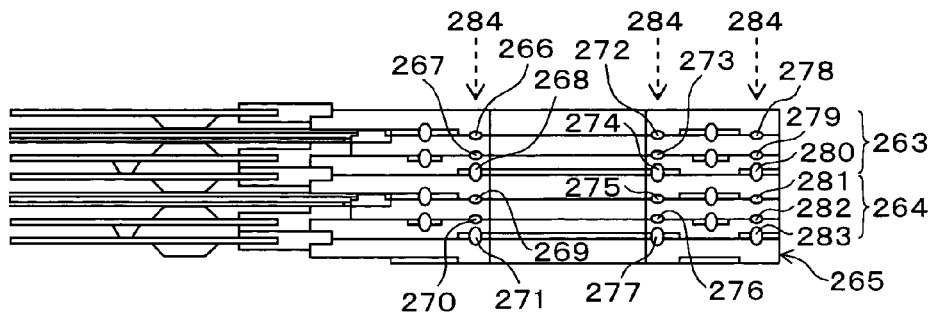
FIG. 22D is a sectional view illustrating steps of forming the fuel cell according to still another embodiment of the invention.

As shown in FIG. 22D, a plurality of the electric cells formed in FIG. 22C, namely, the two electric cells 263 and 264 are laminated in FIG. 22D, a separator 265 is additionally laminated. A laser beam is emitted, for example, from above to a direction of an arrow 284 aiming at predetermined places 266 to 283 of the interfaces, and heat generation due to diffusion of the laser in the interfaces or an interface group is combined with heat generation due to absorption of the laser by the resin materials. As a result, at least one of the interfaces or the interface group is successively melted, and the joining is realized. The interfaces shown in FIG. 22D are designated by reference numerals 266, 267, 269, 270, 272, 273, 275, 276, 278, 279, 281 and 282, and the interface group is designated by reference numerals 268, 271, 274, 277, 280 and 283.

The above explanations are a series of the production processes for the fuel cell. When the fuel cell is produced in such a manner, joined portions due to the laser emission appear on respective places of the fuel cell.

Figure 23A:
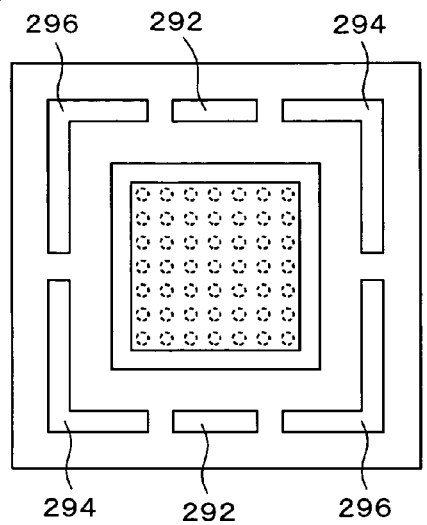
FIG. 23A is a sectional view illustrating a cooling surface of the cathode separator in the joined state of the respective sections of the fuel cell shown in FIG. 22D.
Figure 23B:
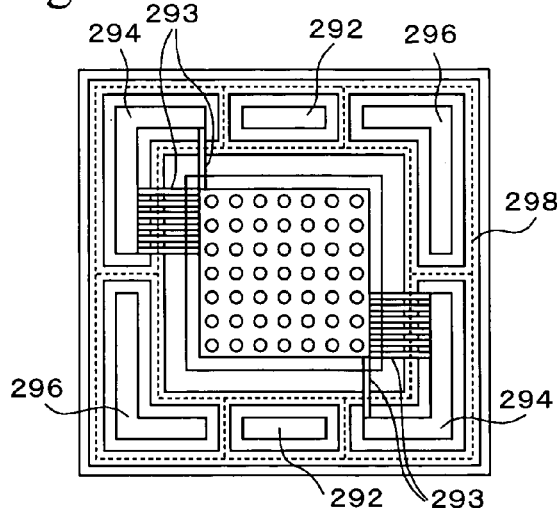
FIG. 23B is a sectional view illustrating a power generating surface of the cathode separator in the joined state of the respective sections of the fuel cell shown in FIG. 22D.
Figure 23C:
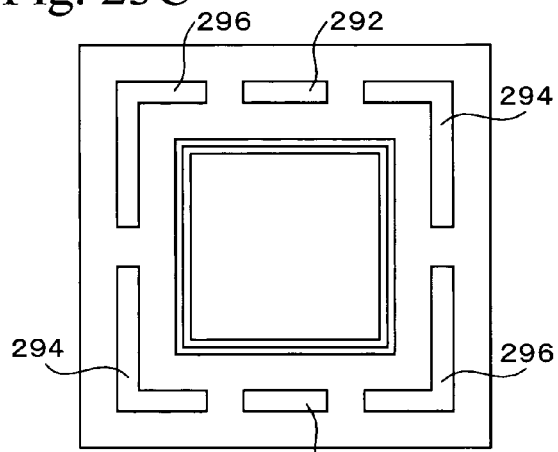
FIG. 23C is a sectional view illustrating an MEA side surface of the frame in the joined state of the respective sections of the fuel cell shown in FIG. 22D.
Figure 23D:
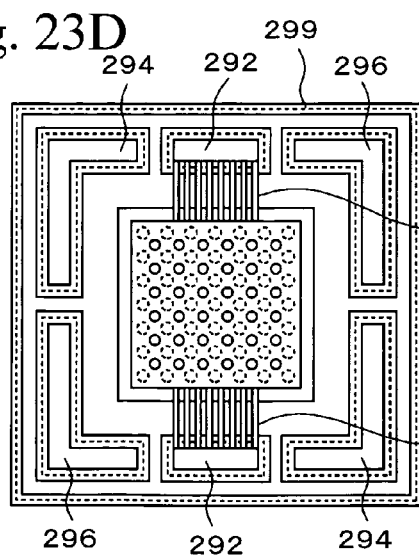
FIG. 23D is a sectional view illustrating a cooling surface of the anode separator in the joined state of the respective sections of the fuel cell shown in FIG. 22D.
Figure 23E:
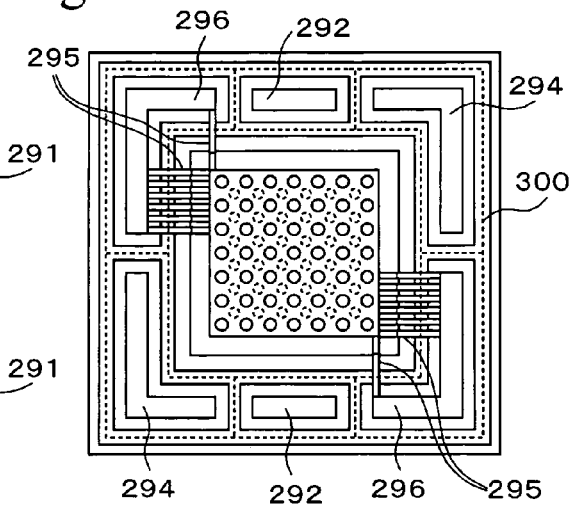
FIG. 23E is a sectional view illustrating a power generating surface of the anode separator in the joined state of the respective sections of the fuel cell shown in FIG. 22D.

FIGS. 23A to 23E are sectional views illustrating joined states of the respective sections in the fuel cell shown in FIG. 22D. FIG. 23A illustrates a cooling surface of the cathode separator, and FIG. 23B illustrates a power generating surface of the cathode separator. FIG. 23C illustrates an MEA side surface of the frame, and FIG. 23D illustrates a cooling surface of the anode separator, and FIG. 23E illustrates a power generating surface of the anode separator. In FIGS. 23A to 23E, reference numeral 291 designates a coolant flow channel, 292 designates a coolant connecting hole, 293 designates an oxidizing gas flow channel, 294 designates an oxidizing gas connecting hole, 295 designates a fuel gas flow channel, and 296 designates a fuel gas connecting hole. As shown by dotted lines 298 to 300 in FIGS. 23B, 23D and 23E, the joined portions of the interfaces between the resin layers are satisfactorily joined, thereby realizing the excellent joining form.

Also in this example, members other than the laser transmitting resin are not necessary, and when the fuel cell is produced, the material handling can be made to be easy and the production cost can be reduced. Further, since a rubber seal is not used between the separators for holding MEA unlike the conventional technique, the excellent laminate assembly property is realized, thereby realizing the satisfactory airtightness of the cells.

PRACTICAL EXAMPLE RELATING TO THE THIRD TO THE SIXTH ASPECTS OF THE INVENTION

Practical Example 2

A Practical Example of the invention is explained in detail below, and the effects of the present invention are substantiated.

Figure 24:
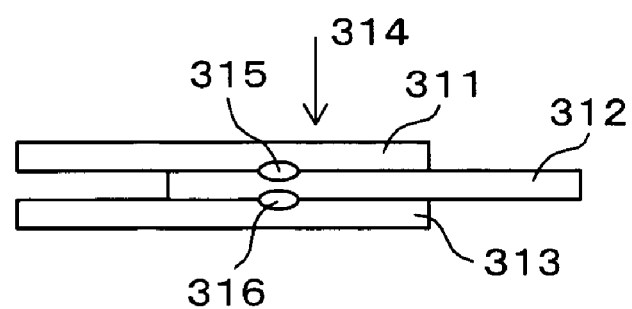
FIG. 24 is a conceptual diagram illustrating one joining form according to the embodiment of the invention.

FIG. 24 is a conceptual diagram illustrating a resin joining form for substantiating the effects of the present invention. As shown in FIG. 24, laser transmitting thermoplastic resins 311 and 312 and a laser absorbing thermoplastic resin 313 are laminated, and a laser beam with wavelength of 940 nm is emitted from above in a direction of an arrow 314. The joined states of predetermined places 315 and 316 of the interfaces between the resins 311 to 313 are determined. Laser transmission efficiency of the laser transmitting thermoplastic resins 311 and 312 is 15.9%, their melting points are 282° C., and specific heat at constant pressure at 282° C. is 1.8 kJ/kg·K, a target value of the melting thickness is 0.19 mm, and specific gravity is 1.77 g/cm³.

In this Practical Example, the joined states in Experimental examples 1 to 9 are determined under the conditions such as a spot diameter of the laser, energy of the laser, energy density of the laser and a laser emitting speed shown in Table 1. Their results are shown in Table 1. In Table 1, X representing the joined state means that the joining is not achieved in any interfaces or numerous voids are generated, and Δ means that a small number of voids were generated. ○ means that the transmitting resins 311 and 312 are joined but the transmitting resin 312 and the absorptive resin 313 are not joined, and ⊚ means that the joining is achieved at all interfaces.

Practical Example 3

Figure 25:
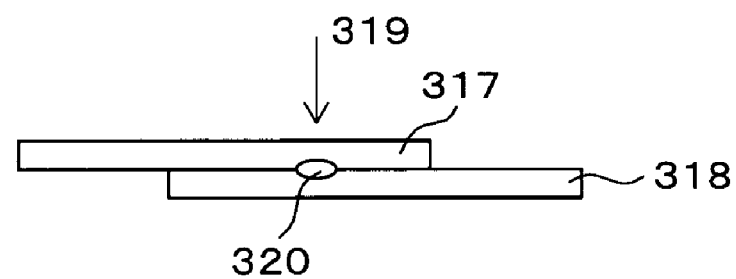
FIG. 25 is a conceptual diagram illustrating another joining form according to the embodiment of the invention.

As shown in FIG. 25, the laser transmitting thermoplastic resins 317 and 318 are laminated, laser with wavelength of 940 nm is emitted from above to a direction of an arrow 319 under the same conditions as those in the Experimental Example 6 where the preferable results are obtained in the Practical Example 2 (see corresponding portions in Table 1). The joined state of a predetermined place 320 of the interface between the resins 317 and 318 is determined as a confirmation work. The laser transmission efficiency of the laser transmitting thermoplastic resins 311 and 312 is 15.9%, and their melting point is 282° C., specific heat at constant pressure at 282° C. is 1.8 kJ/kg·K, a target value of the melting thickness is 0.19 mm, and specific gravity is 1.77 g/cm³.

As a result, it is confirmed that the joined state is satisfactory, and thus as shown in FIG. 25, even in the case where the laser absorptive thermoplastic resin is not laminated on the bottom portion, the laser transmitting thermoplastic resins are proved to be capable of being satisfactorily joined if various conditions within the range of the present invention are practiced.

Embodiments of the Seventh to Twenty-First Aspects of the Invention

Embodiment A-1

Figure 26A:
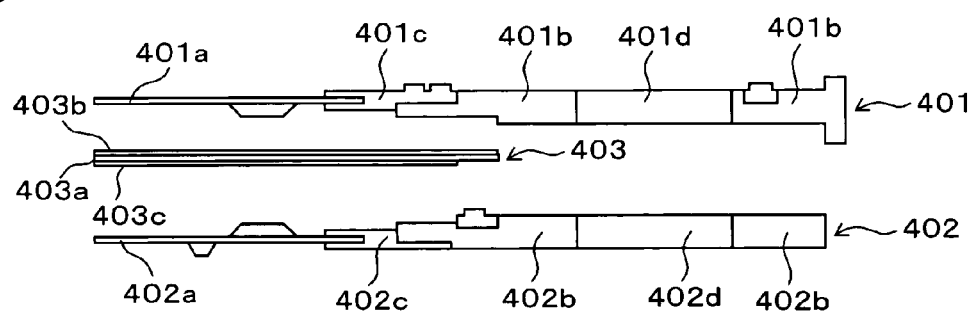
FIG. 26A is a partial sectional view illustrating the components of the electric cell in the fuel cell according to one preferable embodiment of the invention.
Figure 26B:
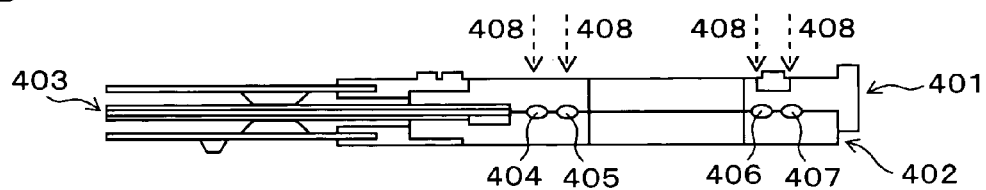
FIG. 26B is a partial sectional view illustrating the electric cell according to one preferable embodiment of the invention.
Figure 26C:
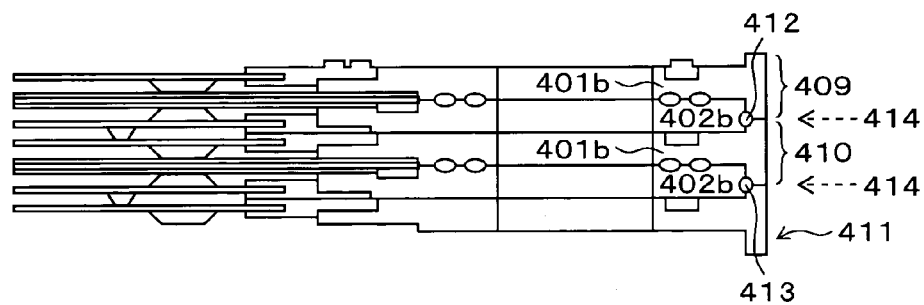
FIG. 26C is a partial sectional view illustrating the fuel cell obtained by laminating the electric cells according to one preferable embodiment of the invention.

Corresponding to the Seventh to the Ninth, the Eleventh, the Eighteenth and the Nineteenth Aspects of the Invention FIGS. 26A to 26C are partial sectional views illustrating the fuel cell according to one preferable embodiment of the

TABLE 1

| | Experimental Example 1 | Experimental Example 2 | Experimental Example 3 | Experimental Example 4 | Experimental Example 5 | Experimental Example 6 | Experimental Example 7 | Experimental Example 8 | Experimental Example 9 |
|---|---|---|---|---|---|---|---|---|---|
| Spot Diameter (mm) | 2 | 2 | 2 | 3 | 3 | 3 | 3 | 3 | 3 |
| Energy (W) | 28.6 | 34.6 | 28.6 | 34.6 | 34.6 | 34.6 | 34.6 | 34.6 | 34.6 |
| Energy Density (J/mm²) | 0.72 | 0.87 | 0.95 | 0.58 | 1.65 | 2.31 | 2.56 | 2.88 | 5.77 |
| Emitting Speed (mm/s) | 20 | 20 | 15 | 20 | 7 | 5 | 4.5 | 4 | 2 |
| Value of Equation in the Third Practical Example | 0.34 | 0.41 | 0.45 | 0.27 | 0.78 | 1.09 | 1.21 | 1.36 | 2.73 |
| Joined State | X | X | X | X | ○ | ⊚ | ⊚ | Δ | X |
| Remarks | Unmelted | Unmelted | Unmelted | Unmelted | Upper two resins are joined | Three resins are joined | Three resins are joined | A small number of voids is generated. | numerous voids are generated |

According to Table 1, in the Experimental Examples 1 to 4, since the formula values described in the third invention are less than 0.7, any interfaces are unmelted, and the joined state is not satisfactory. Further, in the Experimental Examples 8 and 9, since the formula values of the third invention exceed 1.3, voids are formed on the interfaces, and the joined state is not satisfactory. In contrast, in the Experimental Examples 5 to 7, since the formula values of the third invention are within a range of the invention, the joined state is satisfactory.

present invention. FIG. 26A illustrates the components in the case where when two separators 401 and 402 are laminated, MEA 403 is held therebetween and they are integrated. As shown in FIG. 26A, the two separators 401 and 402 are composed of metallic members 401a and 402a, a laser transmitting resin layer 401b, a laser absorptive resin layer 402b, and connecting sections 401c and 402c for respectively connecting the metallic members 401a and 402a and the resin layers 401b and 402b. Connecting holes 401d and 402d through which various fluids circulate are formed on the resin layers 401b and 402b, respectively. The MEA 403 is composed of a PEM 403a, a large diffusion layer 403b that is positioned on one side of the PEM 403a and whose surface area is comparatively large, and a small diffusion layer 40c that is positioned on the other side of the PEM 403a and whose surface area is smaller than that of the large diffusion layer 403b.

In the case in which the two separators 401 and 402 are joined, as shown in FIG. 26B, the MEA 403 is held between the separators 401 and 402 and they are laminated. A laser beam is emitted from a side of the laser transmitting resin layer 401b to a direction of an arrow 408 aiming at predetermined places 404 to 407 of the interface between the resin layers 401b and 402b. The interface is melted and joined by heat generation due to absorption of the laser by the resin layer 402b, so that the electric cell is formed. At the time of emitting the laser, it is preferable that moderate contact pressure is applied to the two separators 401 and 402 by using a pressurizing jig that transmits the laser beam so that gaps are not formed on the melted interface. While the laser beam is focused on the interface and the emission and melting are carried out, the emitting position is moved to a surface direction of the separator 401 so that an arbitrary line is drawn, and a desired joining line is formed. As a result, excellent melting joining properties can be realized. When a conventional sealing unit is additionally adopted, an electric cell which has both the melting joining properties and the sealing property can be obtained.

As shown in FIG. 26C, a plurality of the electric cells shown in FIG. 26B, namely, two electric cells 409 and 410 are laminated in FIG. 26C, and a separator 411 is further laminated on the bottom portion. A laser beam is emitted from right to a direction of an arrow 414 in the drawing aiming at predetermined places 412 and 413 of the interfaces. The interfaces are melted and joined by heat generation due to absorption of the laser beam by the resin layer 402b so that the fuel cell is obtained.

Embodiment A-2

Figure 27A:
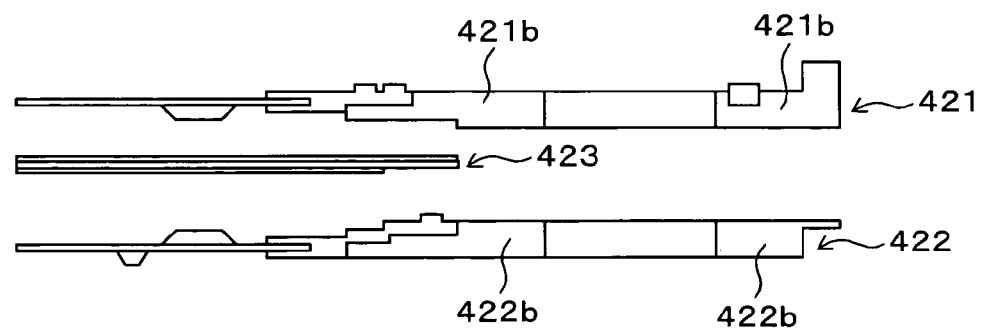
FIG. 27A is a sectional view illustrating the components of the electric cell according to a modified example of the embodiment shown in FIGS. 26A to 26C.
Figure 27B:
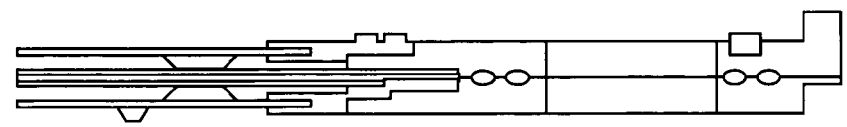
FIG. 27B is a sectional view illustrating the electric cell according to a modified example of the embodiment shown in FIGS. 26A to 26C.
Figure 27C:
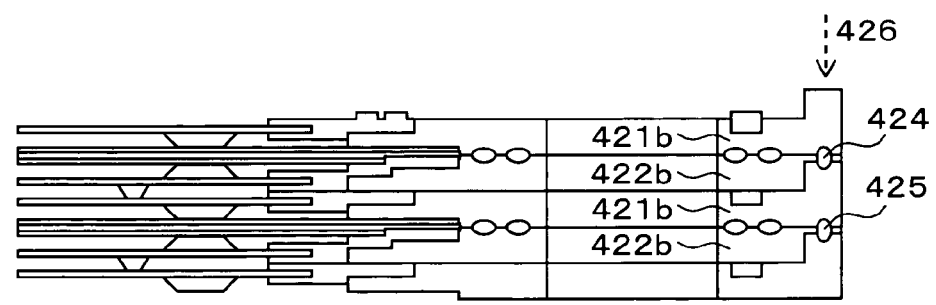
FIG. 27C is a sectional view illustrating the fuel cell obtained by laminating the electric cells according to a modified example of the embodiment shown in FIGS. 26A to 26C.

Corresponding to the Seventh to the Tenth, the Eighteenth and the Nineteenth Aspects of the Invention FIGS. 27A to 27C are partial sectional views illustrating the fuel cell according to another preferable embodiment of the present invention. FIG. 27A illustrates separators 421 and 422 and MEA 423 composing the electric cell, FIG. 27B illustrates the electric cell obtained by joining the components shown in FIG. 27A, and FIG. 27C illustrates the fuel cell obtained by laminating the electric cells shown in FIG. 27B. The embodiment shown in FIGS. 27A to 27C is basically the same as the embodiment shown in FIGS. 26A to 26C, but as shown in FIG. 27A, shapes of a laser transmitting resin layer 421b of the separator 421 and a laser absorptive resin layer 422b of the separator 422 are different from those of the laser transmitting resin layer 401b of the separator 401 and the laser absorptive resin layer 402b of the separator 402 shown in FIG. 26A. In the embodiment shown in FIGS. 27A to 27C, a lamination and a joining form of the electric cell shown in FIG. 27C are different from those of the electric cell in FIG. 26C. That is, in FIG. 26C, the three interfaces formed by the laser transmitting resin layer 401b and the laser absorption resin layer 402b are joined by simultaneously emitting a laser beam from the right direction of FIG. 26C. In contrast, in FIG. 27C, predetermined places 424 and 425 of the two interfaces formed by a laser transmitting resin layer 421b and a laser absorptive resin layer 422b are joined by simultaneously emitting a laser beam from a side of the laser transmitting resin layer 421b in a direction of an arrow 426. In the example shown in FIG. 27C, since a laser beam is emitted from above in the drawing so that the two interfaces are simultaneously joined, it is preferable that the fuel cell is formed in the following repeating manner. One electric cell is laminated on another electric cell, laser is emitted from above in the drawing, another electric cell is further laminated, and laser is emitted from above. Further, numerous electric cells are laminated in advance, and then the laser beam can be emitted from above in the drawing at one time. In this case, however, it is preferable to reduce a thickness of an outermost portion of the laser absorptive resin layer 422b in order that the laser reaches the bottom emitting position.

Embodiment A-3

Figure 28A:
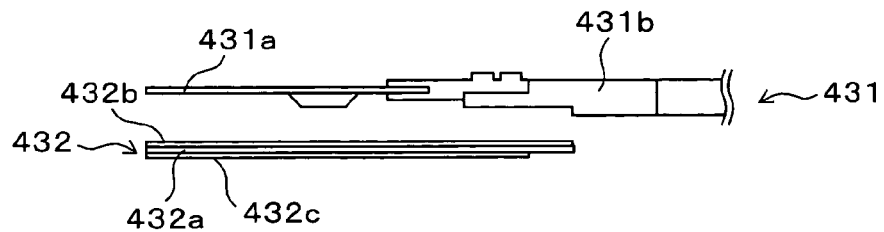
FIG. 28A is a partial sectional view illustrating a part of the components of the electric cell according to a modified example of the embodiment shown in FIGS. 26A to 27C.
Figure 28B:
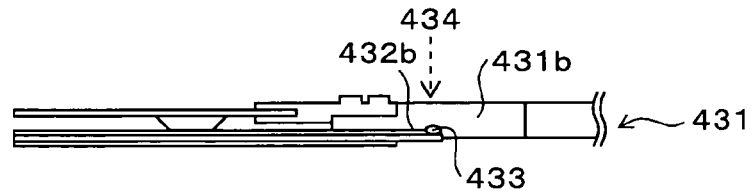
FIG. 28B is a partial sectional view illustrating a temporary assembly form of the separator and the MEA according to a modified example of the embodiment shown in FIGS. 26A to 27C.

Corresponding to the Seventh to the Tenth, Eighteenth to the Twentieth Aspects of the Invention FIGS. 28A and 28B are partial sectional views illustrating the fuel cell another preferable embodiment of the present invention. The embodiment A-3 shown in FIGS. 28A and 28B is an example which is different from the embodiments A-1 and A-2 in that MEA is temporarily incorporated into the separators in advance. That is, as shown in FIG. 28A, a separator 431 has a metallic member 431a and a laser transmitting resin layer 431b. The MEA 432 is composed of a PEM 432a, a large diffusion layer 432b that is positioned on one side of the PEM 432a and whose surface area is comparatively large, and a small diffusion layer 432c that is positioned on the other side of the PEM 432a and whose surface area is smaller than that of the large diffusion layer 432b. In the case where the separator 431 and the MEA 432 are temporarily assembled, as shown in FIG. 28B, in a state that the large diffusion layer 432b of the MEA 432 is contact-pressurized to the laser transmitting resin layer 431b of the separator 431, a laser beam is emitted from a side of the laser transmitting resin layer 431b in a direction of an arrow 434 aiming at a predetermined place 433 of the interface between the laser transmitting resin layer 431b and the large diffusion layer 432b. The resin layer is melted and entwined into pores of the large diffusion layer 432b which generates heat, so that the joining is realized, and the separator 431 and the MEA 432 are temporarily assembled. After the temporary assembly is carried out in such a manner, the electric cell is formed by a method similar to those in the embodiments A-1 and A-2, and the electric cells are joined so that the fuel cell can be formed.

The above explanations are a series of the production processes for the fuel cell, but when the fuel cell is produced in such a manner, joined portions appear on respective places of the fuel cell.

Figure 29A:
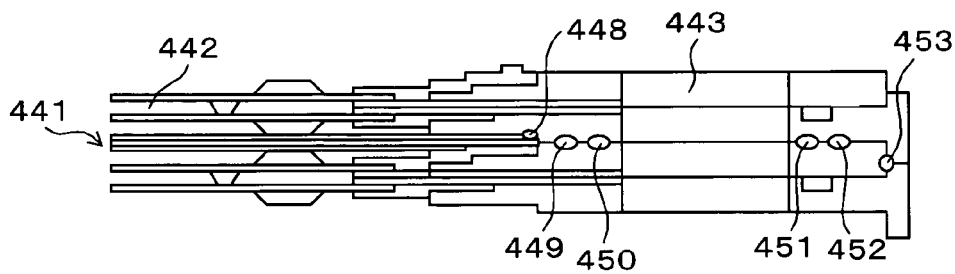
FIG. 29A is a partial sectional view illustrating a vicinity of the coolant flow channel in an adhesion state of the respective sections in the fuel cell obtained by forming the respective sections of the fuel cell shown in FIGS. 26A to 26C through the temporary assembly steps shown in FIGS. 28A and 28B.
Figure 29B:
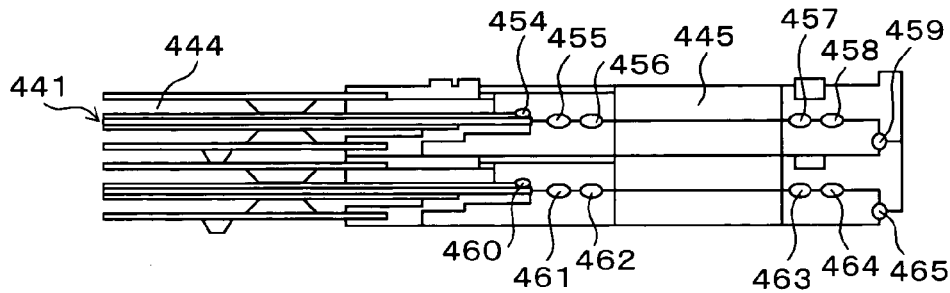
FIG. 29B is a partial sectional diagram illustrating a vicinity of the oxidizing gas flow channel in an adhesion state of the respective sections in the fuel cell obtained by forming the respective sections of the fuel cell shown in FIGS. 26A to 26C through the temporary assembly steps shown in FIGS. 28A and 28B.
Figure 29C:
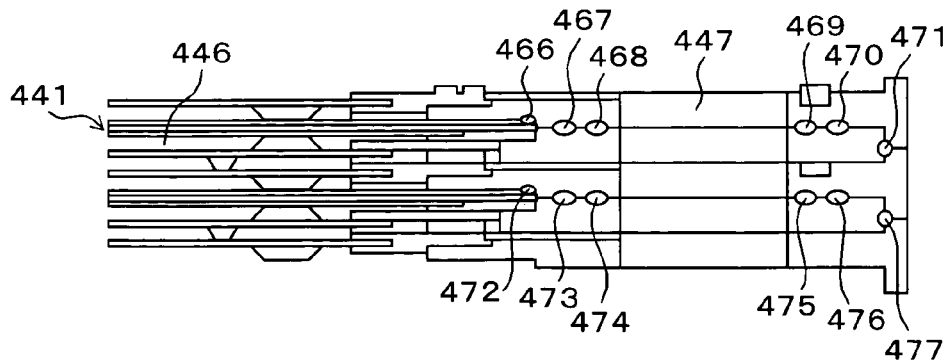
FIG. 29C is a partial sectional diagram illustrating a vicinity of the fuel gas flow channel in an adhesion state of the respective sections in the fuel cell obtained by forming the respective sections of the fuel cell shown in FIGS. 26A to 26C through the temporary assembly steps shown in FIGS. 28A and 28B.

FIGS. 29A to 29C are partial sectional views illustrating joined states of the respective sections in the fuel cell obtained by the respective sections of the fuel cell shown in FIGS. 26A to 26C through the temporary assembly steps shown in FIGS. 28A and 28B. FIG. 29A illustrates a vicinity of a coolant flow channel, FIG. 29B illustrates a vicinity of an oxidizing gas flow channel, and FIG. 29C illustrates a vicinity of a fuel gas flow channel. In FIGS. 29A to 29C, reference numeral 441 designates MEA, 442 designates a coolant flow channel, 443 designates coolant connecting hole, 444 designates an oxidizing gas flow channel, 445 designates an oxidizing gas connecting hole, 446 designates a fuel gas flow channel, and 447 designates a fuel gas connecting hole. As shown in FIGS. 29A to 29C, in the partial sections in the vicinities of the respective flow channels, adhesion places are satisfactorily provided to predetermined places 448 to 477 of an interface between the resin layers, thereby realizing the excellent joining form.

Figure 30A:
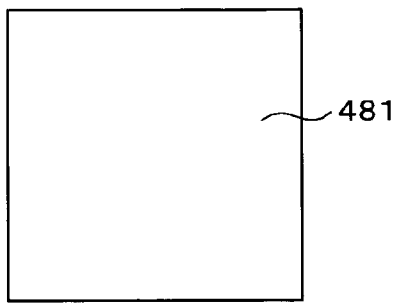
FIG. 30A is a plan view illustrating the MEA cathode surface in the respective components of the fuel cell partially shown in FIGS. 29A to 29C.
Figure 30B:
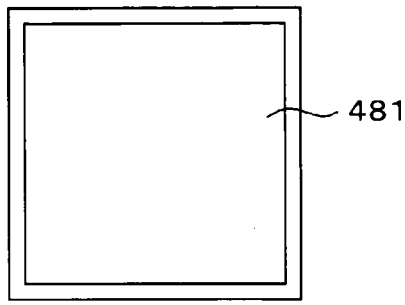
FIG. 30B is a plan view illustrating the MEA anode surface provided with the seal section frame in the respective components of the fuel cell partially shown in FIGS. 29A to 29C.
Figure 30C:
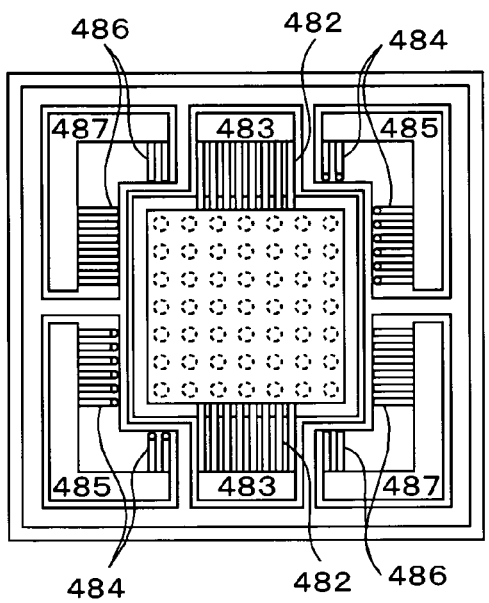
FIG. 30C is a plan view illustrating the cooling surface of the cathode separator in the respective components of the fuel cell partially shown in FIGS. 29A to 29C.
Figure 30D:
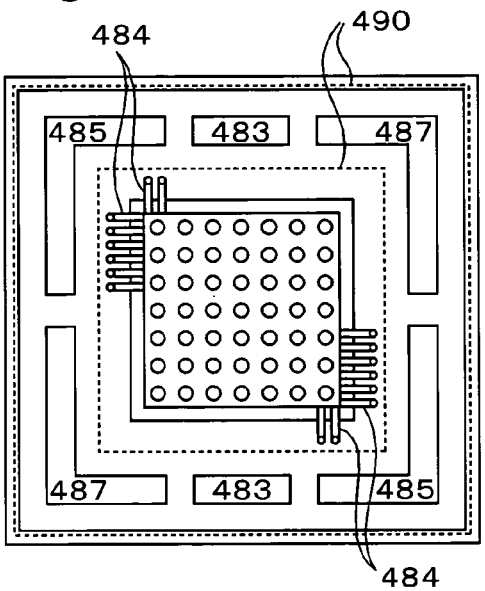
FIG. 30D is a plan view illustrating the power generating surface of the cathode separator in the respective components of the fuel cell partially shown in FIGS. 29A to 29C.
Figure 30E:
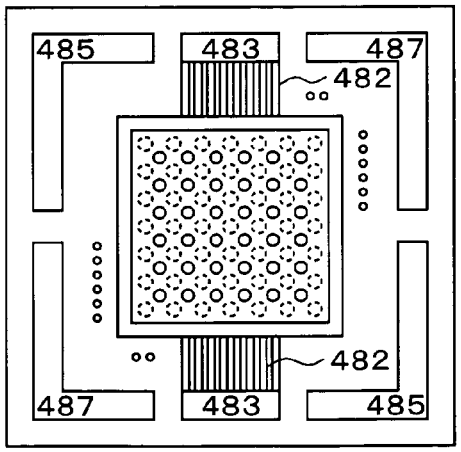
FIG. 30E is a plan view illustrating the cooling surface of the anode separator in the respective components of the fuel cell partially shown in FIGS. 29A to 29C.
Figure 30F:
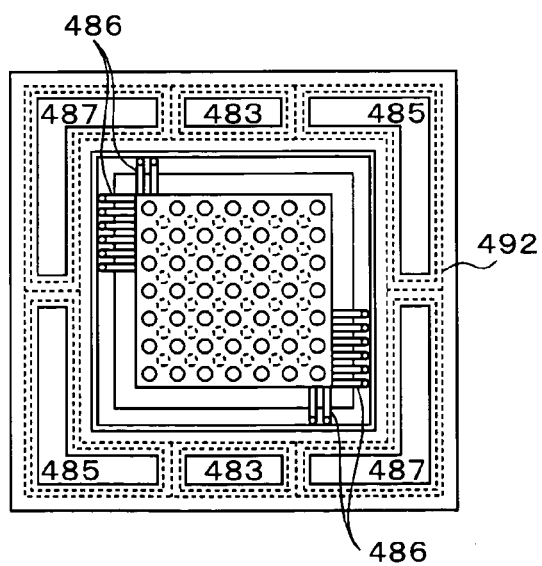
FIG. 30F is a plan view illustrating the power generating surface of the anode separator in the respective components of the fuel cell partially shown in FIGS. 29A to 29C.

FIGS. 30A to 30F are plan views illustrating the respective components of the fuel cell partially shown in FIGS. 29A to 29C. FIG. 30A illustrates an MEA cathode surface, and FIG. 30B illustrates an MEA anode surface provided with a seal section frame. FIG. 30C illustrates a cooling surface of a cathode separator, and FIG. 30D illustrates a power generating surface of the cathode separator. FIG. 30E illustrates a cooling surface of an anode separator, and FIG. 30F illustrates a power generating surface of the anode separator. The cathode (anode) separator is a separator opposed to the cathode (anode) surface of the MEA. The cooling surface (power generating surface) is a surface that is not opposed (opposed) to the MEA. In FIGS. 30A to 30F, reference numeral 481 designates MEA, 482 designates a coolant flow channel, 483 designates a coolant connecting hole, 484 designates an oxidizing gas flow channel, 485 designates an oxidizing gas connecting hole, 486 designates a fuel gas flow channel, and 487 designates a fuel gas connecting hole. As shown in FIGS. 30A and 30C to 30F, adhesion portions are satisfactorily provided to predetermined places 490 and 492 of an interface between the resin layers, an interface between the resin layer and MEA or the like as shown by doted lines. As a result, excellent joining form can be realized.

Embodiment A-4

Figure 31:
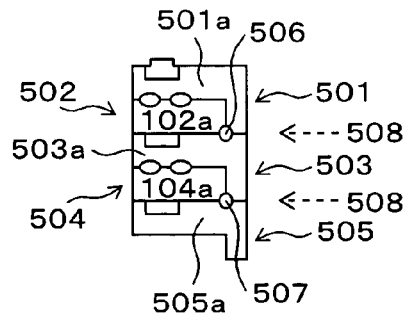
FIG. 31 is a partial sectional view illustrating an outer peripheral portion of the respective components of the fuel cell according to another preferable embodiment of the invention.

Corresponding to the Seventh to the Ninth, the Eleventh, the Eighteenth and the Nineteenth Aspects of the Invention FIG. 31 is a partial sectional view illustrating an outer peripheral portion of the fuel cell according to another preferable embodiment of the present invention. In the fuel cell shown in FIG. 31, five separators 501 to 505 are laminated with MEA, not shown, being held in a predetermined position therebetween. Shapes of laser transmitting resin layers 501a, 503a and 505a on the outermost peripheral portions of the separators 501, 503 and 505 are different from those in the embodiment A-1 (see FIG. 26C). Even if the laser transmitting resin layers 501a, 503a and 505a have such shapes, three interfaces are formed on predetermined places 506 and 507 by the laser transmitting resin layers 501a, 503a and 505a and the laser absorptive resin layers 502a and 504a. Also, in this case, a laser beam is emitted from the right side in a direction of an arrow 508 in the drawing aiming at the predetermined places 506 and 507, and the laser is absorbed by the laser absorptive resin layers 502a and 504a so that heat is generated. As a result, the interfaces are melted and joined so that the fuel cell can be obtained.

Embodiment B-1

Figure 32A:
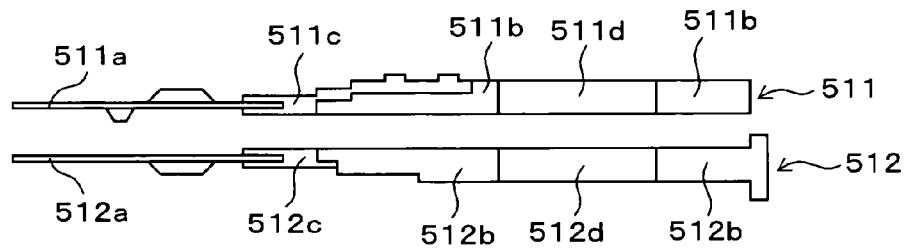
FIG. 32A is a partial sectional view illustrating a part of the components of the electric cell in the fuel cell according to still another preferable embodiment of the invention.
Figure 32B:
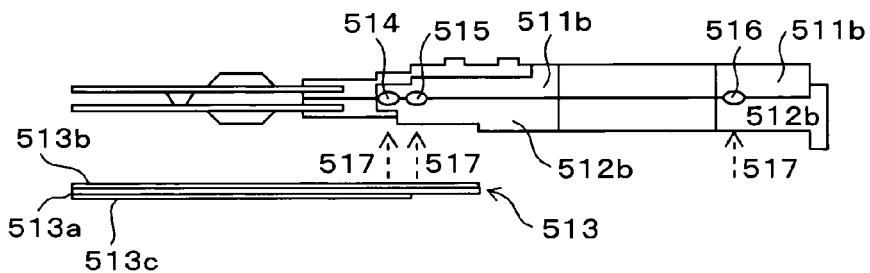
FIG. 32B is a partial sectional view illustrating a joining form of the electric cells according to still another preferable embodiment of the invention.
Figure 32C:
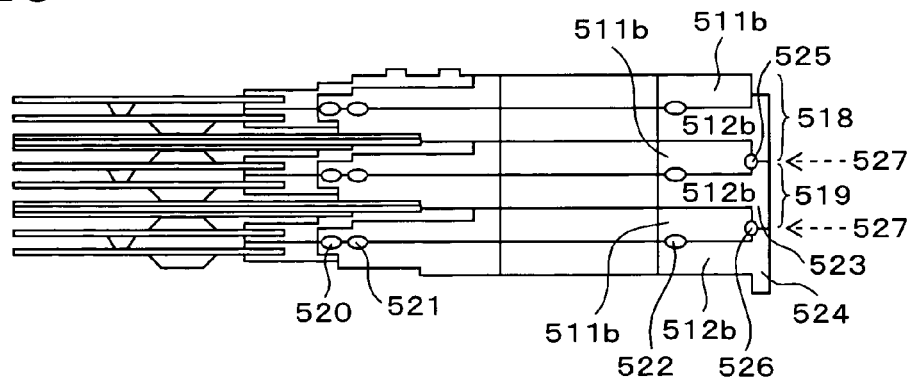
FIG. 32C is a partial sectional view illustrating the fuel cell obtained by laminating the electric cells according to still another preferable embodiment of the invention.

The Seventh to the Ninth, the Eleventh, the Eighteenth and the Nineteenth Aspects of the Invention FIGS. 32A to 32C are sectional views illustrating the fuel cell according to another preferable embodiment of the present invention. FIG. 32A illustrates two separators 511 and 512 as components of the fuel cell. As shown in the drawings, the two separators 511 and 512 are composed of metallic members 511a and 512a, a laser absorptive resin layer 511b or a laser transmitting resin layer 512b, and connecting sections 511c and 512c for connecting the metallic members 511a and 512a and the resin layers 511b and 512b, respectively. Connecting holes 511d and 512d which through various fluids circulate are formed on the resin layers 511b and 512b.

In order to obtain the fuel cell using the separators 511 and 512, as shown in FIG. 32B, the two separators 511 and 512 are laminated, and a laser beam is emitted from a side of the laser transmitting resin layer 512b to a direction of an arrow 517 aiming at predetermined places 514 to 516 on the interface between the resin layers 511b and 512b. The interface is melted and joined by heat generation due to absorption of the laser beam by the resin layer 511b so that an electric cell is formed. At the time of emitting the laser beam, similarly to the case of the embodiment A-1, an arbitrary line is drawn by moving an emitting position to a surface direction of the separator 511 while suitable contact pressure is applied to the two separators 511 and 512 and the laser is focused on the interface so that the interface is melted. According to this example, a desired joining line can be formed, so that the electric cell having excellent melting joining property can be formed.

As shown in FIG. 32C, a plurality of electric cells shown in FIG. 32B, namely, two electric cells 518 and 591 are laminated in FIG. 32C, and separators 523 and 524 which are joined at predetermined places 520 to 522 are laminated on the bottom portion. A laser beam is emitted from the right in a direction of an arrow 527 in the drawing aiming at predetermined places 525 and 526 of the interfaces, and the three interfaces on the predetermined places 525 and 526 are simultaneously melted and joined by heat generation due to absorption of the laser to the resin layer 511b. As a result, the fuel cell is obtained.

The above explanations are a series of the production processes for the fuel cell; however, when the fuel cell is produced in such a manner, joined portions appear on various places of the fuel cell.

Figure 33A:
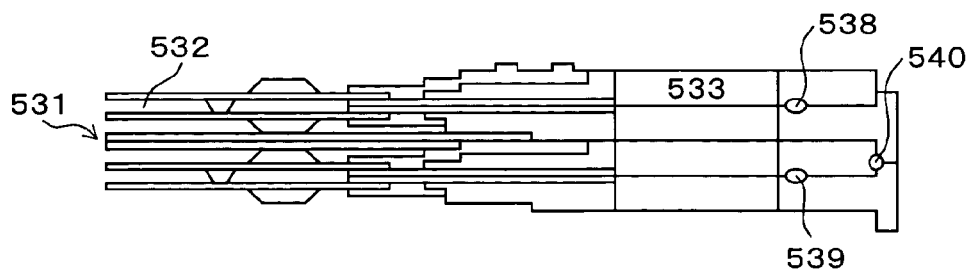
FIG. 33A is a partial sectional view illustrating a vicinity of the coolant flow channel in an adhesion state of the respective sections in the fuel cell shown in FIGS. 32A to 32C.
Figure 33B:
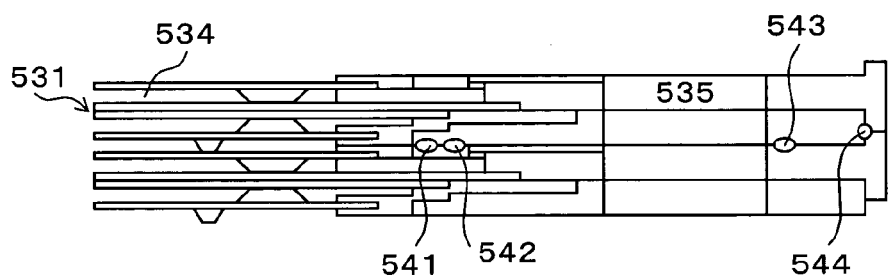
FIG. 33B is a partial sectional view illustrating a vicinity of the oxidizing gas flow channel in an adhesion state of the respective sections in the fuel cell shown in FIGS. 32A to 32C.
Figure 33C:
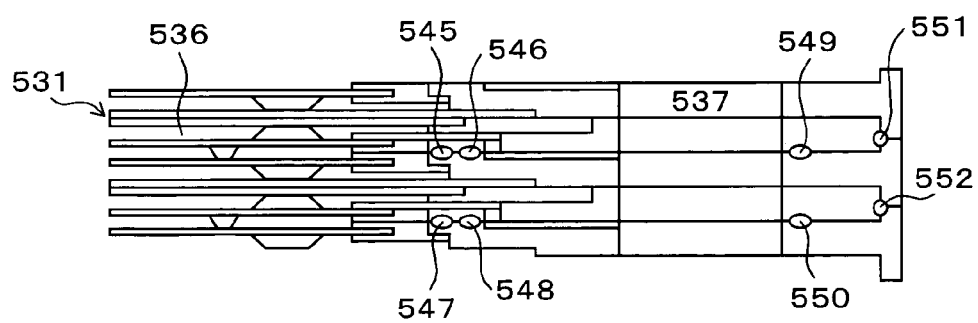
FIG. 33C is a partial sectional view illustrating a vicinity of the fuel gas flow channel in an adhesion state of the respective sections in the fuel cell shown in FIGS. 32A to 32C.

FIGS. 33A to 33C are partial sectional views illustrating the adhered states of the respective portions in the fuel cell shown in FIGS. 32A to 32C. FIG. 33A illustrates a vicinity of a coolant flow channel, FIG. 33B illustrates a vicinity of an oxidizing gas flow channel, and FIG. 33C illustrates a vicinity of a fuel gas flow channel. In FIGS. 33A to 33C, reference numeral 531 designates MEA, reference numeral 532 designates a coolant flow channel, reference numeral 533 designates a coolant connecting hole, reference numeral 534 designates an oxidizing gas flow channel, reference numeral 535 designates an oxidizing gas connecting hole, reference numeral 536 designates a fuel gas flow channel, and reference numeral 537 designates a fuel gas connecting hole. As shown in FIGS. 33A to 33C, in partial sections in the vicinities of the flow channels, adhesion portions are satisfactorily provided at predetermined places 538 to 552 in the interface between the resin layers. As a result, the excellent joining form can be realized.

Figure 34A:
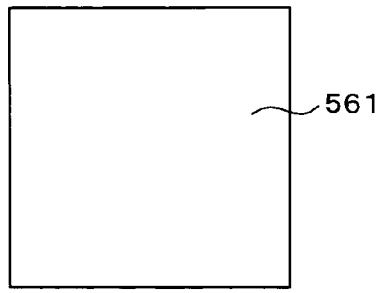
FIG. 34A is a plan view illustrating the MEA cathode surface in the respective components of the fuel cell partially shown in FIGS. 33A to 33C.
Figure 34B:
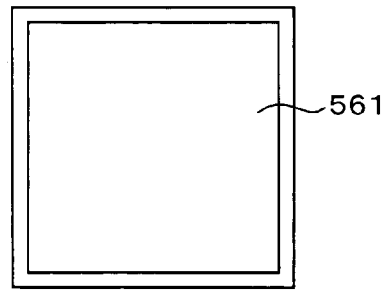
FIG. 34B is a plan view illustrating the MEA anode surface provided with the seal section frame in the respective components of the fuel cell partially shown in FIGS. 33A to 33C.
Figure 34C:
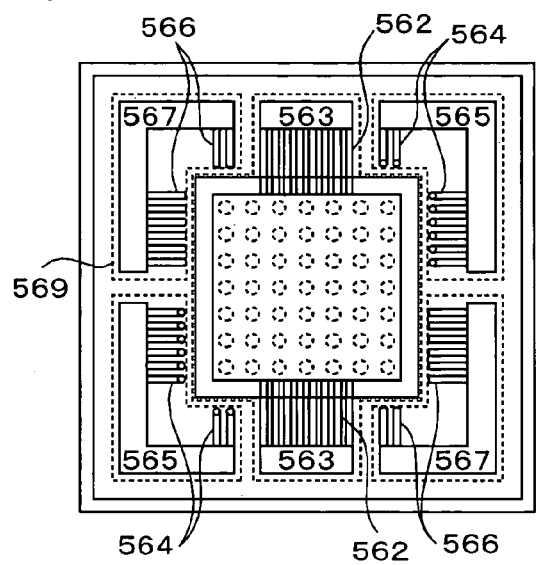
FIG. 34C is a plan view illustrating the cooling surface of the cathode separator in the respective components of the fuel cell partially shown in FIGS. 33A to 33C.
Figure 34D:
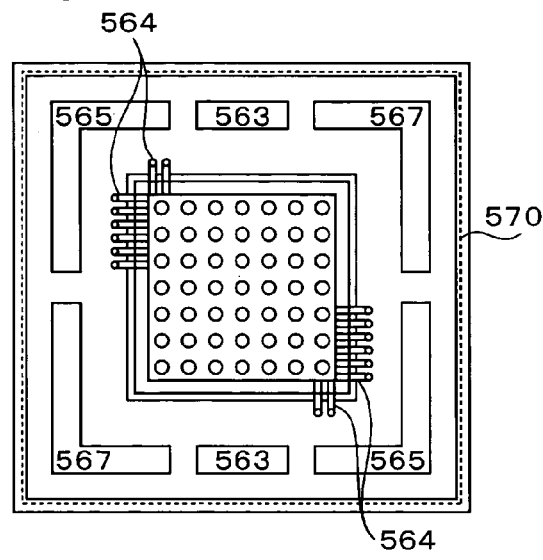
FIG. 34D is a plan view illustrating the power generating surface of the cathode separator in the respective components of the fuel cell partially shown in FIGS. 33A to 33C.
Figure 34E:
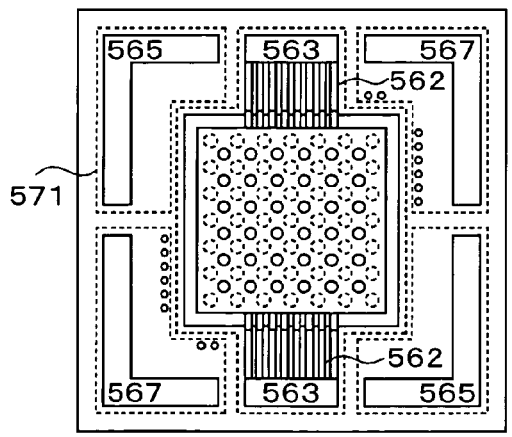
FIG. 34E is a plan view illustrating the cooling surface of the anode separator in the respective components of the fuel cell partially shown in FIGS. 33A to 33C.
Figure 34F:
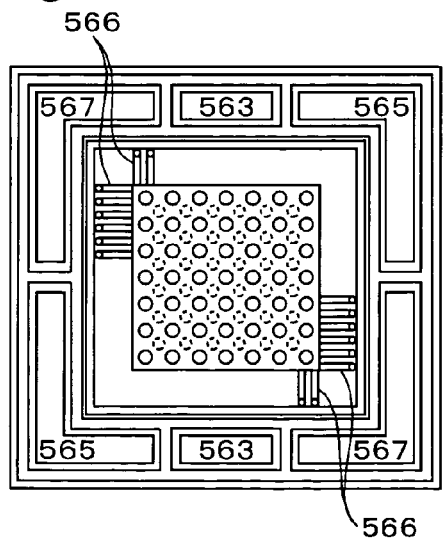
FIG. 34F is a plan view illustrating the power generating surface of the anode separator in the respective components of the fuel cell partially shown in FIGS. 33A to 33C.

FIGS. 34A to 34F are plan views illustrating the components of the fuel cell partially shown in FIGS. 33A to 33C. FIG. 34A illustrates an MEA cathode surface, and FIG. 34B illustrates an MEA anode surface provided with a seal section frame. FIG. 34C illustrates a cooling surface of a cathode separator, and FIG. 34D illustrates a power generating surface of the cathode separator. FIG. 34E is a cooling surface of an anode separator, and FIG. 34F illustrates a power generating surface of the anode separator. In FIGS. 34A to 34F, reference numeral 561 designates MEA, reference numeral 562 designates a coolant flow channel, reference numeral 563 designates a coolant connecting hole, reference numeral 564 designates an oxidizing gas flow channel, reference numeral 565 designates an oxidizing gas connecting hole, reference numeral 566 designates a fuel gas flow channel, and reference numeral 567 designates a fuel gas connecting hole. As shown in FIGS. 34A and 34C to 34F, the adhesion portions are satisfactorily provided at predetermined places 569 to 571 in the interface between the resin layers or in the interface between the resin layer and MEA as shown by dotted lines. As a result, the excellent joining form can be realized.

Embodiment B-2

Figure 35A:
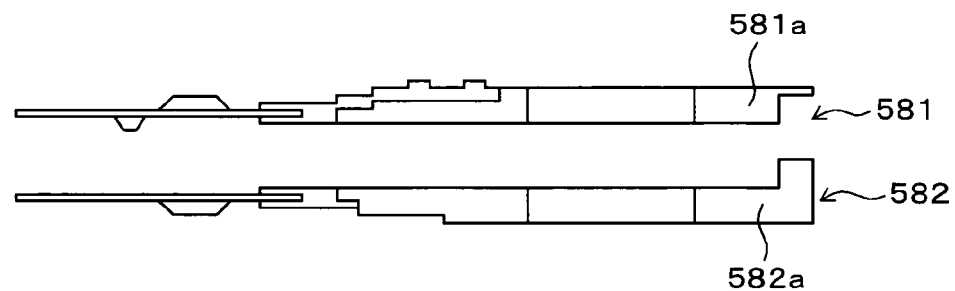
FIG. 35A is a partial sectional view illustrating a part of the components of the electric cell in the fuel cell according to another preferable embodiment of the invention.
Figure 35B:
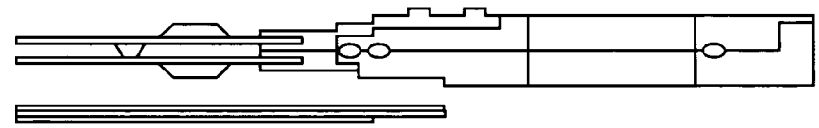
FIG. 35B is a partial sectional view illustrating a joining state of the electric cells according to another preferable embodiment of the invention.
Figure 35C:
FIG. 35C is a partial sectional view illustrating the fuel cell obtained by laminating the electric cells according to another preferable embodiment of the invention.

Corresponding to the Seventh to the Tenth, the Eighteenth and the Nineteenth Aspects of the Invention FIGS. 35A to 35C are partial sectional views illustrating the fuel cell according to another preferable embodiment of the present invention. The embodiment B-2 shown in FIGS. 35A to 35C is basically the same as the embodiment B-1 shown in FIGS. 32A to 34F; however, as shown in FIGS. 35A and 35B, shapes of a laser absorptive resin layer 581a and a laser transmitting resin layer 582a of two separators 581 and 582 are different from those in the embodiment B-1. In such a constitution, when electric cells are laminated so that a fuel cell is produced, as shown in FIG. 35C, a laser beam is emitted in a direction of an arrow 585 in the drawing aiming at predetermined places 583 and 584 of two interfaces formed by the resin layers 581a and 582a. The interfaces are melted by heat generation of the laser absorptive resin layer 581a so as to be joined. Also, in this case, similarly to the case shown in FIGS. 27A to 27C, it is preferable that the lamination of the electric cells and the laser emission be carried out alternately. Numerous electric cells are, however, laminated in advance, and then a laser beam can be emitted from above in the drawing at one time. When the laser is emitted at one time, it is preferable to reduce a thickness of the outermost portion of the laser absorptive resin layer 581a in order that the laser reaches the emitting position on the bottom portion.

Embodiment C-1

Figure 36A:
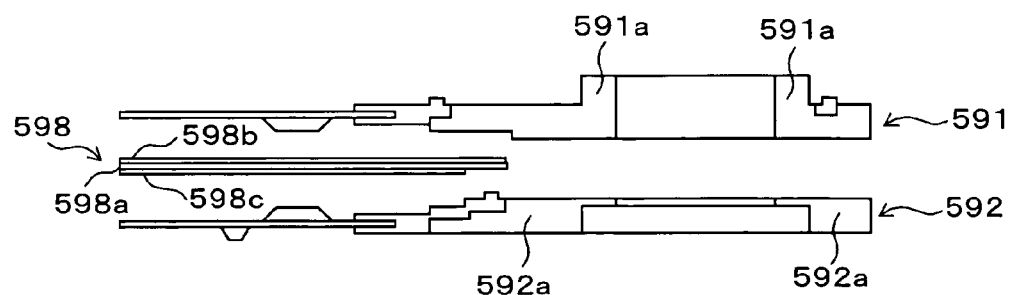
FIG. 36A is a partial sectional view illustrating the components of the electric cell in the fuel cell according to another preferable embodiment of the invention.
Figure 36B:
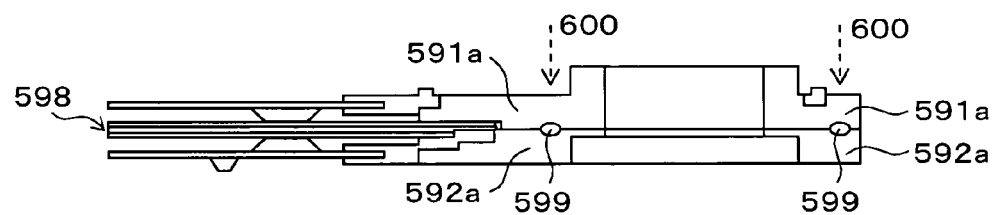
FIG. 36B is a partial sectional view illustrating a joining form of the electric cells according to another preferable embodiment of the invention.
Figure 36C:
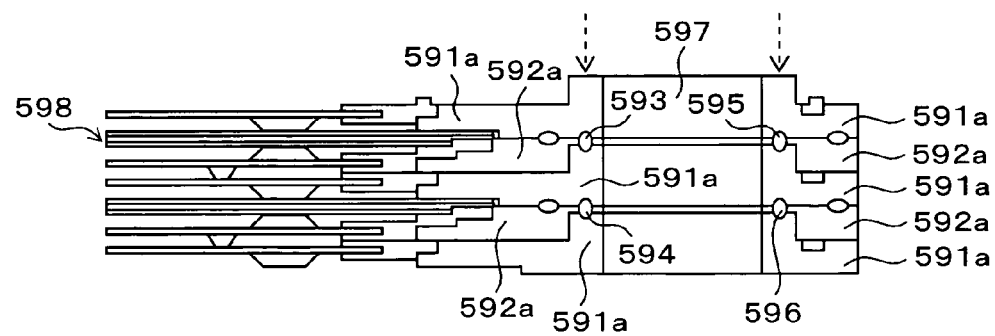
FIG. 36C is a partial sectional view illustrating the fuel cell obtained by laminating the electric cells according to another preferable embodiment of the invention.

The Seventh to the Tenth, the Eighteenth and the Nineteenth Aspects of the Invention FIGS. 36A to 36C are partial sectional views illustrating the fuel cell according to another preferable embodiment of the present invention. The embodiment C-1 shown in FIGS. 36A to 36C is basically the same as the embodiment A-2 shown in FIGS. 27A to 27C; however, as shown in FIG. 36A, shapes of a laser transmitting resin layer 591a of a separator 591 and a laser absorptive resin layer 592a of a separator 592 are different from those of the laser transmitting resin layer 421b of the separator 421 and the laser absorptive resin layer 422b of the separator 422 shown in FIG. 27A. In the embodiment shown in FIGS. 36A to 36C, a joining form of the electric cells in FIG. 36C is different from the lamination and the joining form of the electric cells in FIG. 27C due to the difference. That is, in FIG. 27C, the predetermined places 424 and 425 of the two interfaces formed by the laser transmitting resin layer 421b and the laser absorptive resin layer 422b are provided to the outermost peripheral portion of the fuel cell. In contrast, in FIG. 36C, predetermined places 593 to 596 of two interfaces formed by the laser transmitting resin layer 591a and the laser absorptive resin layer 592a are provided to a periphery of a connecting hole 597 of the fuel cell.

Embodiment C-2

Figure 37A:
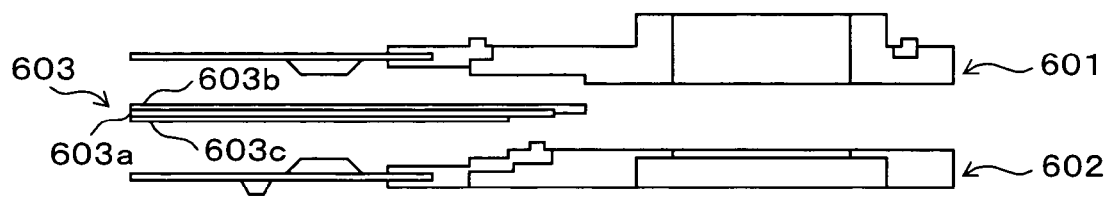
FIG. 37A is a partial sectional view illustrating the components of the electric cell in the fuel cell according to another preferable embodiment of the invention.
Figure 37B:
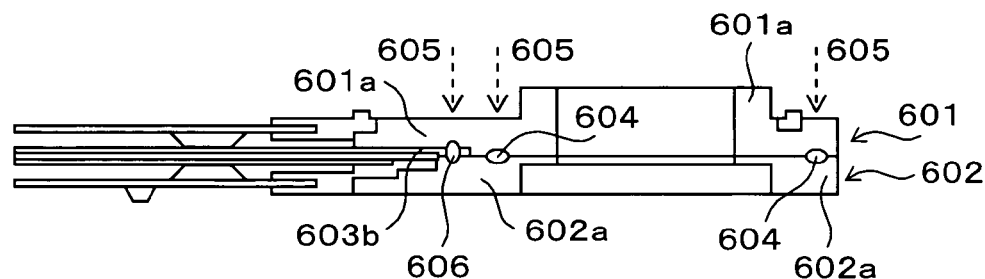
FIG. 37B is a partial sectional view illustrating a joining form of the electric cells according to another preferable embodiment of the invention.
Figure 37C:
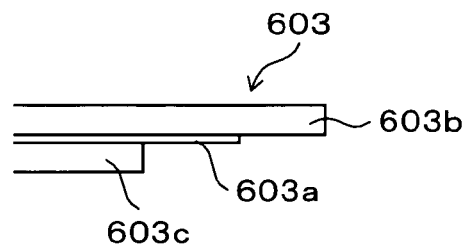
FIG. 37C is a partial sectional view illustrating MEA according to another preferable embodiment of the invention.

Corresponding to the Seventh to the Tenth and the Seventeenth to the Twenty-First Aspects of the Invention FIGS. 37A to 37C are partial sectional views illustrating the fuel cell according to another preferable embodiment of the present invention. The embodiment C-2 shown in FIGS. 37A to 37C is basically the same as the embodiment C-1 shown in FIGS. 36A to 36C; however, as shown in FIG. 37A, a structure of an MEA 603 held by separators 601 and 602 is different from a structure of an MEA 598 shown in FIGS. 36A to 36C. That is, the MEA 598 shown in FIG. 36A is composed of a PEM 598a, a large diffusion layer 598b that is positioned on one side of the PEM 598a and whose surface area is the same as that of the PEM, and a small diffusion layer 598c that is positioned on the other side of the PEM 598a and whose surface area is smaller than that of the large diffusion layer 598b. On the other hand, the MEA 603 shown in FIG. 37A is composed of a PEM 603a, a large diffusion layer 603b that is positioned on one side of the PEM 603a and whose surface area is larger than that of the PEM, a small diffusion layer 603c that is positioned on the other side of the PEM 603a and whose surface area is smaller than that of the large diffusion layer 603b. In the embodiment shown in FIGS. 37A to 37C, an electric cell forming form in FIG. 37B is different from the electric cell forming form in FIG. 36B due to the difference. That is, in FIG. 36B, a laser beam is emitted from a direction of an arrow 600 in the drawing aiming at a predetermined place 599 of an interface formed by the laser transmitting resin layer 591a and the laser absorptive resin layer 592a so that the electric cell is formed. In contrast, in FIG. 37B, a laser beam is emitted from a direction of an arrow 605 in the drawing aiming at a predetermined place 604 of an interface formed by a laser transmitting resin layer 601a and a laser absorptive resin layer 602a. Furthermore, laser is emitted to a direction of an arrow 605 from above in the drawing aiming also at a predetermined place 606 of two interfaces formed by the resin layers 601a, 602a and the large diffusion layer 603b of the MEA 603 so that the electric cell is formed. According to such an electric cell forming form, in comparison with the embodiment C-1 shown in FIGS. 36A to 36C, firmer joining of electric cells can be realized. FIG. 37C is an enlarged diagram illustrating the respective sections of the MEA 603 shown in FIGS. 37A and 37B.

The above explanations are a series of the production processes for the fuel cell; however, when such a fuel cell is produced in such a manner, the joined portions appear on various places of the fuel cell.

Figure 38A:
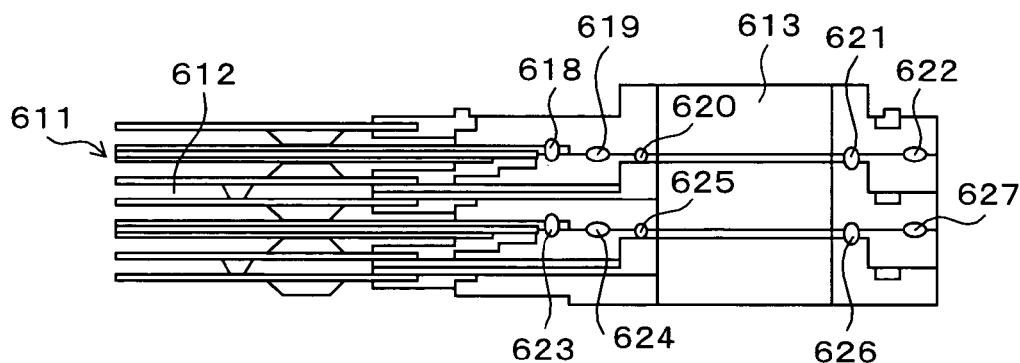
FIG. 38A is a partial sectional view illustrating a vicinity of the coolant flow channel in an adhesion state of the respective sections of the fuel cell shown in FIGS. 37A to 37C.
Figure 38B:
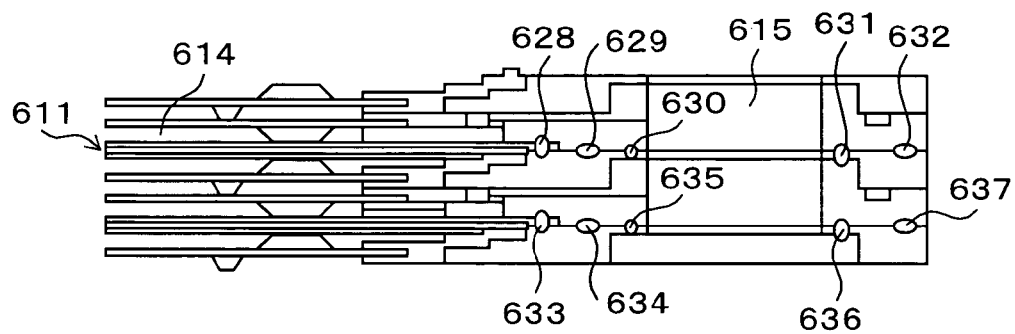
FIG. 38B is a partial sectional view illustrating a vicinity of the oxidizing gas flow channel in an adhesion state of the respective sections of the fuel cell shown in FIGS. 37A to 37C.
Figure 38C:
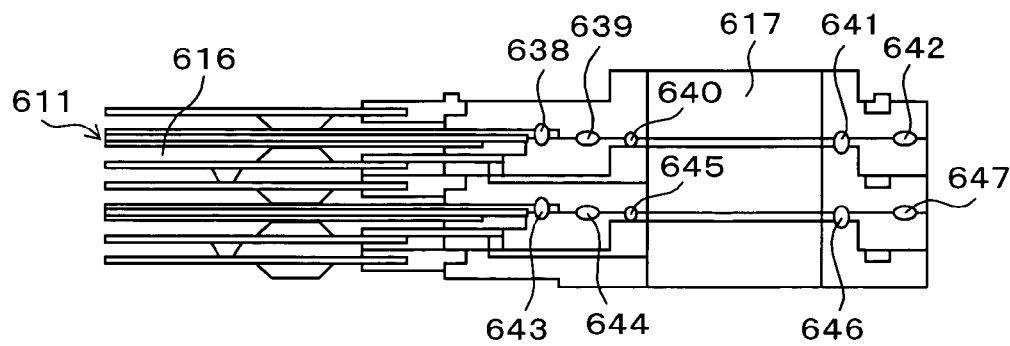
FIG. 38C is a partial sectional view illustrating a vicinity of the fuel gas flow channel in an adhesion state of the respective sections of the fuel cell shown in FIGS. 37A to 37C.

FIGS. 38A to 38C are partial sectional views illustrating the adhered state of the respective portions of the fuel cell shown in FIGS. 37A to 37C. FIG. 38A illustrates a vicinity of a coolant flow channel, FIG. 38B illustrates a vicinity of an oxidizing gas flow channel, and FIG. 38C illustrates a vicinity of a fuel gas flow channel. In FIGS. 38A to 38C, reference numeral 611 designate MEA, reference numeral 612 designates a coolant flow channel, reference numeral 613 designates a coolant connecting hole, reference numeral 614 designates an oxidizing gas flow channel, reference numeral 615 designates an oxidizing gas connecting hole, reference numeral 616 designates a fuel gas flow channel, and reference numeral 617 designates a fuel gas connecting hole. As shown in FIGS. 38A to 38C, in partial sections in the vicinities of the flow channels, adhesion portions are satisfactorily provided to predetermined places 618 to 647 of the interface between the resin layers or the interface between the resin layer and the MEA. As a result, excellent joining form can be realized.

Figure 39A:
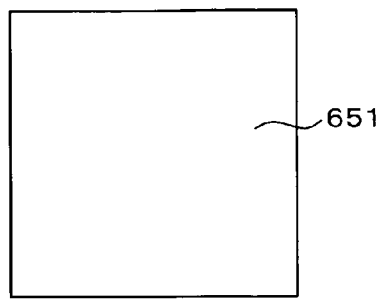
FIG. 39A is a plan view illustrating the MEA cathode surface in the respective components of the fuel cell partially shown in FIGS. 38A to 38C.
Figure 39B:
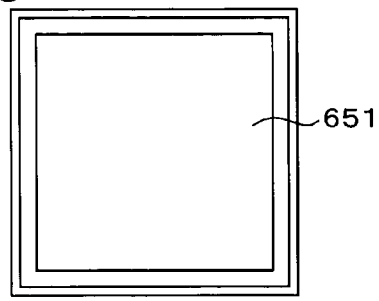
FIG. 39B is a plan view illustrating the MEA anode surface provided with the seal section frame in the respective components of the fuel cell partially shown in FIGS. 38A to 38C.
Figure 39C:
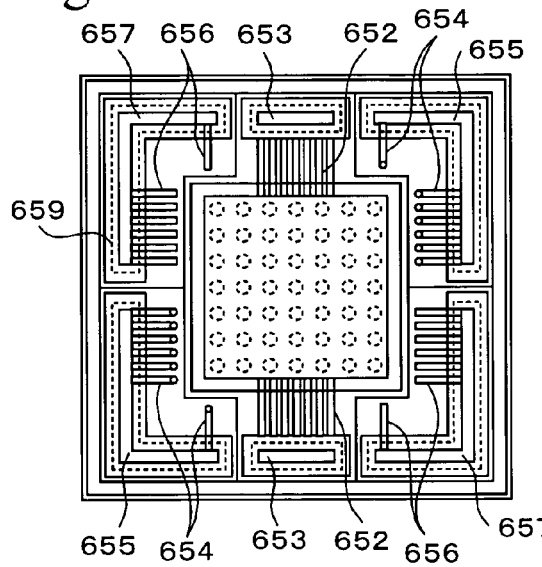
FIG. 39C is a plan view illustrating the cooling surface of the cathode separator in the respective components of the fuel cell partially shown in FIGS. 38A to 38C.
Figure 39D:
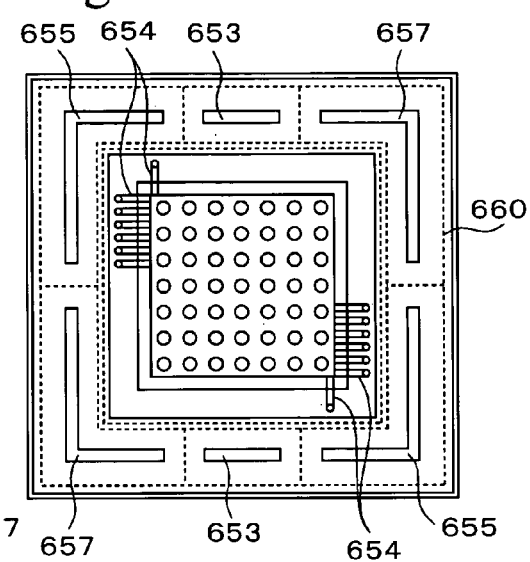
FIG. 39D is a plan view illustrating the power generating surface of the cathode separator in the respective components of the fuel cell partially shown in FIGS. 38A to 38C.
Figure 39E:
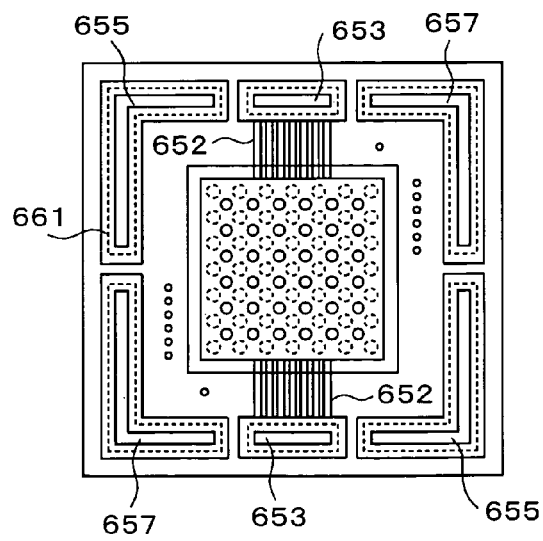
FIG. 39E is a plan view illustrating the cooling surface of the anode separator in the respective components of the fuel cell partially shown in FIGS. 38A to 38C.
Figure 39F:
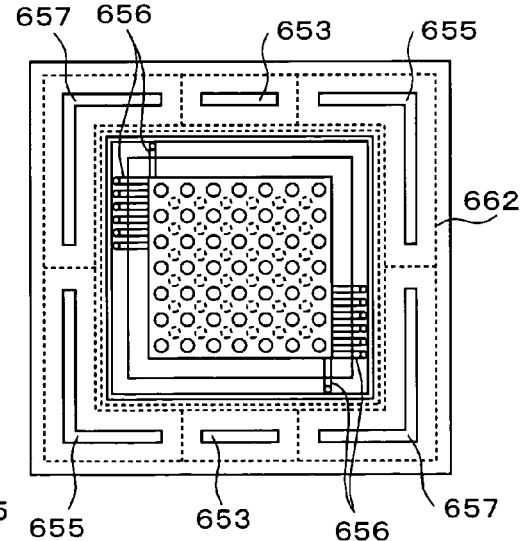
FIG. 39F is a plan view illustrating the power generating surface of the anode separator in the respective components of the fuel cell partially shown in FIGS. 38A to 38C.

FIGS. 39A to 39F are plan views illustrating the components of the fuel cell partially shown in FIGS. 38A to 38C. FIG. 39A illustrates an MEA cathode surface, and FIG. 39B illustrates an MEA anode surface provided with a seal section frame. FIG. 39C illustrates a cooling surface of a cathode separator, and FIG. 39D is a power generating surface of the cathode separator. FIG. 39E illustrates a cooling surface of an anode separator, and FIG. 39F illustrates a power generating surface of the anode separator. In FIGS. 39A to 39F, reference numeral 651 designates MEA, reference numeral 652 designates a coolant flow channel, reference numeral 653 designates a coolant connecting hole, reference numeral 654 designates an oxidizing gas flow channel, reference numeral 655 designates an oxidizing gas connecting hole, reference numeral 656 designates a fuel gas flow channel, and reference numeral 657 designates a fuel gas connecting hole. As shown in FIGS. 39A and 39C to 39F, adhesion portions are satisfactorily provided to predetermined places 659 to 662 of an interfaces between the resin layers or the interface between the resin layer and MEA as shown by dotted lines. As a result, the excellent joining form can be realized.

Embodiment D-1

Figure 40A:
FIG. 40A is a partial sectional view illustrating the components of the electric cell in the fuel cell according to another preferable embodiment of the invention.
Figure 40B:
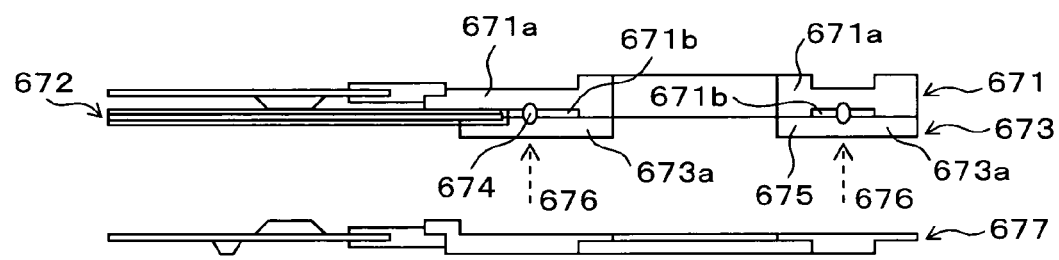
FIG. 40B is a partial sectional view illustrating a joining form of the electric cells according to another preferable embodiment of the invention.
Figure 40C:
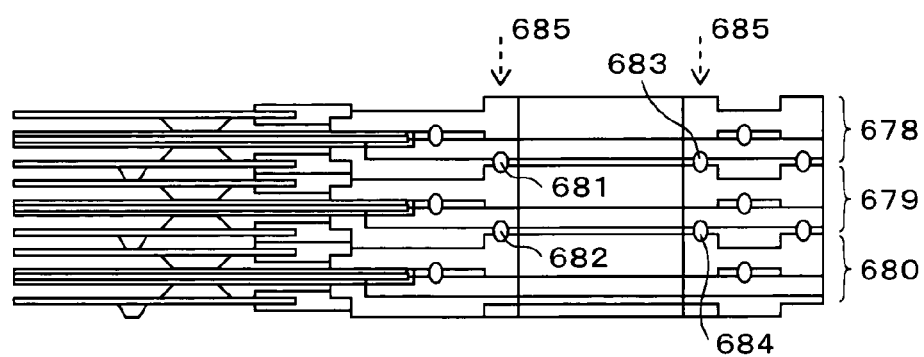
FIG. 40C is a partial sectional view illustrating the fuel cell obtained by laminating the electric cells according to another preferable embodiment of the invention.

Corresponding to the Seventh, the Eighth, the Tenth, the Fourteenth, the Eighteenth, the Nineteenth, the Twenty-Second and the Twenty-Seventh Aspects of the Invention FIGS. 40A to 40C are partial sectional views illustrating the fuel cell according to another preferable embodiment of the present invention. The embodiment D-1 shown in FIGS. 40A to 40C is basically the same as the embodiment A-3 shown in FIGS. 28A and 28B; however, a form for temporarily assembling an MEA 672 to a separator 671 in advance as shown in FIGS. 40A and 40B is different from the temporary assembly form shown in FIGS. 28A and 28B. That is, as shown in FIG. 28B, in the temporary assembly form shown in FIGS. 28A and 28B, the joining is realized in the following manner. In a state in which the large diffusion layer 432$b$ of the MEA 432 is contact-pressurized against the laser transmitting resin layer 431$b$ of the separator 431, a laser beam is emitted from the side of the laser transmitting resin layer 431$b$ in a direction of an arrow 434 aiming at a predetermined place 433 of their interface, and the melted resin layer is entwined with pores of the large diffusion layer 432$b$ generating heat. In contrast, in the temporary assembly form shown in FIGS. 40A and 40B, as shown in FIG. 40B, the joining is realized in the following manner. MEA 672 is held between a separator 671 and a frame 673, and laser is emitted to, for example, a direction of an arrow 676 in the figure aiming at predetermined places 674 and 675 of two interfaces formed by laser transmitting resin layers 671$a$ and 673$a$ and a laser absorptive resin layer 671$b$. Further, the interfaces are melted due to heat generation of the laser absorptive resin layer 671$b$. Also in such a temporary assembly form, as shown in FIG. 40B, a separator 677 is further laminated from below, so that an electric cell can be formed. As shown in FIG. 40C, a plurality of electric cells in FIG. 40B, namely, three electric cells 678 to 680 in FIG. 40C are laminated, and a laser beam is emitted in a direction of an arrow 685 aiming at predetermined places 681 to 684 of the interfaces so that the fuel cell of the present invention can be formed. When the electric cells are joined, the lamination of the electric cells and the laser emission can be alternately carried out.

The above explanations are a series of the production processes of the fuel cell, but when the fuel cell is produced in such a manner, joined portions appear on respective portions of the fuel cell.

Figure 41A:
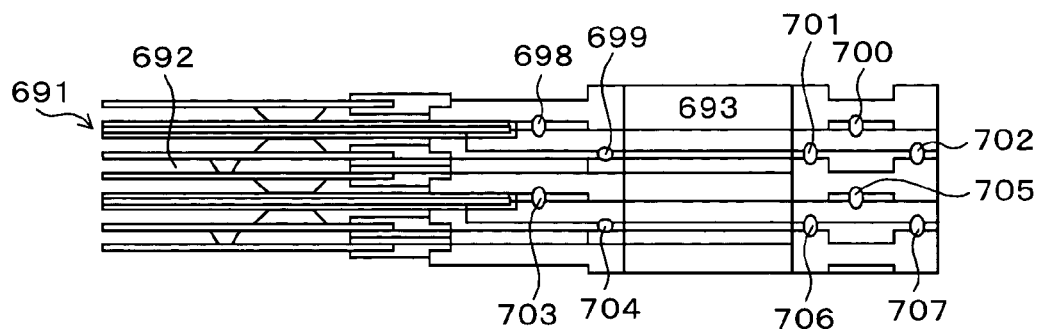
FIG. 41A is a partial sectional view illustrating a vicinity of the coolant flow channel in an adhesion state of the respective sections in the fuel cell shown in FIGS. 40A to 40C.
Figure 41B:
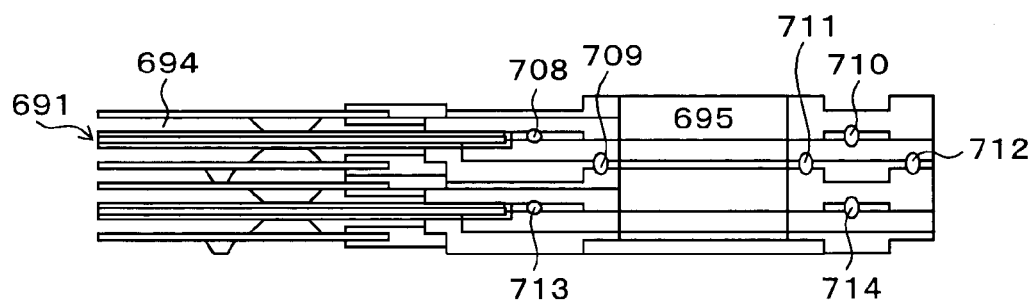
FIG. 41B is a partial sectional view illustrating a vicinity of the oxidizing gas flow channel in an adhesion state of the respective sections in the fuel cell shown in FIGS. 40A to 40C.
Figure 41C:
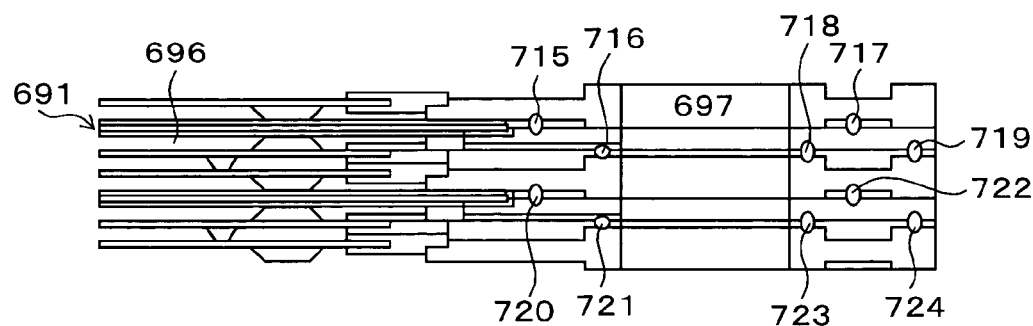
FIG. 41C is a partial sectional view illustrating a vicinity of the fuel gas flow channel in an adhesion state of the respective sections in the fuel cell shown in FIGS. 40A to 40C.

FIGS. 41A to 41C are partial sectional views illustrating the adhesion state of the respective sections of the fuel cell shown in FIGS. 40A to 40C. FIG. 41A illustrates a vicinity of a coolant flow channel, FIG. 41B illustrates a vicinity of an oxidizing gas flow channel, and FIG. 41C illustrates a vicinity of a fuel gas flow channel. In FIGS. 41A to 41C, reference numeral 691 designates MEA, 692 designates a coolant flow channel, 693 designates a coolant connecting hole, 694 designates an oxidizing gas flow channel, 695 designates an oxidizing gas connecting hole, 696 designates a fuel gas flow channel, and 697 designates a fuel gas connecting hole. As shown in FIGS. 41A to 41C, in the partial sections in the vicinities of the flow channels, adhesion portions are satisfactorily provided to predetermined places 698 to 724 of the interfaces between the resin layers, thereby realizing the excellent joining form.

Figure 42A:
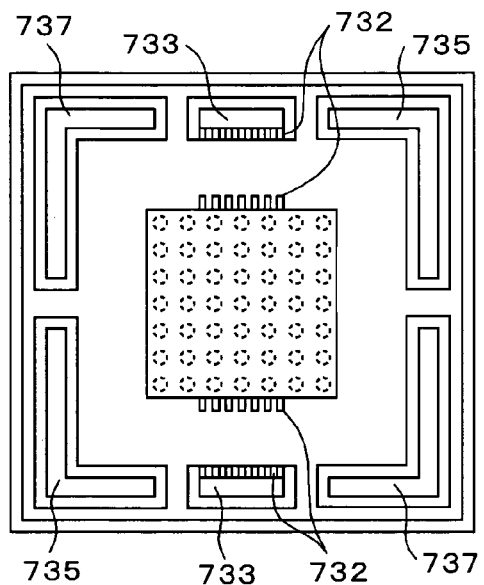
FIG. 42A is a plan view illustrating the frame side surface of the separator in the respective components in the case in which the separator 671, the MEA 672 and the frame 673 shown in FIG. 40A are temporarily assembled.
Figure 42B:
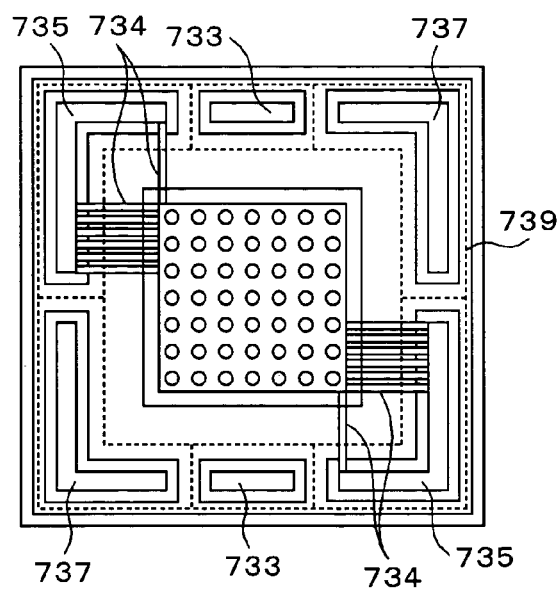
FIG. 42B is a plan view illustrating the MEA side surface of the separator in the respective components in the case where the separator 671, the MEA 672 and the frame 673 shown in FIG. 40A are temporarily assembled.
Figure 42C:
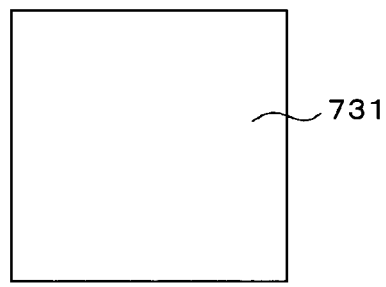
FIG. 42C is a plan view illustrating the MEA cathode surface in the respective components in the case where the separator 671, the MEA 672 and the frame 673 shown in FIG. 40A are temporarily assembled.
Figure 42D:
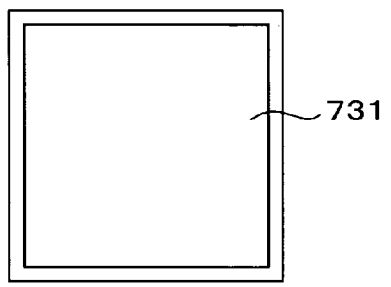
FIG. 42D is a plan view illustrating the MEA anode surface provided with the seal section frame in the respective components in the case where the separator 671, the MEA 672 and the frame 673 shown in FIG. 40A are temporarily assembled.
Figure 42E:
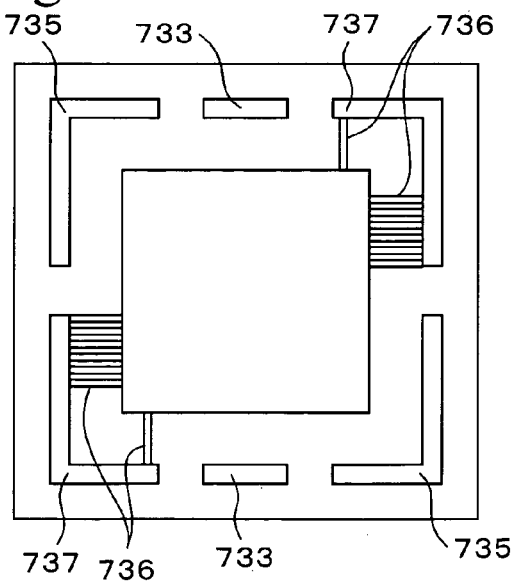
FIG. 42E is a plan view illustrating the MEA side surface of the frame in the respective components in the case where the separator 671, the MEA 672 and the frame 673 shown in FIG. 40A are temporarily assembled.
Figure 42F:
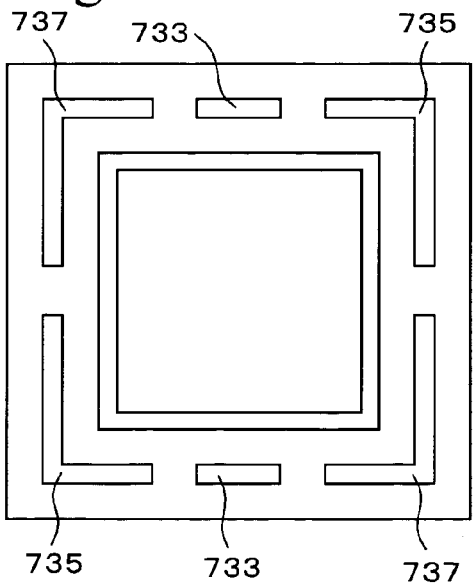

FIGS. 42A to 42F are plan views illustrating the components in the case where a separator 671, an MEA 672 and a frame 673 shown in FIG. 40A are temporarily assembled. FIG. 42A illustrates a frame side surface of the separator, and FIG. 42B illustrates an MEA side surface of the separator. FIG. 42C illustrates an MEA cathode surface, and FIG. 42D illustrates an MEA anode surface provided with a seal section frame. FIG. 42E illustrates an MEA side surface of the frame, and FIG. 42F illustrates a separator side surface of the frame. In FIGS. 42A to 42F, reference numeral 731 designates MEA, 732 designates a coolant flow channel, 733 designates a coolant connecting hole, 734 designates an oxidizing gas flow channel, 735 designates an oxidizing gas connecting hole, 736 designates a fuel gas flow channel, and 737 designates a fuel gas connecting hole. As shown in FIGS. 42A, 42B and 42E, adhesion portions are satisfactorily provided to a predetermined place 739 of the interface between resin layers as shown by dotted lines, thereby realizing the excellent joining form.

Figure 43A:
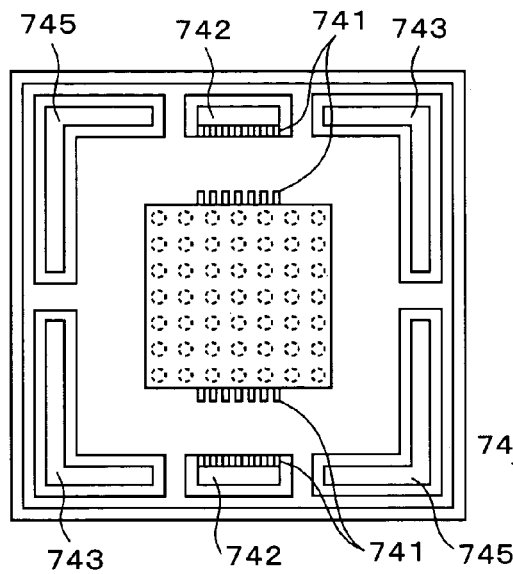
Figure 43B:
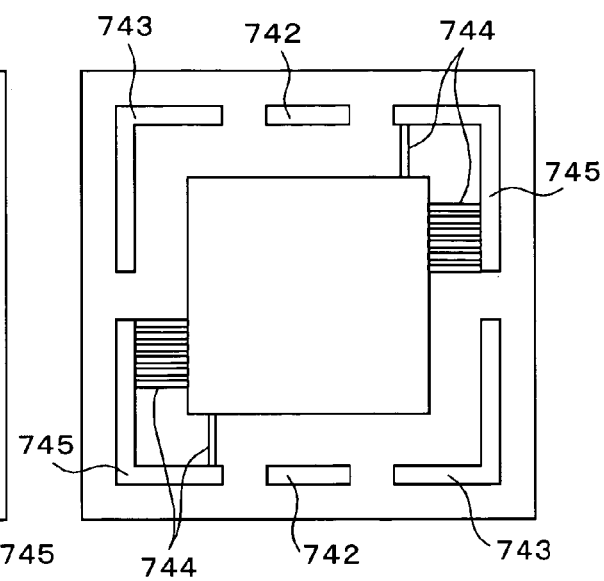
Figure 43C:
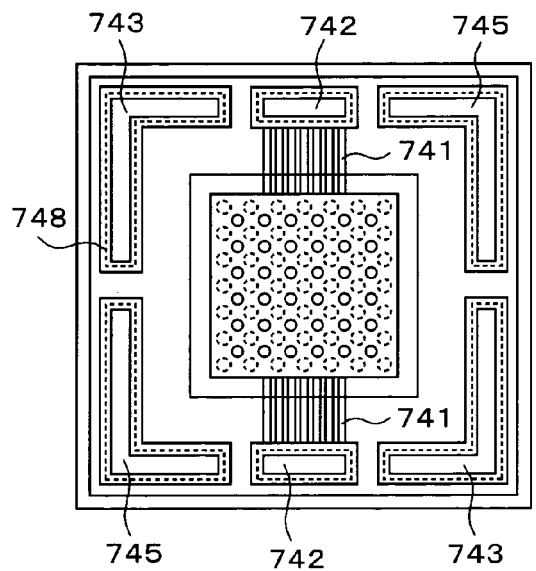
Figure 43D:
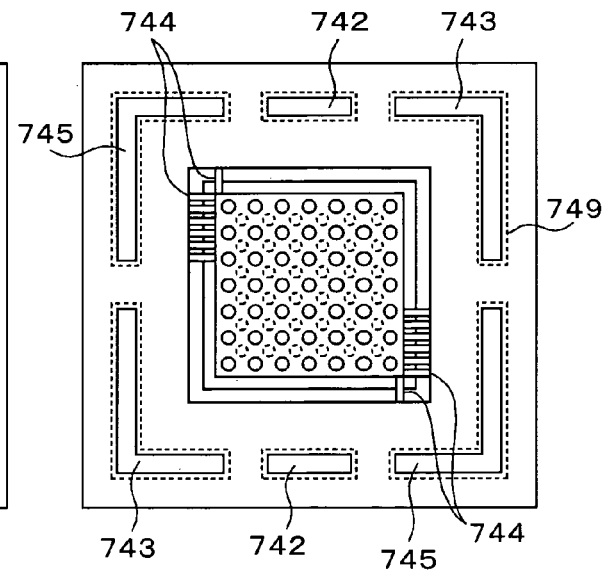

FIGS. 43A to 43D are plan views illustrating separators of the fuel cell partially shown in FIGS. 41A to 41C. FIG. 43A illustrates a cooling surface of a cathode separator, and FIG. 43B illustrates a power generating surface of the cathode separator. FIG. 43C illustrates a cooling surface of an anode separator, and FIG. 43D illustrates a power generating surface of the anode separator. In FIGS. 43A to 43D, reference numeral 741 designates a coolant flow channel, 742 designates a coolant connecting hole, 743 designates an oxidizing gas connecting hole, 744 designates a fuel gas flow channel, and 745 designates a fuel gas connecting hole. As shown in FIGS. 43A to 43D, adhesion portions are satisfactorily provided to predetermined places 748 and 749 of the interface between the resin layers as shown by dotted lines, thereby realizing the excellent joining form.

Embodiment D-2

Figure 44A:
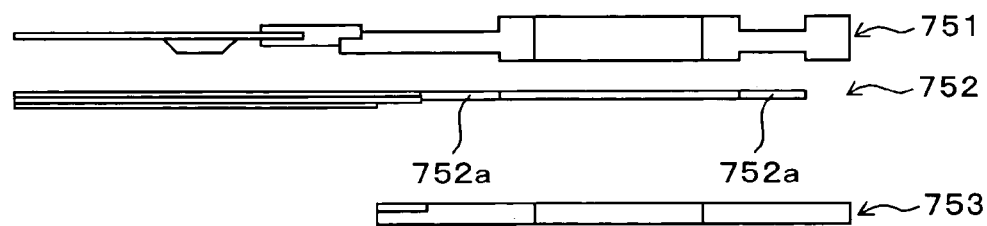
Figure 44B:
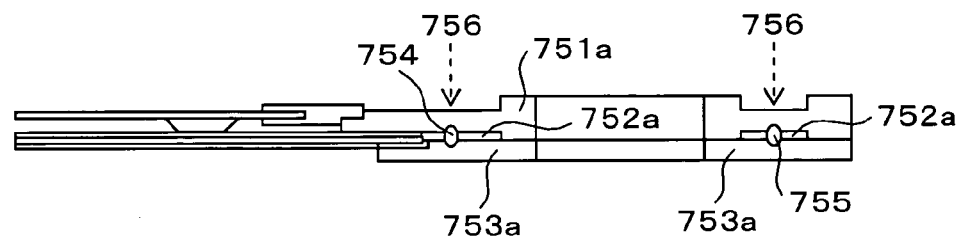
Figure 44C:
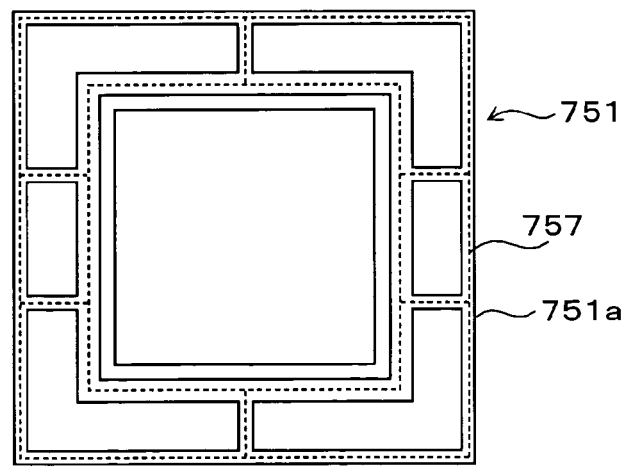

Corresponding to the Seventh, the Eighth, the Tenth, the Fourteenth, the Eighteenth, the Nineteenth, the Twenty-First, the Twenty-Third and the Twenty-Fourth Aspects of the Invention FIGS. 44A to 44C are partial sectional views illustrating the fuel cell according to another preferable embodiment of the present invention. The embodiment D-2 shown in FIGS. 44A to 44C is basically the same as the embodiment C-1 shown in FIGS. 40A to 43D, but as shown in FIGS. 44A and 44B, the form for temporarily assembling an MEA 752 to a separator 751 in advance is different from the temporary assembly form shown in FIGS. 40A and 40B. That is, in the temporary form shown in FIGS. 40A and 40B, the joining is realized in the following manner. As shown in FIG. 40B, the MEA 672 is held between the separator 671 and the frame 673, and laser is emitted to the direction of the arrow 676 in FIG. 40B aiming at the predetermined places 674 and 675 of the two interfaces formed by the laser transmitting resin layers 671a and 673a and the laser absorptive resin layer 671b. The interfaces are melted due to the heat generation of the laser absorptive resin layer 671b. In contrast, in the temporarily assembly form shown in FIGS. 44A and 44B, the joining is realized in the following manner. As shown in FIG. 44B, a large diffusion layer 752a of the MEA 752 is the laser absorptive resin layer, and laser is emitted from a side of the laser transmitting resin layer 751a in a direction of an arrow 756 aiming at predetermined places 754 and 755 of two interfaces by a laser transmitting resin layer 751a of the separator 751, the large diffusion layer 752a of the MEA 752, and a laser transmitting resin layer 753a of the frame 753. The resin layers are melted and entwined with pores of the large diffusion layer 752a which generates heat. Also, in such a temporary assembly form, a plurality of electric cells shown in FIG. 44B are laminated, so that the fuel cell of the present invention is suitably obtained. FIG. 44C is a plan view of the separator 751 on the side of the MEA 752 shown in FIGS. 44A and 44B, in the figure, joined portions are obtained on respective places as shown by dotted lines 757 so that the preferable joining form can be realized.

Embodiment E-1

Corresponding to the Seventh, the Eighth, the Twelfth, the Thirteenth, the Eighteenth, the Nineteenth and the Twenty-Second Aspects of the Invention FIGS. 45A and 46B are partial sectional views illustrating the fuel cell according to another preferable embodiment of the present invention. In the embodiment E-1 shown in FIGS. 45A and 45B, when the electric cell is formed, two separators 761 and 762 are laminated with MEA 763 being held therebetween. A predetermined place 764 of four interfaces formed on the outermost peripheral portion of the electric cell is joined by laser absorptive resin layers 761a and 762a and laser transmitting resin layers 761b and 762b composing the separators 761 and 762. In this case, as shown in FIG. 45B, a laser beam is emitted from a side of the laminated laser transmitting resin layers 761b and 762b of the separators 761 and 762 to a direction of an arrow 765. The four interfaces on the predetermined place 764 are simultaneously melted by heat generation due to absorption of the laser by the resin layers 761a and 762a, and are joined so that the electric cell is formed.

Not shown, but a plurality of the electric cells obtained in such a manner are laminated, and predetermined places of four interfaces which are similarly formed on the joined surfaces of the electric cells are joined by laser emission so that the fuel cell of the present invention can be formed.

The above explanations are a series of the production processes for the fuel cell, but when the fuel cell is produced in such a manner, the joined portions appear on respective places of the fuel cell.

FIGS. 46A to 46C are partial sectional views illustrating the adhesion state of the respective sections in the fuel cell shown in FIGS. 45A and 45B. FIG. 46A illustrates a vicinity of a coolant flow channel, FIG. 46B illustrates a vicinity of an oxidizing gas flow channel, and FIG. 46C illustrates a vicinity of a fuel gas flow channel. In FIGS. 46A to 46C, reference numeral 771 designates MEA, 772 designates a coolant flow channel, 773 designates a coolant connecting hole, 774 designates an oxidizing gas flow channel, 775 designates an oxidizing gas connecting hole, 776 designates a fuel gas flow channel, and 777 designates a fuel gas connecting hole. As shown in FIGS. 46A to 46C, in partial sections in the vicinities of the flow channels, adhesion portions are satisfactorily provided to predetermined places 778 to 788 of the interfaces of the resin layers, thereby realizing the excellent joining form.

FIGS. 47A to 47D are plan views illustrating the separators of the fuel cell partially shown in FIGS. 46A to 46C. FIG. 47A illustrates a cooling surface of a cathode separator, and FIG. 47B illustrates a power generating surface of the cathode separator. FIG. 47C illustrates a cooling surface of an anode separator, and FIG. 47D illustrates a power generating surface of the anode separator. In FIGS. 47A to 47D, reference numeral 791 designates a coolant flow channel, 792 designates a coolant connecting hole, 793 designates an oxidizing gas flow channel, 794 designates an oxidizing gas connecting hole, 795 designates a fuel gas flow channel, and 796 designates a fuel gas connecting hole. As shown in FIGS. 47A to 47D, adhesion portions are satisfactorily provided to predetermined places 797 to 800 of interfaces between the resin layers as shown by dotted lines, thereby realizing the excellent joining form.

Embodiment F-1

Corresponding to the Seventh, the Eighth, the Fourteenth, the Fifteenth, the Eighteenth, the Nineteenth, and the Twenty-Seventh Aspects of the Invention FIGS. 48A to 48D are partial sectional views illustrating the fuel cell according to another preferable embodiment of the present invention. In the embodiment F-1 shown in FIGS. 48A to 48D, a laser transmitting resin layer and a laser absorptive resin layer are arranged on outer peripheral portions of two separators composing an electric cell, and a frame is attached to one separator in advance, so that a tunnel passage of an anode is formed between the separator and the frame.

That is, FIG. 48A illustrates components composing the electric cell, reference numeral 801 designates the frame, 802 designates one separator which is joined to the frame 801 in advance, 803 designates the other separator which is paired with the separator 801 and composes the electric cell, and 804 designates MEA. As shown in FIG. 48A, the frame 801 is composed of a laser transmitting resin layer 801a, and a connecting hole 801b through which various fluids circulate is formed on the resin layer 801a. The separator 802 is composed of a metallic member 802a, a laser transmitting resin layer 802b, a laser absorptive resin layer 802c, and a connecting section 802d for connecting the metallic member 802a and the resin layer 802b. A connecting hole 802e through which various fluids circulate is formed on the resin layers 802b and 802c. The separator 803 is composed of a metallic member 803a, a laser transmitting resin layer 803b, a laser absorptive resin layer 803c, and a connecting section 803d for connecting the metallic member 803a and the resin layer 803b. A connecting hole 803e through which various fluids circulate is formed on the resin layer 803b. The MEA 804 is composed of a PEM 804a, a large diffusion layer 804b that is positioned on one side of the PEM 804a and whose surface area is the same as that of the PEM 804a, and a small diffusion layer 804c that is positioned on the other side of the PEM 804a and whose surface area is smaller than that of the large diffusion layer 804b.

In such a constitution, when the electric cell is formed, as shown in FIG. 48B, the frame 801 and the separator 802 are laminated, and in this state, the laser beam is emitted from a side of the laser transmitting resin 801a in a direction of an arrow 807 aiming at predetermined places 805 and 806 of two interfaces formed by the resin layers 801a, 802b and 802c. The interfaces are melted and joined by heat generation due to absorption of the laser by the resin layer 802c, so that the frame 801 and the separator 802 are joined in advance. As shown in FIG. 48C, the MEA 804 and the separator 803 are laminated on the frame 801 and separator 802 joined in advance, and laser is emitted from a side of the laser transmitting resin layer 803b to a direction of an arrow 810 aiming at predetermined places 808 and 809 of the two interfaces formed by the resin layers 801a, 803b and 803c. The interfaces are melted and joined by heat generation due to absorption of the laser beam by the resin layer 803c, so that the electric cell is formed.

As shown in FIG. 48D, a plurality of the electric cells in FIG. 48C, namely, the two electric cells 811 and 812 in FIG. 48D are laminated, and a separator 813 is further laminated on the bottom portion. A laser beam is emitted from a side of the resin layer 803b to a direction of an arrow 824 aiming at predetermined places 814 to 823 of the interfaces. The interfaces are melted and joined by heat generation due to absorption of the laser beam by the resin layer 802c, so that fuel cell is formed.

The above explanations are a series of the production processes for the fuel cell, but when the fuel cell is produced in such a manner, the joined portions appear on respective places of the fuel cell.

FIGS. 49A to 49C are partial sectional views illustrating the adhesion state of the respective sections in the fuel cell shown in FIGS. 48A to 48D. FIG. 49A illustrates a vicinity of a coolant flow channel, FIG. 49B illustrates a vicinity of an oxidizing gas flow channel, and FIG. 49C illustrates a vicinity of a fuel gas flow channel. In FIGS. 49A to 49C, reference numeral 831 illustrates MEA, 832 illustrates a coolant flow channel, 833 designates a coolant connecting hole, 834 designates an oxidizing gas flow channel, 835 designates an oxidizing gas connecting hole, 836 designates a fuel gas flow channel, and 837 designates a fuel gas connecting hole. As shown in FIGS. 49A to 49C, in the partial sections in the vicinities of the flow channels, adhesion portions are satisfactorily provided to predetermined places 838 to 870 of the interfaces between the resin layers, thereby realizing the excellent joining form.

FIGS. 50A to 50E are plan views illustrating the components of the electric cell shown in FIG. 48C except for the MEA 804. That is, FIG. 50A illustrates a cooling surface of the separator 803 shown in FIG. 48A, FIG. 50B illustrates a power generating surface of the separator 803, and FIG. 50C illustrates a power generating surface of the frame 801. FIG. 50D illustrates a cooling surface of the separator 802, and FIG. 50E illustrates a power generating surface of the separator 802. In FIGS. 50A to 50E, reference numeral 871 designates a coolant flow channel, 872 designates a coolant connecting hole, 873 designates an oxidizing gas flow channel, 874 designates an oxidizing gas connecting hole, 875 designates a fuel gas flow channel, and 876 designates a fuel gas connecting hole. As shown in FIGS. 50A to 50E, adhesion portions are satisfactorily provided at predetermined places 878, 880 and 881 of the interfaces between the resin layers as shown by dotted lines, thereby realizing the excellent joining form.

Embodiment F-2

Corresponding to the Seventh, the Eighth, the Fourteenth, the Fifteenth, the Eighteenth, the Nineteenth, the Twenty-First, and the Twenty-Fourth to the Twenty-Seventh Aspects of the Invention FIGS. 51A and 51B are sectional views illustrating the fuel cell according to another preferable embodiment of the present invention. The embodiment F-2 shown in FIGS. 51A and 51B is basically the same as the embodiment F-1 shown in FIGS. 48A to 50E, but shapes of MEA and a separator that is joined to MEA in advance are different. That is, as shown in FIGS. 51A and 52B, the shape of MEA in the embodiment F-2 is similar to the shape of MEA in the embodiment D-2.

As shown in FIG. 51A, a resin layer 891a of a separator 891 is entirely composed of a laser transmitting resin. On the other hand, a large diffusion layer 892a of MEA 892 has a heat generating member that is joined to the resin layer 891a of the separator 891. The resin layer 891a has a concave portion, and the large diffusion layer 892a has a convex portion (rib reinforcement). When the separator 891 and the MEA 892 are laminated, these 891a and 892a are fitted. Further, in order to make the lamination of the separator 891 and the MEA 892 easy, rib reinforcement guide holes 891b and 892b are formed on the resin layers 891a and 892a, respectively.

In such a constitution, as shown in FIG. 51B, the MEA 892 and the separator 891 are laminated on the upper part of the previously joined frame 893 and separator 894, and the rib reinforcement guide holes 891b and 892b are aligned. A laser beam, thereafter, is emitted from a side of the laser transmitting resin layer 891a to a direction of an arrow 897 aiming at predetermined places 895 and 896 of the two interfaces formed by the resin layers 891a and 892a and the laser transmitting resin layer 893a. The interfaces are melted and joined by heat generation due to absorption of the laser by the heat generating member 892a, so that the electric cell is formed. Not shown, but the electric cells are successively laminated, and the laser beam is emitted similarly to the above manner, so that the fuel cell of the present invention can be suitably formed.

The various embodiments (A-1 to F-2) of the present invention are explained, but in any embodiments, a thermoplastic resin layer (PPS, LCP, PEEK or PC) or a thermoplastic resin layer (PPS, LCP, PEEK or PC) coated with silicone rubber can be used as the laser transmitting resin layer, and a thermoplastic resin layer (PPS, LCP, PEEK or PC) impregnated with carbon or pigment can be used as the laser absorptive resin layer.

In the embodiments A-3 and C-2, a gas transmitting metal material (metallic foam or fine-gage wire metal felt) or a carbon material can be used as the large diffusion layer as the laser absorptive component of MEA. In the embodiments C-2, D-2 and F-2, the thermoplastic resin layer (PPS, LCP, PEEK or PC) or the thermoplastic resin (PPS, LCP PEEK or PC) impregnated with carbon or pigment can be used as a heat absorptive material.

In the embodiments D-1 and D-2, it is preferable that the laser absorptive resin layer be integrated with the laser transmitting resin layer by injection-molding or adhering them after the laser transmitting resin layer is formed. In the embodiment D-2, it is preferable that the laser transmitting resin layer be integrated with the laser absorptive resin layer by injection-molding or adhering after the laser absorptive resin layer is formed.

In the embodiments D-2 and F-2, the laser absorptive member of the MEA is preferably composed of the PEM, the large diffusion layer that is positioned at one side of the PEM and whose surface area is comparatively large, and the small diffusion layer that is positioned on the other side of the PEM and whose surface area is smaller than that of the large diffusion layer. The large diffusion layer is preferably composed of a gas transmitting metal material or carbon material, and it is preferable that the large diffusion layer be formed integrally with the adjacent resin layer of the separator. In the embodiment F-2, it is preferable that the reinforcement rib be provided to at least one of the outer peripheral portion of the laser absorptive member of the MEA and the inner peripheral portion of the connecting hole.

In the embodiment F-2, it is preferable that the guide holes for assembly be provided to the outer peripheral portion of the laser absorptive member of the MEA. In the embodiments D-1, F-1 and F-2, it is preferable that adhesive be applied to the interface of the exposed portion of PEM of MEA, and thus a seal be formed.

What is claimed is:

1. A fuel cell in which a plurality of electric cells including a membrane electrode assembly (MEA) having a catalytic layer and a diffusion layer on both surfaces of an electrolytic membrane is held between a first separator and a second separator are laminated, wherein
the first separator has a metallic internal member and a thermoplastic laser transmitting resin layer provided at an outer peripheral portion of the metallic internal member, wherein the thermoplastic laser transmitting resin layer and the metallic internal member are made of different materials,
the second separator has a metallic internal member and a thermoplastic laser absorptive resin layer provided at an outer peripheral portion of the metallic internal member, wherein the thermoplastic laser absorptive resin layer is made of a material different than the metallic internal member and the thermoplastic laser transmitting resin layer of the first separator,
the MEA physically contacts and is sandwiched between a portion of the thermoplastic laser transmitting resin layer of the first separator and a portion of the thermoplastic laser absorptive layer of the second separator,
the thermoplastic laser transmitting resin layer of the first separator is adjacent to the thermoplastic laser absorptive resin layer of the second separator,
the thermoplastic laser transmitting resin layer of the first separator adheres to the thermoplastic laser absorptive resin layer of the second separator to laminate the first and second separators together,
wherein a laser emitted portion forms a circular body in plan view of the adjacent separators, and the MEA is positioned in the circular body.

2. The fuel cell according to claim 1, wherein when the first separator having the laser transmitting resin layer is joined to the second separator having the laser absorptive resin layer, the MEA being sandwiched between the first separator and the second separator.

3. The fuel cell according to claim 1, wherein:
a third separator having a thermoplastic laser transmitting resin layer is provided adjacent to the second separator so that the second separator is sandwiched between the first and third separators, and
two interfaces formed by the three resin layers are joined together.

4. The fuel cell according to claim 1, wherein:
the thermoplastic laser transmitting resin layer of the first separator has a protrusion,
a third separator having a laser transmitting resin layer is provided adjacent to the second separator so that the second separator is sandwiched between the first and third separators, the thermoplastic laser transmitting resin layer of the third separator has a protrusion,
the protrusion of the thermoplastic laser transmitting resin layer of the first separator is in direct physical contact with the protrusion of the thermoplastic laser transmitting resin layer of the third separator, and
three interfaces formed by the three resin layers are joined together.

5. The fuel cell according to claim 1, wherein:
the first separator further comprises a thermoplastic laser absorptive layer between the metallic internal member and the thermoplastic laser transmitting resin layer,
the second separator further comprises a thermoplastic laser transmitting layer provided on an outer peripheral portion of the thermoplastic laser absorptive resin layer,
the two separators are laminated, and four interfaces formed by the four resin layers are joined together.

6. The fuel cell according to claim 5, wherein a plurality of electric cells constituted by simultaneously joining the four interfaces are laminated, and the four interfaces formed in vicinities of joined points of the electric cells are simultaneously joined by emitting a laser beam.

7. A fuel cell in which a plurality of electric cells including a membrane electrode assembly (MEA) having a catalytic layer and a diffusion layer on both surfaces of an electrolytic membrane is held between a first separator and an adjacent second separator are laminated, wherein:
the first separator and the second separator have a metallic internal member and a thermoplastic laser transmitting resin layer provided at an outer peripheral portion of the metallic internal member, wherein the thermoplastic laser transmitting resin layer is made of material different than the metallic internal member, wherein the MEA physically contacts and is sandwiched between a portion of the thermoplastic laser transmitting resin layer of the first separator and a portion of the thermoplastic laser transmitting layer of the second separator,
a laser absorptive resin layer is arranged between the thermoplastic laser transmitting layer of the first separator and the thermoplastic laser transmitting layer of the second separator, so that two interfaces are formed by the three resin layers, wherein two interfaces are joined together,
wherein a laser emitted portion forms a circular body in plan view of the adjacent separators, and the MEA is positioned in the circular body.

8. The fuel cell according to claim 7, wherein a plurality of electric cells constituted by simultaneously joining the two interfaces are laminated, the laser absorptive resin layer is arranged between the electric cells so that the two interfaces are formed, and the two interfaces are joined together.

9. The fuel cell according to claim 1, wherein the laser transmitting resin layer composing the first separator and the MEA having a laser absorptive member are laminated by melting the MEA to join the separator and the MEA together.

10. The fuel cell according to claim 1, wherein the laser transmitting resin layer composing the first separator and the MEA hold a heat absorptive material forming two interfaces, the two interfaces are joined together by melting the heat absorptive material.

11. The fuel cell according to claim 2, wherein a thermoplastic resin layer or a thermoplastic resin layer coated with silicone rubber is used as the laser transmitting resin layer.

12. The fuel cell according to claim 2, wherein a thermoplastic resin layer impregnated with carbon or pigment is used as the laser absorptive resin layer.

13. The fuel cell according to claim 9, wherein a gas transmitting metal material or a carbon material is used as the laser absorptive member of the MEA.

14. The fuel cell according to claim 10, wherein a thermoplastic resin layer or a thermoplastic resin layer impregnated with carbon or pigment is used as the heat absorptive material.

15. The fuel cell according to claim 7, wherein the laser absorptive resin layer is integrated with the laser transmitting resin layer by injection-molding or adhering after the laser transmitting resin layer is formed.

16. The fuel cell according to claim 5, wherein the laser transmitting resin layer is integrated with the laser absorptive resin layer by injection-molded or adhering after the laser absorptive resin layer is formed.

17. The fuel cell according to claim 9, wherein the laser absorptive member of the MEA is composed of a PEM, a large diffusion layer which is positioned on one side of the PEM and whose surface area is comparatively large, and a small diffusion layer which is positioned on the other side of the PEM and whose surface area is smaller than that of the large diffusion layer, the large diffusion layer is composed of a gas transmitting metal material or a carbon material, and the large diffusion layer is integrally formed with the resin layer of the adjacent separator.

18. The fuel cell according to claim 9, wherein a reinforcement rib is provided to at least one of an outer peripheral portion of the laser absorptive member of the MEA and an internal peripheral portion of a connecting hole.

19. The fuel cell according to claim 9, wherein an assembly guide hole is provided to the outer peripheral portion of the laser absorptive resin member of the MEA.

20. The fuel cell according to claim 5, wherein adhesive is applied to an exposed interface of a PEM of the MEA so that a seal is formed.

* * * * *